(12) United States Patent
Yokoyama et al.

(10) Patent No.: US 11,377,710 B2
(45) Date of Patent: *Jul. 5, 2022

(54) STEEL SHEET AND MANUFACTURING METHOD THEREFOR

(71) Applicant: NIPPON STEEL CORPORATION, Tokyo (JP)

(72) Inventors: Takafumi Yokoyama, Tokyo (JP); Kohichi Sano, Tokyo (JP); Riki Okamoto, Tokyo (JP); Hiroyuki Kawata, Tokyo (JP); Eisaku Sakurada, Tokyo (JP); Yuji Yamaguchi, Tokyo (JP); Kazuki Shiokawa, Tokyo (JP); Yuichi Nakahira, Tokyo (JP); Kohei Ueda, Tokyo (JP); Masahiro Nakata, Tokyo (JP); Satoshi Uchida, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 34 days.

This patent is subject to a terminal disclaimer.

(21) Appl. No.: 16/981,653

(22) PCT Filed: Mar. 30, 2018

(86) PCT No.: PCT/JP2018/013590
§ 371 (c)(1),
(2) Date: Sep. 16, 2020

(87) PCT Pub. No.: WO2019/186997
PCT Pub. Date: Oct. 3, 2019

(65) Prior Publication Data
US 2021/0095356 A1 Apr. 1, 2021

(51) Int. Cl.
C22C 38/18 (2006.01)
C22C 38/16 (2006.01)
(Continued)

(52) U.S. Cl.
CPC ............. *C21D 9/46* (2013.01); *B32B 15/01* (2013.01); *B32B 15/013* (2013.01); *B32B 15/04* (2013.01);
(Continued)

(58) Field of Classification Search
CPC ........ C21D 2211/001; C21D 2211/003; C21D 2211/005; C21D 2211/008;
(Continued)

(56) References Cited

U.S. PATENT DOCUMENTS

2008/0251160 A1  10/2008  Akamizu et al.
2021/0017620 A1*  1/2021  Yokoyama ............... C21D 9/46
2021/0123122 A1*  4/2021  Yokoyama ........... C21D 9/0081

FOREIGN PATENT DOCUMENTS

JP    5-195149 A    8/1993
JP    6-128688 A    5/1994
(Continued)

OTHER PUBLICATIONS

"Metallic materials-Bend test", JIS Z 2248, (2006), total of 6 pages. (no month).

(Continued)

*Primary Examiner* — Michael E. La Villa
(74) *Attorney, Agent, or Firm* — Birch, Stewart, Kolasch & Birch, LLP

(57) ABSTRACT

A steel sheet has a chemical composition with a steel structure containing, by volume fraction, soft ferrite: 0-30%, retained austenite: 3-40%, fresh martensite: 0-30%, pearlite and cementite: 0-10%, and a remainder including hard ferrite. In the steel sheet, a number proportion of retained austenite having an aspect ratio of 2.0 or more in the total retained austenite is 50% or more, and a soft layer having a thickness of 1-100 μm is present. In the soft layer, a volume fraction of ferrite grains having an aspect ratio of less than (Continued)

3.0 is 50% or more, and a volume fraction of retained austenite is 50% or more of the volume fraction of the retained austenite of the inside of the steel sheet. A peak of an emission intensity at a wavelength indicating Si appears in a range of more than 0.2 μm to 5 μm or less from the surface.

12 Claims, 5 Drawing Sheets

(51) Int. Cl.
| | |
|---|---|
| *C22C 38/14* | (2006.01) |
| *C22C 38/12* | (2006.01) |
| *C22C 38/10* | (2006.01) |
| *C22C 38/08* | (2006.01) |
| *C22C 38/04* | (2006.01) |
| *C22C 38/02* | (2006.01) |
| *C22C 38/00* | (2006.01) |
| *C23C 2/40* | (2006.01) |
| *C23C 2/28* | (2006.01) |
| *B32B 15/01* | (2006.01) |
| *C21D 6/00* | (2006.01) |
| *C21D 8/02* | (2006.01) |
| *C21D 9/46* | (2006.01) |
| *C22C 38/06* | (2006.01) |
| *C22C 38/60* | (2006.01) |
| *C23C 2/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/52* | (2006.01) |
| *C22C 38/58* | (2006.01) |
| *C25D 3/56* | (2006.01) |
| *C23C 2/26* | (2006.01) |
| *C23C 30/00* | (2006.01) |
| *B32B 15/04* | (2006.01) |
| *B32B 15/18* | (2006.01) |
| *C21D 8/00* | (2006.01) |
| *C22C 38/20* | (2006.01) |
| *C22C 38/34* | (2006.01) |
| *C22C 38/30* | (2006.01) |
| *C22C 38/32* | (2006.01) |
| *C22C 38/40* | (2006.01) |
| *C22C 38/26* | (2006.01) |
| *C22C 38/28* | (2006.01) |
| *C22C 38/38* | (2006.01) |
| *C22C 38/22* | (2006.01) |
| *C22C 38/24* | (2006.01) |
| *C22C 38/54* | (2006.01) |

(52) U.S. Cl.
CPC ............ *B32B 15/043* (2013.01); *B32B 15/18* (2013.01); *C21D 6/001* (2013.01); *C21D 6/002* (2013.01); *C21D 6/004* (2013.01); *C21D 6/005* (2013.01); *C21D 6/007* (2013.01); *C21D 6/008* (2013.01); *C21D 8/005* (2013.01); *C21D 8/02* (2013.01); *C21D 8/0205* (2013.01); *C21D 8/0226* (2013.01); *C21D 8/0236* (2013.01); *C21D 8/0247* (2013.01); *C21D 8/0263* (2013.01); *C22C 38/00* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/105* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C22C 38/34* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/58* (2013.01); *C22C 38/60* (2013.01); *C23C 2/06* (2013.01); *C23C 2/26* (2013.01); *C23C 2/28* (2013.01); *C23C 2/40* (2013.01); *C23C 30/00* (2013.01); *C23C 30/005* (2013.01); *C25D 3/565* (2013.01); *C21D 2211/001* (2013.01); *C21D 2211/003* (2013.01); *C21D 2211/005* (2013.01); *C21D 2211/008* (2013.01); *C21D 2211/009* (2013.01); *Y10T 428/12674* (2015.01); *Y10T 428/12757* (2015.01); *Y10T 428/12799* (2015.01); *Y10T 428/12951* (2015.01); *Y10T 428/12958* (2015.01); *Y10T 428/12965* (2015.01); *Y10T 428/12972* (2015.01); *Y10T 428/12993* (2015.01); *Y10T 428/2495* (2015.01); *Y10T 428/24983* (2015.01); *Y10T 428/26* (2015.01)

(58) Field of Classification Search
CPC .. C21D 2211/009; C21D 6/001; C21D 6/002; C21D 6/004; C21D 6/005; C21D 6/007; C21D 6/008; C21D 9/46; C21D 8/0205; C21D 8/0226; C21D 8/0247; C21D 8/0263; C21D 8/005; C21D 8/02; C21D 8/0236; B32B 15/01; B32B 15/013; B32B 15/04; B32B 15/043; B32B 15/18; C25D 3/565; C22C 38/00; C22C 38/001; C22C 38/002; C22C 38/005; C22C 38/008; C22C 38/02; C22C 38/04; C22C 38/06; C22C 38/08; C22C 38/10; C22C 38/12; C22C 38/14; C22C 38/16; C22C 38/18; C22C 38/42; C22C 38/44; C22C 38/46; C22C 38/48; C22C 38/50; C22C 38/52; C22C 38/58; C22C 38/60; C22C 38/105; C22C 38/20; C22C 38/22; C22C 38/24; C22C 38/26; C22C 38/28; C22C 38/30; C22C 38/32; C22C 38/34; C22C 38/38; C22C 38/40; C22C 38/54; C23C 2/06; C23C 2/28; C23C 2/40; C23C 2/26; C23C 30/00; C23C 30/005; Y10T 428/12799; Y10T 428/12951; Y10T 428/12958; Y10T 428/12965; Y10T 428/12972; Y10T 428/12993; Y10T 428/2495; Y10T 428/12757; Y10T 428/12674; Y10T 428/26; Y10T 428/24983
See application file for complete search history.

(56) References Cited

FOREIGN PATENT DOCUMENTS

| | | |
|---|---|---|
| JP | 10-130782 A | 5/1998 |
| JP | 2003-193193 A | 7/2003 |

(56) References Cited

FOREIGN PATENT DOCUMENTS

| | | |
|---|---|---|
| JP | 2003-193194 A | 7/2003 |
| JP | 2006-274418 A | 10/2006 |

OTHER PUBLICATIONS

"Metallic materials-Hole expanding test", JIS Z 2256, (2010), total of 4 pages. (no month).

"Metallic materials-Tensile testing-Method of test at room temperature", JIS Z 2241, (2011), total of 23 pages. (no month).

Sugimoto et al., "Effects of Second Phase Morphology on Retained Austenite Morphology and Tensile Properties in a TRIP-aided Dual-phase Steel Sheet", ISIJ International, vol. 33 (1993), No. 7, pp. 775-782. (no month).

* cited by examiner

STEEL SHEET AND MANUFACTURING METHOD THEREFOR

TECHNICAL FIELD OF THE INVENTION

The present invention relates to a steel sheet and a method for manufacturing the same.

RELATED ART

In recent years, from the viewpoint of regulating greenhouse gas emissions associated with countermeasures against global warming, a further improvement in fuel efficiency of vehicles is required. In addition, in order to reduce the weight of a vehicle body and secure collision safety, the application of a high strength steel sheet to a component for a vehicle gradually expands.

Needless to say, a steel sheet used for a component for a vehicle is required to have not only strength but also various workability such as press formability and weldability required for forming components. Specifically, from the viewpoint of press formability, a steel sheet is often required to have excellent elongation (total elongation in a tension test; El) and stretch flangeability (hole expansion ratio: $\lambda$).

As a method for improving the press formability of a high strength steel sheet, dual phase steel (DP steel) containing ferrite and martensite is known (for example, refer to Patent Document 1). DP steel has excellent ductility. However, DP steel has a hard phase serving as the origin of void formation and is thus inferior in hole expansibility.

In addition, as a technique for improving the ductility of a high strength steel sheet, there is TRIP steel that contains austenite remaining in the steel structure and utilizes a transformation-induced plasticity (TRIP) effect (for example, refer to Patent Document 2). TRIP steel has a higher ductility than DP steel. However, TRIP steel is inferior in hole expansibility. In addition, it is necessary to add a large amount of alloys of Si and the like to TRIP steel to in order to retain austenite. Therefore, TRIP steel is also inferior in chemical convertibility and plating adhesion.

In addition, Patent Document 3 describes a high strength steel sheet having a microstructure containing bainite or bainitic ferrite in an area ratio of 70% or more and having a tensile strength of 800 MPa or more and excellent hole expansibility. Patent Document 4 describes a high strength steel sheet having a microstructure containing bainite or bainitic ferrite as the primary phase, austenite as the secondary phase, and ferrite or martensite as the remainder, and having a tensile strength of 800 MPa or more and excellent hole expansibility and ductility.

As a technique for improving the bending workability of a high strength steel sheet, for example, Patent Document 5 describes a high strength cold-rolled steel sheet having a surface layer part primarily containing ferrite, which is manufactured by performing a decarburization treatment on a steel sheet. In addition, Patent Document 6 describes an ultrahigh-strength cold-rolled steel sheet having a soft layer in the surface layer portion, which is manufactured by performing decarburization annealing on a steel sheet. However, the techniques described in Patent Documents 5 and 6 have insufficient fatigue resistance.

Furthermore, Non-Patent Document 1 discloses that the elongation and hole expansibility of a steel sheet are improved by using a double annealing method in which a steel sheet is subjected to annealing twice. However, the technique described in Non-Patent Document 1 has insufficient bendability.

PRIOR ART DOCUMENT

Patent Document

[Patent Document 1] Japanese Unexamined Patent Application, First Publication No. H6-128688
[Patent Document 2] Japanese Unexamined Patent Application, First Publication No. 2006-274418
[Patent Document 3] Japanese Unexamined Patent Application, First Publication No. 2003-193194
[Patent Document 4] Japanese Unexamined Patent Application, First Publication No. 2003-193193
[Patent Document 5] Japanese Unexamined Patent Application, First Publication No. H10-130782
[Patent Document 6] Japanese Unexamined Patent Application, First Publication No. H5-195149

Non-Patent Document

[Non-Patent Document 1] K. Sugimoto et al.: ISIJ int., (1993), 775.

DISCLOSURE OF THE INVENTION

Problems to be Solved by the Invention

The high strength steel sheets in the related art have excellent bendability but do not have good fatigue resistance.

The present invention has been made in view of the above circumstances, and an object thereof is to provide a steel sheet having good ductility and hole expansibility, and excellent fatigue resistance, bendability, and plating adhesion, a hot-dip galvanized steel sheet, and a method for manufacturing the same.

Means for Solving the Problem

The present inventors conducted extensive studies in order to solve the above problems.

As a result, it was found that by subjecting a hot-rolled steel sheet or a cold-rolled steel sheet having a predetermined chemical composition to two heat treatments (annealing) under different conditions, it is effective to cause the inside of the steel sheet to have a predetermined steel structure, to form a surface layer having a predetermined thickness and a steel structure, and to form an internal oxide layer containing Si oxides at a predetermined depth.

Specifically, by the first heat treatment, the steel sheet inside has a steel structure primarily containing a lath-like structure such as martensite, and the surface layer has a steel structure primarily containing soft ferrite. In addition, in the second heat treatment, a highest heating temperature is set to a dual phase region of $\alpha$ (ferrite) and $\gamma$ (austenite). As a result, in the steel sheet obtained after the two heat treatments and optional hot-dip galvanizing, the steel sheet inside has a steel structure in which acicular retained austenite is dispersed, and the surface layer has a complex structure primarily containing soft ferrite, containing a small amount of martensite and retained austenite dispersed therein, and having a predetermined thickness. Such a steel sheet and a hot-dip galvanized steel sheet have excellent ductility and hole expansibility, and have a good balance between bendability and fatigue resistance.

Furthermore, in the first and second heat treatments described above, oxidation of alloying elements such as Si contained in the steel outside the steel sheet is suppressed, and an internal oxide layer containing Si oxides at a predetermined depth is formed, whereby excellent chemical convertibility and plating adhesion are obtained.

The present invention has been made based on the above findings. The gist of the present invention is as follows.

(1) A steel sheet according to an aspect of the present invention includes, as a chemical composition, by mass %: C: 0.050% to 0.500%; Si: 0.01% to 3.00%; Mn: 0.50% to 5.00%; P: 0.0001% to 0.1000%; S: 0.0001% to 0.0100%; Al: 0.001% to 2.500%; N: 0.0001% to 0.0100%; O: 0.0001% to 0.0100%; Ti: 0% to 0.300%; V: 0% to 1.00%; Nb: 0% to 0.100%; Cr: 0% to 2.00%; Ni: 0% to 2.00%; Cu: 0% to 2.00%; Co: 0% to 2.00%; Mo: 0% to 1.00%; W: 0% to 1.00%; B: 0% to 0.0100%; Sn: 0% to 1.00%; Sb: 0% to 1.00%; Ca: 0% to 0.0100%; Mg: 0% to 0.0100%; Ce: 0% to 0.0100%; Zr: 0% to 0.0100%; La: 0% to 0.0100%; Hf: 0% to 0.0100%; Bi: 0% to 0.0100%; REM: 0% to 0.0100%; and a remainder consisting of Fe and impurities, in which a steel structure in a range from ⅛ thickness to ⅜ thickness centered on a ¼ thickness position from a surface contains, by volume fraction, soft ferrite: 0% to 30%, retained austenite: 3% to 40%, fresh martensite: 0% to 30%, a sum of pearlite and cementite: 0% to 10%, and a remainder including hard ferrite, in the range from ⅛ thickness to ⅜ thickness centered on the ¼ thickness position from the surface, a number proportion of retained austenite having an aspect ratio of 2.0 or more in the total retained austenite is 50% or more, when a region having a hardness that is 80% or less of a hardness of the range from ⅛ thickness to ⅜ thickness is defined as a soft layer, the soft layer having a thickness of 1 μm to 100 μm from the surface is present in a sheet thickness direction, among ferrite grains contained in the soft layer, a volume fraction of grains having an aspect ratio of less than 3.0 is 50% or more, a volume fraction of retained austenite in the soft layer is 50% or more of the volume fraction of the retained austenite in the range from ⅛ thickness to ⅜ thickness, and when an emission intensity at a wavelength indicating Si is analyzed in a direction from the surface toward the sheet thickness direction by a radio frequency glow discharge optical emission spectrometry method, a peak of the emission intensity at the wavelength indicating Si appears in a range of more than 0.2 μm from the surface to 5 μm or less from the surface.

(2) The steel sheet according to (1) may include, as the chemical composition, one or more selected from the group consisting of Ti: 0.001% to 0.300%, V: 0.001% to 1.00%, and Nb: 0.001% to 0.100%.

(3) The steel sheet according to (1) or (2) may include, as the chemical composition, one or more selected from the group consisting of Cr: 0.001% to 2.00%, Ni: 0.001% to 2.00%, Cu: 0.001% to 2.00%, Co: 0.001% to 2.00%, Mo: 0.001% to 1.00%, W: 0.001% to 1.00%, and B: 0.0001% to 0.0100%.

(4) The steel sheet according to any one of (1) to (3) may include, as the chemical composition, one or two selected from the group consisting of Sn: 0.001% to 1.00%, and Sb: 0.001% to 1.00%.

(5) The steel sheet according to any one of (1) to (4) may include, as the chemical composition, one or more selected from the group consisting of Ca: 0.0001% to 0.0100%, Mg: 0.0001% to 0.0100%, Ce: 0.0001% to 0.0100%, Zr: 0.0001% to 0.0100%, La: 0.0001% to 0.0100%, Hf: 0.0001% to 0.0100%, Bi: 0.0001% to 0.0100%, and REM: 0.0001% to 0.0100%.

(6) In the steel sheet according to any one of (1) to (5), the chemical composition may satisfy Expression (1).

$$Si+0.1\times Mn+0.6\times Al \geq 0.35 \quad (1)$$

in Expression (1), Si, Mn, and Al are respectively amounts of corresponding elements by mass %.

(7) In the steel sheet according to any one of (1) to (6), a volume fraction of tempered martensite in the range from ⅛ thickness to ⅜ thickness centered on the ¼ thickness position from the surface may be 0% to 50%.

(8) In the steel sheet according to any one of (1) to (7), the steel sheet may have a hot-dip galvanized layer on the surface.

(9) In the steel sheet according to any one of (1) to (7), the steel sheet may have an electrogalvanized layer on the surface.

(10) A method for manufacturing a steel sheet according to another aspect of the present invention is a method for manufacturing the steel sheet according to any one of (1) to (9), the method including: hot-rolling a slab having the chemical composition according to any one of (1) to (6); performing a first heat treatment satisfying (a) to (e) on a hot-rolled steel sheet which has been pickled, or on a cold-rolled steel sheet which has been obtained by cold-rolling the hot-rolled steel sheet, where (a) while heating from 650° C. to a highest heating temperature is performed, an atmosphere around the hot-rolled steel sheet or the cold-rolled steel sheet is set to an atmosphere containing 0.1 vol % or more of $H_2$ and satisfying Expression (2), (b) holding is performed at the highest heating temperature of $A_{c3}-30°$ C. to 1000° C. for 1 second to 1000 seconds, (c) heating from 650° C. to the highest heating temperature is performed at an average heating rate of 0.5° C./sec to 500° C./sec, (d) after performing holding at the highest heating temperature, cooling from 700° C. to Ms is performed at an average cooling rate of 5° C./sec or more, and (e) the cooling at the average cooling rate of 5° C./sec or more is performed until a cooling stop temperature of Ms or lower; and thereafter performing a second heat treatment satisfying (A) to (E), where (A) while heating from 650° C. to the highest heating temperature is performed, the atmosphere around the hot-rolled steel sheet or the cold-rolled steel sheet is set to an atmosphere containing 0.1 vol % or more of $H_2$ and satisfying Expression (3), (B) holding is performed at the highest heating temperature of $A_{c1}+25°$ C. to $A_{c3}-10°$ C. for 1 second to 1000 seconds, (C) heating from 650° C. to the highest heating temperature is performed at an average heating rate of 0.5° C./sec to 500° C./sec, (D) cooling from the highest heating temperature to 480° C. or lower is performed such that an average cooling rate between 600° C. and 700° C. is 3° C./sec or more, and (E) after performing cooling at the average cooling rate of 3° C./sec or more, holding is performed at 300° C. to 480° C. for 10 seconds or longer, $$-1.1 \leq \log(PH_2O/PH_2) \leq -0.07 \quad (2)$$

in Expression (2), $PH_2O$ represents a partial pressure of water vapor, and $PH_2$ represents a partial pressure of hydrogen, $$\log(PH_2O/PH_2)<-1.1 \quad (3)$$

in Expression (3), $PH_2O$ represents a partial pressure of water vapor, and $PH_2$ represents a partial pressure of hydrogen.

(11) The method for manufacturing the steel sheet according to (10) is a method for manufacturing the steel sheet according to (8), in which, in the second heat treatment, the atmosphere may always contain 0.1 vol % or more of $H_2$ and 0.020 vol % or less of $O_2$ and satisfy Expression (3) until a temperature reaches from 650° C. to the highest heating temperature, and in the second heat treatment, hot-dip galvanizing may be performed after the cooling in (D).

Effects of the Invention

According to the present invention, it is possible to provide a steel sheet having good ductility and hole expansibility, excellent fatigue resistance and bendability, and excellent plating adhesion, a hot-dip galvanized steel sheet, and a method for manufacturing the same.

The high strength steel sheet and the high strength hot-dip galvanized steel sheet of the present invention have good ductility and hole expansibility, and excellent fatigue resistance, bendability, and plating adhesion, and thus are suitable as steel sheets for a vehicle which are formed into various shapes by press working or the like.

EMBODIMENTS OF THE INVENTION

"Steel Sheet"

Figure 1:
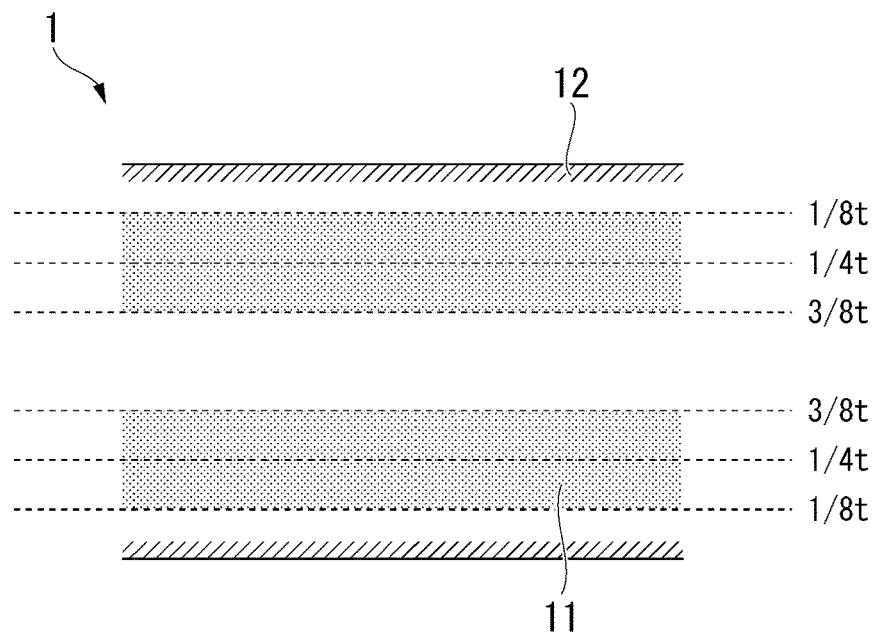
FIG. 1 is a cross-sectional view of a steel sheet of the present embodiment, which is parallel to a rolling direction and a sheet thickness direction.

A steel sheet 1 of the present embodiment illustrated in FIG. 1 includes a steel sheet inside 11 which is a range from ⅛ thickness to ⅜ thickness centered on a ¼ thickness position from the surface, and a soft layer 12 disposed on the surface of the steel sheet. The ¼ thickness position is a point at a depth of ¼ of the thickness t of the steel sheet from the surface of the steel sheet, and corresponds to a region denoted by reference numeral ¼t in FIG. 1. The range from ⅛ thickness to ⅜ thickness is a range between a region at a depth of ⅛ of the thickness t of the steel sheet and a region at a depth of ⅜ from the surface of the steel sheet, and a ⅛ thickness position and a ⅜ thickness position correspond to positions respectively denoted by reference numeral ⅛t and reference numeral ⅜t in FIG. 1. The soft layer 12 is a region having a hardness that is 80% or less of the hardness of the steel sheet inside 11 as will be described later. There are cases where the steel sheet 1 further includes a hot-dip galvanized layer, an electrogalvanized layer, and the like on the surface (that is, the surface of the soft layer 12). Hereinafter, the steel sheet of the present embodiment will be described in detail.

First, the chemical composition of the steel sheet will be described. In the following description, [%] indicating the amount of an element means [mass %].

"C: 0.050% to 0.500%"

C is an element that greatly increases strength. C causes retained austenite to be obtained by stabilizing austenite and is thus effective in achieving both strength and formability. However, when the C content exceeds 0.500%, weldability significantly deteriorates. Therefore, the C content is set to 0.500% or less. From the viewpoint of spot weldability, the C content is preferably 0.350% or less, and more preferably 0.300% or less, 0.250% or less, or 0.200% or less. On the other hand, when the C content is less than 0.050%, sufficient retained austenite cannot be obtained, and it becomes difficult to secure sufficient strength and formability. Therefore, the C content is set to 0.050% or more. In order to further enhance strength and formability, the C content is preferably 0.075% or more, and more preferably 0.100% or more, or 0.200%.

"Si: 0.01% to 3.00%"

Si is an element that stabilizes retained austenite by suppressing the generation of iron-based carbides in the steel sheet, and thus enhances strength and formability. However, Si is an element that makes a steel material brittle. When the Si content exceeds 3.00%, the hole expansibility of the steel sheet becomes insufficient. In addition, when the Si content exceeds 3.00%, problems such as cracking in a cast slab are likely to occur. Therefore, the Si content is set to 3.00% or less. Furthermore, since Si impairs the impact resistance of the steel sheet, the Si content is preferably 2.50% or less, and more preferably 2.00% or less, or 1.80% or less. On the other hand, when the Si content is less than 0.01%, a large amount of coarse iron-based carbide is generated, and the strength and formability deteriorate. Therefore, the Si content is set to 0.01% or more. From this viewpoint, the lower limit of Si is preferably 0.10%, and more preferably 0.25%, 0.30%, or 0.50%.

"Mn: 0.50% to 5.00%"

Mn is added in order to enhance the strength by enhancing the hardenability of the steel sheet. However, when the Mn content exceeds 5.00%, the elongation and hole expansibility of the steel sheet become insufficient. In addition, when the Mn content exceeds 5.00%, a coarse Mn-concentrated portion occurs at the sheet thickness center portion of the steel sheet, embrittlement easily occurs, and problems such as cracking in a cast slab are likely to occur. Therefore, the Mn content is set to 5.00% or less. In addition, since spot weldability deteriorates as the Mn content increases, the Mn content is preferably 3.50% or less, and more preferably 3.00% or less, or 2.80 or less. On the other hand, when the Mn content is less than 0.50%, a large amount of soft structure is formed during cooling after annealing, so that it becomes difficult to secure a sufficiently high tensile strength. Therefore, the Mn content needs to be 0.50% or more. In order to further increase the strength, the Mn content is preferably 0.80% or more, and more preferably 1.00% or more, or 1.50% or more.

"P: 0.0001% to 0.1000%"

P is an element that embrittles a steel material. When the P content exceeds 0.1000%, the elongation and hole expansibility of the steel sheet become insufficient. In addition, when the P content exceeds 0.1000%, problems such as cracking in a cast slab are likely to occur. Therefore, the P content is set to 0.1000% or less. Furthermore, P is an element that embrittles a melted portion produced by spot welding. In order to obtain a sufficient welded joint strength, the P content is set to preferably 0.0400% or less, and more preferably 0.3000% or less, or 0.0200% or less. On the other hand, setting the P content to less than 0.0001% causes a significant increase in manufacturing cost. From this, the P content is set to 0.0001% or more. The P content is preferably set to 0.0010% or more, 0.0012%, or 0.0015% or more.

"S: 0.0001% to 0.0100%"

S is an element which is bonded to Mn to form coarse MnS and reduces formability such as ductility, hole expansibility (stretch flangeability), and bendability. Therefore, the upper limit of S is set to 0.0100% or less. In addition, S deteriorates spot weldability, and is thus set to preferably 0.0070% or less, and more preferably 0.0050% or less, or 0.0030% or less. On the other hand, setting the S content to less than 0.0001% causes a significant increase in manufacturing cost. Therefore, the Si content is set to 0.0001% or more. The S content is set to preferably 0.0003% or more, and more preferably 0.0006% or more, or 0.0010% or more.

"Al: 0.001% to 2.500%"

Al is an element that embrittles a steel material. When the Al content exceeds 2.500%, problems such as cracking in a cast slab are likely to occur. Therefore, the Al content is set to 2.500% or less. As the Al content increases, spot weldability deteriorates. Therefore, the Al content is set to more preferably 2.000% or less, and even more preferably 1.500% or less, or 1.000% or less. On the other hand, although the effect of the steel sheet according to the present embodiment are exhibited even if the lower limit of the Al content is not particularly specified, Al is an impurity that is present in a trace amount in the raw material, and setting the Al content to less than 0.001% causes a significant increase in manufacturing cost. Therefore, the Al content is set to 0.001% or more. Al is also an element effective as a deoxidizing agent, and in order to obtain a sufficient deoxidizing effect, the Al content is preferably set to 0.010% or more. Furthermore, Al is an element that suppresses the generation of coarse carbides, and may be added for the purpose of stabilizing retained austenite. In order to stabilize the retained austenite, the Al content is set to preferably 0.100% or more, and more preferably 0.250% or more.

"N: 0.0001% to 0.0100%"

N forms coarse nitrides and deteriorates formability such as ductility, hole expansibility (stretch flangeability), and bendability. Therefore, it is necessary to suppress the addition amount thereof. When the N content exceeds 0.0100%, the deterioration of the formability is significant. From this, the upper limit of the N content is set to 0.0100%. In addition, since N causes the generation of blowholes during welding, the N content may be small. The N content is preferably 0.0075% or less, and more preferably 0.0060% or less, or 0.0050% or less. The effect of the steel sheet according to the present embodiment is exhibited even if the lower limit of the N content is not particularly specified. However, setting the N content to less than 0.0001% causes a significant increase in manufacturing cost. From this, the lower limit of the N content is set to 0.0001% or more. The N content is preferably 0.0003% or more, and more preferably 0.0005% or more, or 0.0010% or more.

"O: 0.0001% to 0.0100%"

O forms oxides and deteriorates formability such as ductility, hole expansibility (stretch flangeability), and bendability. Therefore, it is necessary to suppress the O content. When the O content exceeds 0.0100%, the deterioration of the formability is significant. Therefore, the upper limit of the O content is set to 0.0100%. Furthermore, the O content is preferably 0.0050% or less, and more preferably 0.0030% or less, or 0.0020% or less. The effect of the steel sheet according to the present embodiment is exhibited even if the lower limit of the O content is not particularly specified. However, setting the O content to less than 0.0001% causes a significant increase in manufacturing cost. Therefore, the lower limit thereof is set to 0.0001%. The O content may be set to 0.0005% or more, 0.0010% or more, or 0.0012% or more.

"Si+0.1×Mn+0.6×Al≥0.35"

There is concern that retained austenite may be decomposed into bainite, pearlite, or coarse cementite during a heat treatment. Si, Mn, and Al are elements that are particularly important for suppressing the decomposition of retained austenite and enhancing formability, and preferably satisfy Expression (1). The value on the left side of Expression (1) is more preferably 0.60 or more, and even more preferably 0.80 or more, or 1.00 or more.

$$Si+0.1\times Mn+0.6\times Al\geq 0.35 \quad (1)$$

(Si, Mn, and Al in Expression (1) are respectively the amounts of the corresponding elements by mass %)

The steel sheet of the present embodiment may further contain one or more of the following optional elements as necessary. However, since the steel sheet according to the present embodiment can solve the problem without containing the following optional elements, the amounts of the following optional elements may be 0%.

"Ti: 0% to 0.300%"

Ti is an element that contributes to an increase in the strength of the steel sheet by strengthening with precipitates, grain refinement strengthening by suppressing the growth of ferrite grains, and dislocation strengthening by suppressing recrystallization. However, when the Ti content exceeds 0.300%, the precipitation of carbonitrides increases and the formability deteriorates. Therefore, the Ti content is preferably 0.300% or less. In addition, from the viewpoint of formability, the Ti content is more preferably 0.150% or less. The effect of the steel sheet according to the present embodiment is exhibited even if the lower limit of the Ti content is not particularly specified. However, in order to sufficiently obtain the strength increasing effect by Ti, the Ti content is preferably 0.001% or more. For further high-strengthening of the steel sheet, the Ti content is more preferably 0.010% or more.

"V: 0% to 1.00%"

V is an element that contributes to an increase in the strength of the steel sheet by precipitate strengthening, grain refinement strengthening by suppressing the growth of ferrite grains, and dislocation strengthening by suppressing recrystallization. However, when the V content exceeds 1.00%, carbonitrides are excessively precipitated and the formability deteriorates. Therefore, the V content is preferably 1.00% or less, and more preferably 0.50% or less. The effect of the steel sheet according to the present embodiment is exhibited even if the lower limit of the V content is not particularly specified. However, in order to sufficiently obtain the strength increasing effect by V, the V content is preferably 0.001% or more, and more preferably 0.010% or more.

"Nb: 0% to 0.100%"

Nb is an element that contributes to an increase in the strength of the steel sheet by precipitate strengthening, grain refinement strengthening by suppressing the growth of ferrite grains, and dislocation strengthening by suppressing recrystallization. However, when the Nb content exceeds 0.100%, the precipitation of carbonitrides increases and the formability deteriorates. Therefore, the Nb content is preferably 0.100% or less. From the viewpoint of formability, the Nb content is more preferably 0.060% or less. The effect of the steel sheet according to the present embodiment is exhibited even if the lower limit of the Nb content is not particularly specified. However, in order to sufficiently obtain the strength increasing effect by Nb, the Nb content is preferably 0.001% or more. For further high-strengthening of the steel sheet, the Nb content is more preferably 0.005% or more.

"Cr: 0% to 2.00%"

Cr is an element effective in high-strengthening by enhancing hardenability, may be added instead of part of C and/or Mn. When the Cr content exceeds 2.00%, hot workability is impaired and productivity decreases. From this, the Cr content is set to preferably 2.00% or less, and more preferably 1.20% or less. The effect of the steel sheet according to the present embodiment is exhibited even if the lower limit of the Cr content is not particularly specified. However, in order to sufficiently obtain the high-strengthening effect by Cr, the Cr content is preferably 0.001% or more, and more preferably 0.010% or more.

"Ni: 0% to 2.00%"

Ni is an element effective in high-strengthening by suppressing phase transformation at a high temperature and may be added instead of part of C and/or Mn. When the Ni content exceeds 2.00%, the weldability is impaired. From this, the Ni content is set to preferably 2.00% or less, and more preferably 1.20% or less. The effect of the steel sheet according to the present embodiment is exhibited even if the lower limit of the Ni content is not particularly specified. However, in order to sufficiently obtain the high-strengthening effect by the addition of Ni, the Ni content is preferably 0.001% or more, and more preferably 0.010% or more.

"Cu: 0% to 2.00%"

Cu is an element that enhances the strength by being present in the steel as fine particles, and can be added instead of part of C and/or Mn. When the Cu content exceeds 2.00%, the weldability is impaired. Therefore, the Cu content is set to preferably 2.00% or less, and more preferably 1.20% or less. The effect of the steel sheet according to the present embodiment is exhibited even if the lower limit of the Cu content is not particularly specified. However, in order to sufficiently obtain the high-strengthening effect by the addition of Cu, the Cu content is preferably 0.001% or more, and more preferably 0.010% or more.

"Co: 0% to 2.00%"

Co is an element effective in high-strengthening by enhancing hardenability, may be added instead of part of C and/or Mn. When the Co content exceeds 2.00%, the hot workability is impaired and the productivity decreases. From this, the Co content is preferably 2.00% or less, and more preferably 1.20% or less. The effect of the steel sheet according to the present embodiment is exhibited even if the lower limit of the Co content is not particularly specified. However, in order to sufficiently obtain the high-strengthening effect by the addition of Co, the Co content is preferably 0.001% or more, and more preferably 0.010% or more.

"Mo: 0% to 1.00%"

Mo is an element effective in high-strengthening by suppressing phase transformation at a high temperature and may be added instead of part of C and/or Mn. When the Mo content exceeds 1.00%, the hot workability is impaired and the productivity decreases. From this, the Mo content is set to preferably 1.00% or less, and more preferably 0.50% or less. The effect of the steel sheet according to the present embodiment is exhibited even if the lower limit of the Mo content is not particularly specified. However, in order to sufficiently obtain the high-strengthening effect by the addition of Mo, the Mo content is preferably 0.001% or more, and more preferably 0.005% or more.

"W: 0% to 1.00%"

W is an element effective in high-strengthening by suppressing phase transformation at a high temperature and may be added instead of part of C and/or Mn. When the W content exceeds 1.00%, the hot workability is impaired and the productivity decreases. From this, the W content is preferably 1.00% or less, and more preferably 0.50% or less. The effect of the steel sheet according to the present embodiment is exhibited even if the lower limit of the W content is not particularly specified. However, in order to sufficiently obtain the high-strengthening effect by W, the W content is preferably 0.001% or more, and more preferably 0.010% or more.

"B: 0% to 0.0100%"

B is an element effective in high-strengthening by suppressing phase transformation at a high temperature and may be added instead of part of C and/or Mn. When the B content exceeds 0.0100%, the hot workability is impaired and the productivity decreases. Therefore, the B content is preferably set to 0.0100% or less. From the viewpoint of productivity, the B content is more preferably 0.0050% or less. The effect of the steel sheet according to the present embodiment is exhibited even if the lower limit of the B content is not particularly specified. However, in order to sufficiently obtain the high-strengthening effect by the addition of B, the B content is preferably set to 0.0001% or more. For further high-strengthening, the B content is more preferably 0.0005% or more.

"Sn: 0% to 1.00%"

Sn is an element effective in high-strengthening by suppressing the coarsening of the structure, and may be added in an amount of 1.00% as the upper limit. When the addition amount of Sn exceeds 1.00%, the steel sheet may be excessively embrittled and the steel sheet may fracture during rolling. Therefore, the Sn content is preferably 1.00% or less. The effect of the steel sheet according to the present embodiment is exhibited without particularly specifying the lower limit of the Sn content. However, in order to sufficiently obtain the high-strengthening effect by Sn, the Sn content is preferably 0.001% or more, and more preferably 0.010% or more.

"Sb: 0% to 1.00%"

Sb is an element effective in high-strengthening by suppressing the coarsening of the structure, and may be added in an amount of 1.00% as the upper limit. When the addition amount of Sb exceeds 1.00%, the steel sheet may be excessively embrittled and the steel sheet may fracture during rolling. Therefore, the Sb content is preferably 1.00% or less. The effect of the steel sheet according to the present embodiment is exhibited without particularly specifying the lower limit of the Sb content. However, in order to sufficiently obtain the high-strengthening effect by Sb, the Sb content is preferably 0.001% or more, and more preferably 0.005% or more.

"One or More Selected from Group Consisting of Ca, Mg, Ce, Zr, La, Hf, Bi and REM: 0% to 0.0100% Each"

REM is an abbreviation for rare earth metals, and typically refers to elements belonging to the lanthanoid series. However, in the present embodiment, REM excludes Ce and La. In the present embodiment, La and/or Ce are often added as mischmetal, and there are cases where elements in the lanthanoid series other than La and/or Ce are contained in a composite form. The effect of the steel sheet according to the present embodiment is exhibited even if the elements in the lanthanoid series other than La and/or Ce are included as impurities. Furthermore, the effect of the steel sheet according to the present embodiment is exhibited even if the metal La and/or Ce is added. In the present embodiment, the REM content is the total value of the amounts of elements belonging to the lanthanoid series.

The effects of these elements are as follows.

Ca, Mg, Ce, Zr, La, Hf, Bi, and REM are elements effective in improving formability, and one or more thereof may be contained each in 0.0001% to 0.0100%. When the amounts of one or more of Ca, Mg, Ce, Zr, La, Hf, Bi, and REM each exceed 0.0100%, there is concern that the ductility may be impaired. Therefore, the amount of each of the elements is preferably 0.0100% or less, and more preferably 0.0070% or less. In a case where two or more of the above elements are contained, the total amount of Ca, Mg, Ce, Zr, La, Hf, Bi, and REM is preferably set to 0.0100% or less. The effect of the steel sheet according to the present embodiment is exhibited even if the lower limit of the amount of each of the elements is not particularly specified. However, in order to sufficiently obtain the effect of improving the formability of the steel sheet, the amount of each of the elements is 0.0001% or more. From the viewpoint of formability, the amount of one or more of Ca, Mg, Ce, Zr, La, Hf, Bi, and REM is more preferably 0.0010% or more.

The remainder from the above elements consists of Fe and impurities. Including any of Ti, V, Nb, Cr, Ni, Cu, Co, Mo, W, B, Sn, and Sb mentioned above in a trace amount less than the preferable lower limit is allowed.

In addition, including Ca, Mg, Ce, Zr, La, Hf, Bi, and REM as impurities in trace amounts lower than the lower limits is also allowed.

Furthermore, including H, Na, Cl, Sc, Zn, Ga, Ge, As, Se, Y, Tc, Ru, Rh, Pd, Ag, Cd, In, Te, Cs, Ta, Re, Os, Ir, Pt, Au, and Pb as impurities in a total amount of 0.0100% or less is allowed.

Next, the steel structure (microstructure) of the steel sheet inside 11 of the steel sheet according to the present embodiment will be described. In addition, [%] in the description of the amount of each structure is [vol %].

(Microstructure of Steel Sheet Inside 11)

In the steel sheet according to the present embodiment, the steel structure (hereinafter, sometimes referred to as "steel structure of the steel sheet inside") in the range from ⅛ thickness to ⅜ thickness centered on the ¼ thickness position from the surface contains 30% or less of soft ferrite, 3% to 40% of retained austenite, 30% or less of fresh martensite, and 10% or less of the sum of pearlite and cementite, and the number proportion of the retained austenite having an aspect ratio of 2.0 or more in the total retained austenite is 50% or more.

"Soft Ferrite: 0% to 30%"

Ferrite is a structure having excellent ductility. However, ferrite has low strength and is thus a structure that is difficult to be utilized in a high strength steel sheet. In the steel sheet of the present embodiment, the steel structure of the steel sheet inside contains 0% to 30% of soft ferrite. The "soft ferrite" in the present embodiment means a ferrite that does not contain retained austenite in the grains. The soft ferrite has low strength, and strain is more likely to be concentrated and fracture is more likely to occur than in the peripheral portions. When the volume fraction of the soft ferrite exceeds 30%, the balance between strength and formability deteriorates significantly. Therefore, the soft ferrite is limited to 30% or less. The soft ferrite is more preferably limited to 15% or less, and may be 0%.

"Retained Austenite: 3% to 40%"

Retained austenite is a structure that enhances the balance between strength and ductility. In the steel sheet according to the present embodiment, the steel structure of the steel sheet inside contains 3% to 40% of retained austenite. From the viewpoint of formability, the volume fraction of the retained austenite of the steel sheet inside is set to preferably 3% or more, more preferably 5% or more, and even more preferably 7% or more. On the other hand, in order to cause the volume fraction of the retained austenite to exceed 40%, it is necessary to add a large amount of C, Mn, and/or Ni, and the weldability is significantly impaired. Therefore, the volume fraction of the retained austenite is set to 40% or less. In order to improve the weldability and the convenience of the steel sheet, the volume fraction of the retained austenite is set to preferably 30% or less, and more preferably 20% or less.

"Fresh Martensite: 0% to 30%"

Fresh martensite greatly improves tensile strength. On the other hand, fresh martensite becomes the origin of fracture and significantly deteriorates impact resistance. Therefore, the volume fraction of the fresh martensite is set to 30% or less. In particular, in order to improve impact resistance, the volume fraction of the fresh martensite is set to preferably 15% or less, and more preferably 7% or less. The fresh martensite may be 0%, but is preferably 2% or more in order to secure the strength of the steel sheet.

"Sum of Pearlite and Cementite: 0% to 10%"

The microstructure of the steel sheet inside of the steel sheet may contain pearlite and/or cementite. However, when the volume fraction of the pearlite and/or cementite is high, the ductility deteriorates. Therefore, the total volume fraction of the pearlite and/or cementite is limited to 10% or less. The volume fraction of the pearlite and/or cementite is preferably 5% or less, and may be 0%.

"Number Proportion of Retained Austenite Having Aspect Ratio of 2.0 or More is 50% or More of Total Retained Austenite"

In the present embodiment, the aspect ratio of retained austenite grains in the steel sheet inside is important. Retained austenite having a large aspect ratio, that is, stretched retained austenite is stable in the early stage of deformation of the steel sheet due to working. However, in the retained austenite having a large aspect ratio, strain is concentrated at the tip end portion as the working progresses, and the retained austenite is appropriately transformed to cause the transformation-induced plasticity (TRIP) effect. Therefore, the steel structure of the steel sheet inside contains the retained austenite having a large aspect ratio, whereby the ductility can be improved without impairing the toughness, hydrogen embrittlement resistance, hole expansibility, and the like. From the above viewpoint, in the present embodiment, the number proportion of the retained austenite having an aspect ratio of 2.0 or more in the total retained austenite is set to 50% or more. The number proportion of the retained austenite having an aspect ratio of 2.0 or more is preferably 60% or more, more preferably 70% or more, and particularly preferably 80% or more.

"Tempered Martensite"

Tempered martensite is a structure that greatly improves the tensile strength of the steel sheet without impairing the impact resistance, and may be contained in the steel structure of the steel sheet inside. However, when a large amount of tempered martensite is generated in the steel sheet inside, there may be cases where retained austenite is not sufficiently obtained. Therefore, the volume fraction of tempered martensite is preferably limited to 50% or less or 30% or less. Since including the tempered martensite is not essential for the steel sheet according to the present embodiment, the lower limit of tempered martensite is 0%.

In the steel sheet according to the present embodiment, the residual structure in the steel structure of the steel sheet inside primarily contains "hard ferrite" containing retained austenite in the grains. The hard ferrite is formed by subjecting a steel sheet for a heat treatment having a steel structure including a lath-like structure including one or more of upper bainite, bainitic ferrite, tempered martensite, and fresh martensite to a second heat treatment, which will be described later. Hard ferrite contains retained austenite in the grains and thus has high strength. In addition, hard ferrite is less likely to cause interfacial delamination between ferrite and the retained austenite compared to a case where retained austenite is present in ferrite grain boundaries, and thus has good formability.

Furthermore, the residual structure in the steel structure of the steel sheet inside may contain bainite. The bainite in the present embodiment includes granular bainite composed of fine BCC crystals and coarse iron-based carbides, upper bainite composed of lath-like BCC crystals and coarse iron-based carbides, and lower bainite composed of plate-like BCC crystals and fine iron-based carbides arranged in parallel therein. In the steel sheet according to the present embodiment, the residual structure in the steel structure of the steel sheet inside is primarily hard ferrite. That is, the residual structure in the steel structure of the steel sheet inside contains more hard ferrite than bainite.

(Microstructure of Surface Layer)

"When Region Having Hardness that is 80% or Less of Hardness of Range from ⅛ Thickness to ⅜ Thickness is Defined as Soft Layer, Soft Layer of 1 µm to 100 µm is Present on Surface Layer"

In order to improve the bendability of the steel sheet, softening the surface layer of the steel sheet is one of the requirements. In the steel sheet according to the present embodiment, when a region having a hardness that is 80% or less of the hardness (average hardness) of the steel sheet inside is defined as a soft layer, a soft layer of 1 µm to 100 µm from the surface is present in a sheet thickness direction. In other words, a soft layer having a hardness that is 80% or less of the average hardness of the steel sheet inside is present in the surface layer portion of the steel sheet, and the thickness of the soft layer is 1 µm to 100 µm.

When the thickness of the soft layer is less than 1 µm in a depth direction (sheet thickness direction) from the surface, sufficient bendability cannot be obtained. The thickness (depth range from the surface) of the soft layer is preferably 5 µm or more, and more preferably 10 µm or more.

On the other hand, when the thickness of the soft layer exceeds 100 µm, the strength of the steel sheet is significantly reduced. Therefore, the thickness of the soft layer is set to 100 µm or less. The thickness of the soft layer is preferably 70 µm or less.

"Volume Fraction of Grains Having Aspect Ratio of Less than 3.0 Among Ferrite Grains Contained in Soft Layer is 50% or More"

When the volume fraction of grains having an aspect ratio of less than 3.0 among the ferrite grains contained in the soft layer (the ratio of ferrite grains having an aspect ratio of less than 3.0 to the volume fraction of all ferrite grains in the soft layer) is less than 50%, the bendability deteriorates. Therefore, the volume fraction of grains having an aspect ratio of less than 3.0 among the ferrite contained in the soft layer is set to 50% or more. The volume fraction thereof is preferably 60% or more, and more preferably 70% or more. The ferrite contained in the soft layer includes both the hard ferrite and the soft ferrite described above.

[Volume Fraction of Retained Austenite in Soft Layer is 50% or More of Volume Fraction of Retained Austenite in Steel Sheet Inside]

The retained austenite contained in the soft layer improves the fatigue strength of the steel sheet by suppressing the propagation of fatigue cracks. Therefore, the volume fraction of the retained austenite contained in the soft layer is set to 50% or more of the volume fraction of the retained austenite in the steel sheet inside. More preferably, the volume fraction of the retained austenite contained in the soft layer is 60% or more, 70% or more, or 80% or more of the volume fraction of the retained austenite in the steel sheet inside. The area ratio of the retained austenite in the steel sheet inside means the area ratio of the retained austenite contained in the range from ⅛ thickness to ⅜ thickness centered on the ¼ thickness position of the sheet thickness of the steel sheet from the surface.

"Internal Oxide Layer Containing Si Oxides"

When the steel sheet of the present embodiment is analyzed by the Radio Frequency Glow Discharge Optical Emission Spectroscopy (radio frequency GDS) method in the depth direction (sheet thickness direction) from the surface, a peak of the emission intensity at the wavelength indicating Si appears in a range of more than 0.2 µm from the surface to 5 µm or less from the surface. This indicates that the steel sheet is internally oxidized and an internal oxide layer containing Si oxides is provided in a range of more than 0.2 µm from the surface of the steel sheet to 5 µm or less from the surface. In the steel sheet having the internal oxide layer, the generation of an oxide film such as Si oxides on the steel sheet surface due to heat treatments during manufacturing is suppressed. Therefore, the steel sheet having such an internal oxide layer has excellent chemical convertibility and plating adhesion.

The steel sheet according to the present embodiment may have a peak of the emission intensity at the wavelength indicating Si in both the range of more than 0.2 µm to 5 µm or less from the surface and a range of 0 µm to 0.2 µm (a region shallower than a depth of 0.2 µm) from the surface when analyzed by the radio frequency glow discharge optical emission spectrometry method in the depth direction from the surface. Having a peak in both ranges indicates that the steel sheet has the internal oxide layer and an external oxide layer containing Si oxides on the surface.

Figure 2:
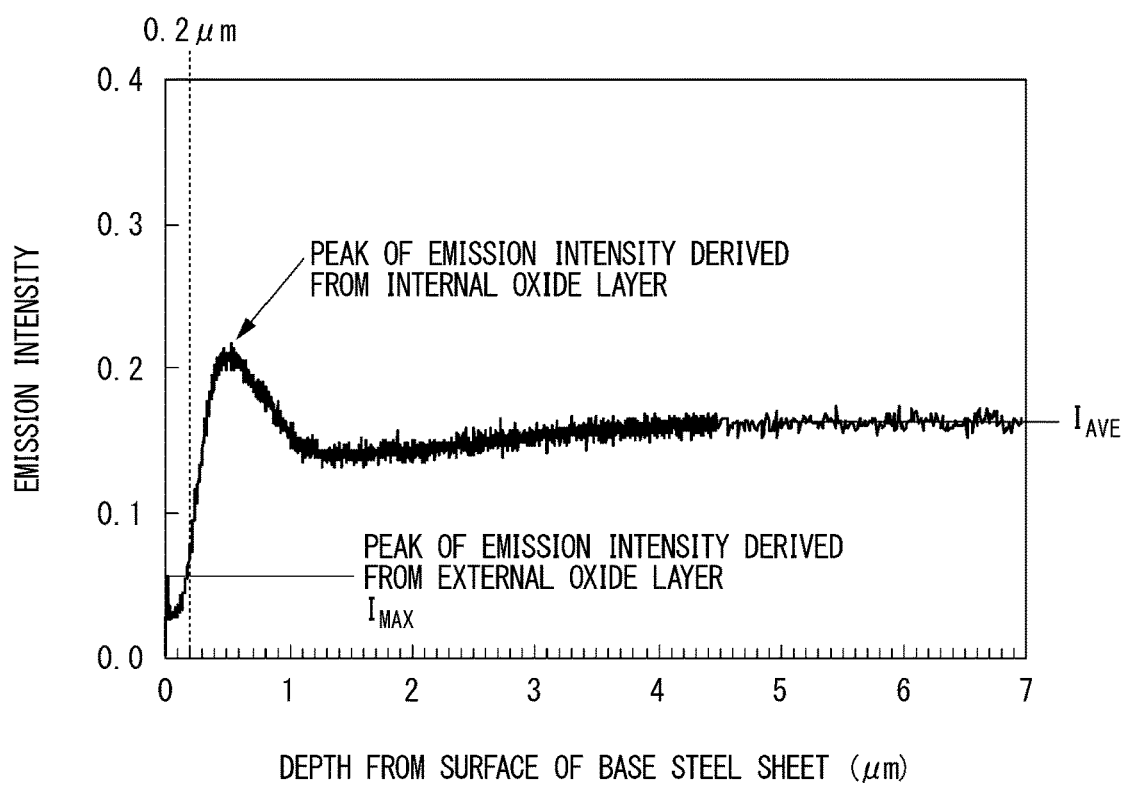
FIG. 2 is a graph showing a relationship between a depth from a surface and an emission intensity at a wavelength indicating Si when the steel sheet of the present embodiment is analyzed by a radio frequency glow discharge optical emission spectrometry method in a depth direction (sheet thickness direction) from the surface.

FIG. 2 is a graph showing the relationship between the depth from the surface and the emission intensity at the wavelength indicating Si when the steel sheet of the present embodiment is analyzed by the radio frequency glow discharge optical emission spectrometry method in the depth direction from the surface. In the steel sheet of the present embodiment shown in FIG. 2, a peak of the emission intensity at the wavelength indicating Si (derived from the internal oxide layer) appears in the range of more than 0.2 μm to 5 μm or less from the surface. In addition, a peak of the emission intensity at the wavelength indicating Si (derived from the external oxide layer ($I_{MAX}$)) appears also in the range of 0 (outermost surface) to 0.2 μm from the surface. Therefore, it can be seen that the steel sheet shown in FIG. 2 has the internal oxide layer and the external oxide layer.

Figure 3:
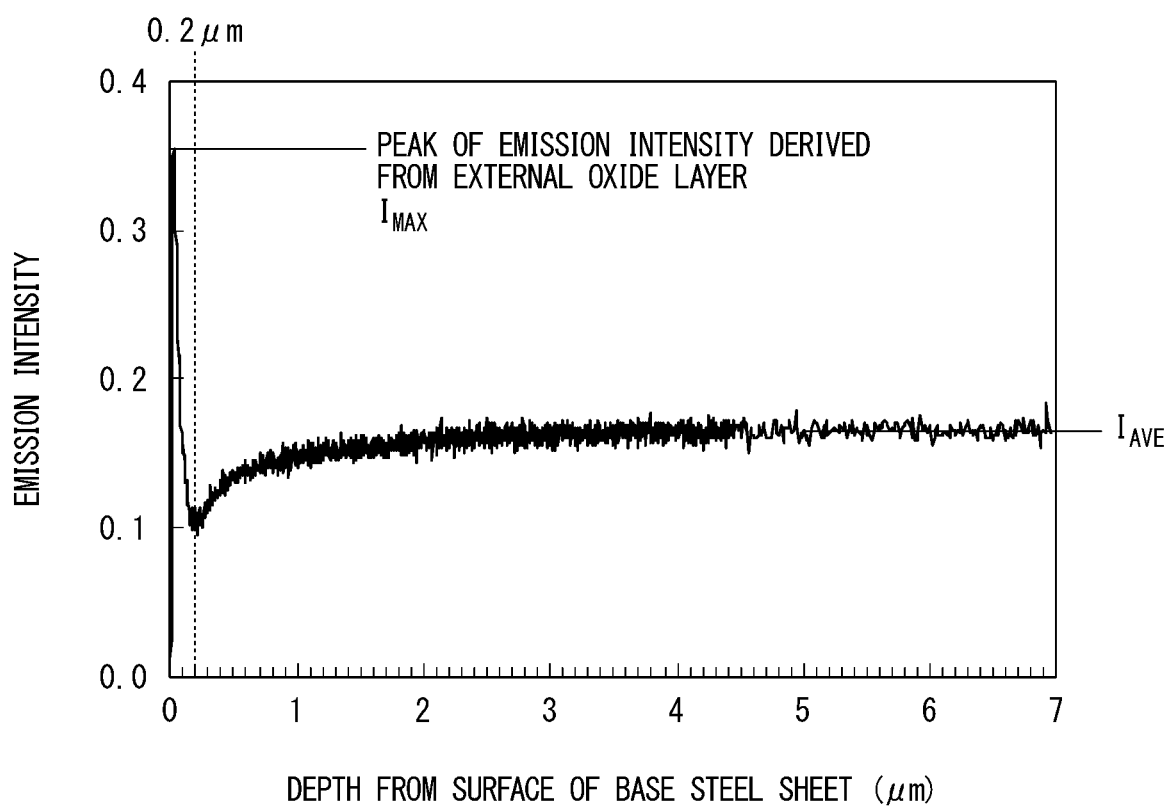
FIG. 3 is a graph showing a relationship between a depth from a surface and an emission intensity at a wavelength indicating Si when a steel sheet different from the present embodiment is analyzed by the radio frequency glow discharge optical emission spectrometry method in a depth direction (sheet thickness direction) from the surface.

FIG. 3 is a graph showing the relationship between the depth from the surface and the emission intensity at the wavelength indicating Si when a steel sheet different from the present embodiment is analyzed by the radio frequency glow discharge optical emission spectrometry method in the depth direction from the surface. In the steel sheet shown in FIG. 3, a peak of the emission intensity at the wavelength indicating Si appears in the range of 0 (outermost surface) to 0.2 μm from the surface, but does not appear in the range of more than 0.2 μm to 5 μm or less. This means that the steel sheet does not have an internal oxide layer but has only an external oxide layer.

"Hot-Dip Galvanized Layer"

The steel sheet of the present embodiment may have a hot-dip galvanized layer formed on its surface (both sides or one surface) (hereinafter, the steel sheet according to the present embodiment having hot-dip galvanizing is referred to as "hot-dip galvanized steel sheet according to the present embodiment"). The hot-dip galvanized layer may be a hot-dip galvannealed layer obtained by alloying the hot-dip galvanized layer.

In a case where the hot-dip galvanized layer is not alloyed, the iron content in the hot-dip galvanized layer is preferably less than 7.0 mass %. In a case where the hot-dip galvanized layer is a hot-dip galvannealed layer which is alloyed, the iron content is preferably 6.0 mass % or more. The hot-dip galvannealed steel sheet has better weldability than the hot-dip galvanized steel sheet.

The plating adhesion amount of the hot-dip galvanized layer is not particularly limited, but from the viewpoint of corrosion resistance, is preferably 5 g/m² or more per side, more preferably in a range of 20 to 120 g/m², and even more preferably in a range of 25 to 75 g/m².

The hot-dip galvanized steel sheet of the present embodiment may be provided with an upper layer plated layer on the hot-dip galvanized layer for the purpose of improving coatability, weldability, and the like. Furthermore, in the hot-dip galvanized steel sheet of the present embodiment, the hot-dip galvanized layer may be subjected to various treatments such as a chromate treatment, a phosphate treatment, a lubricity improvement treatment, and a weldability improvement treatment.

"Electrogalvanized Layer"

An electrogalvanized layer may be formed on the surface of the steel sheet of the present embodiment. The electrogalvanized layer can be formed by a known method.

"Steel Sheet for Heat Treatment"

A steel sheet for a heat treatment which is used as a material of the steel sheet of the present embodiment (referred to as "steel sheet for a heat treatment of the present embodiment") will be described below.

Specifically, the steel sheet for a heat treatment of the present embodiment has any chemical compositions in the above steel sheet and has a steel structure (microstructure) described below. In addition, [%] in the description of the amount of each structure is [vol %].

(Microstructure of Inside of Steel Sheet for Heat Treatment)

"Lath-Like Structure in Volume Fraction of 70% or More in Total"

In the steel sheet for a heat treatment of the present embodiment, the steel structure (the steel structure of the inside of the steel sheet for a heat treatment) in the range from ⅛ thickness to ⅜ thickness centered on the ¼ thickness position from the surface contains a lath-like structure including one or more of upper bainite, bainitic ferrite, tempered martensite, and fresh martensite in a volume fraction of 70% or more in total.

By causing the steel sheet for a heat treatment to include the lath-like structure in a volume fraction of 70% or more in total, in the steel sheet obtained by subjecting the steel sheet for a heat treatment to the second heat treatment described later, the steel structure of the inside of the steel sheet for a heat treatment primarily contains hard ferrite. When the total volume fraction of the lath-like structure in the steel sheet for a heat treatment is less than 70%, in the steel sheet obtained by subjecting the steel sheet for a heat treatment to the second heat treatment, the steel structure of the steel sheet inside contains a large amount of soft ferrite. As a result, the steel sheet of the present embodiment cannot be obtained. The steel structure of the inside of the steel sheet for a heat treatment in the steel sheet for a heat treatment contains the lath-like structure preferably in a volume fraction of 80% or more in total, and more preferably 90% or more in total, and may be 100%.

"Number Density of Retained Austenite Grains Having Aspect Ratio of Less than 1.3 and Major Axis of More than 2.5 μm in Steel Sheet for Heat Treatment"

The steel structure of the inside the steel sheet for a heat treatment of the present embodiment contains retained austenite in addition to the above-mentioned lath-like structure, and has a number density of retained austenite grains having an aspect ratio of less than 1.3 and a major axis of more than 2.5 μm limited to $1.0 \times 10^{-2}/\mu m^2$ or less.

When the retained austenite present in the steel structure of the inside of the steel sheet for a heat treatment is in the form of coarse lumps, coarse lump-like retained austenite grains are present in the steel sheet inside of the steel sheet obtained by subjecting the steel sheet for a heat treatment to the second heat treatment, and retained austenite having an aspect ratio of 2.0 or more cannot be sufficiently secured in some cases. Therefore, in the steel sheet for a heat treatment, the number density of coarse lump-like retained austenite grains having an aspect ratio of less than 1.3 and a major axis of more than 2.5 μm is set to $1.0 \times 10^{-2}/\mu m^2$ or less. The number density of coarse lump-like retained austenite grains in the steel sheet for a heat treatment is preferably as low as possible, and is preferably $0.5 \times 10^{-2}/\mu m^2$ or less.

When the retained austenite is excessively present inside the steel sheet for a heat treatment, the retained austenite partially becomes isotropic by subjecting the steel sheet for a heat treatment to the second heat treatment described later. As a result, there are cases where retained austenite having an aspect ratio of 2.0 or more cannot be sufficiently secured in the steel sheet inside of the steel sheet obtained after the second heat treatment. Therefore, it is preferable that the volume fraction of the retained austenite contained in the steel structure of the inside of the steel sheet for a heat treatment is preferably 10% or less.

(Microstructure of Surface Layer of Steel Sheet for Heat Treatment)

"Soft Layer Containing Soft Ferrite in Volume Fraction of 80% or More"

In the steel sheet for a heat treatment which is to be the material of the steel sheet according to the present embodiment, a surface layer including a soft layer containing soft ferrite having a volume fraction of 80% or more is formed. In the steel sheet for a heat treatment, the thickness of the soft layer is set to 1 μm to 50 μm. When the thickness of the soft layer in the steel sheet for a heat treatment is less than 1 μm from the surface in the depth direction, the thickness (depth range from the surface) of the soft layer formed in the steel sheet obtained by subjecting the steel sheet for a heat treatment to the second heat treatment is insufficient. On the other hand, when the thickness of the soft layer in the steel sheet for a heat treatment exceeds 50 μm in the depth direction from the surface, the thickness (depth range from the surface) of the soft layer formed in the steel sheet obtained by subjecting the steel sheet for a heat treatment to the second heat treatment becomes excessive, and a decrease in the strength of the steel sheet due to having the soft layer becomes apparent. Therefore, the thickness of the soft layer in the steel sheet for a heat treatment is preferably set to 50 μm or less, and 10 μm or less.

"Internal Oxide Layer Containing Si Oxides"

When the steel sheet for a heat treatment of the present embodiment is analyzed by the Radio Frequency Glow Discharge Optical Emission Spectroscopy (radio frequency GDS) method in the depth direction from the surface, a peak of the emission intensity at the wavelength indicating Si appears in a range of more than 0.2 μm to 5 μm or less from the surface. This indicates that the steel sheet for a heat treatment is internally oxidized and an internal oxide layer containing Si oxides is provided in a range of more than 0.2 μm to 5 μm or less from the surface. In the steel sheet for a heat treatment having the internal oxide layer at the above depth, the generation of an oxide film such as Si oxides on the steel sheet surface due to the heat treatment during manufacturing is suppressed.

The steel sheet for a heat treatment of the present embodiment may have a peak of the emission intensity at the wavelength indicating Si in both the range of more than 0.2 μm to 5 μm or less from the surface and a range of 0 μm to 0.2 μm (a region shallower than a depth of 0.2 μm) from the surface when analyzed by the radio frequency glow discharge optical emission spectrometry method in the depth direction from the surface. This indicates that the steel sheet for a heat treatment has the internal oxide layer and an external oxide layer containing Si oxides on the surface.

"Method for Manufacturing Steel Sheet According to Present Embodiment"

Next, a method for manufacturing the steel sheet of the present embodiment will be described.

Figure 4:
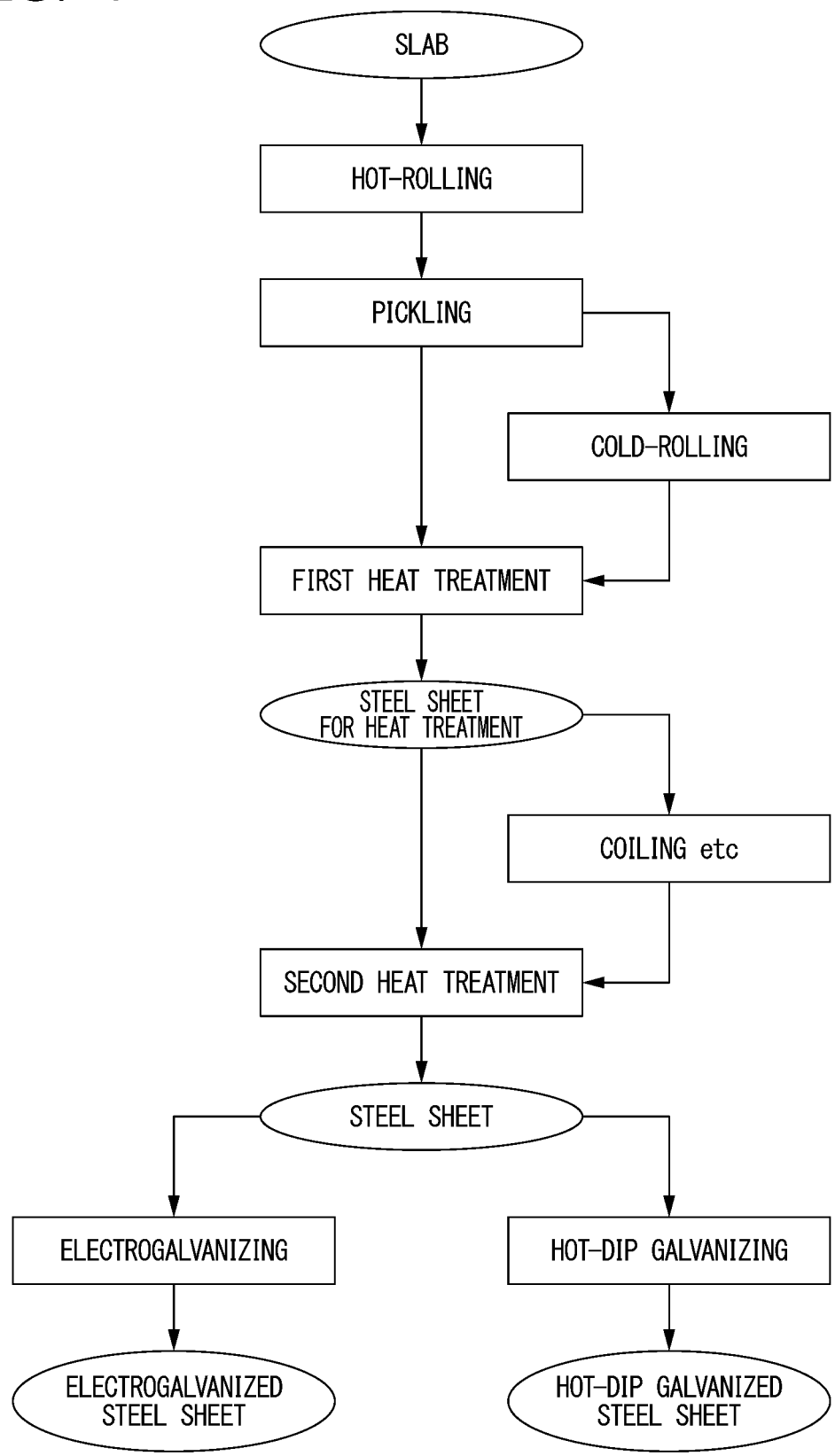
FIG. 4 is a flowchart of a method for manufacturing the steel sheet according to the present embodiment.

In the method for manufacturing the steel sheet of the present embodiment, as shown in FIG. 4, a slab having the above chemical composition is hot-rolled, a hot-rolled steel sheet which has been pickled or a cold-rolled steel sheet which has been obtained by cold-rolling the hot-rolled steel sheet is subjected to a first heat treatment described below, whereby a steel sheet for a heat treatment is manufactured. Then, the steel sheet for a heat treatment is subjected to the second heat treatment described below. The first heat treatment and/or the second heat treatment may be performed using a dedicated heat treatment line or may be performed using an existing annealing line.

(Casting Step)

In order to manufacture the steel sheet of the present embodiment, first, a slab having the above chemical composition (composition) is cast. As the slab to be subjected to hot rolling, a continuous cast slab or one manufactured by or a thin slab caster can be used. The slab after casting may be once cooled to room temperature and then hot-rolled, or may be directly hot-rolled while being at a high temperature. It is preferable to directly subject the slab after casting to hot rolling while being at a high temperature because the energy required for heating in hot rolling can be reduced.

(Slab Heating)

The slab is heated prior to hot rolling. In a case of manufacturing the steel sheet of the present embodiment, it is preferable to select slab heating conditions that satisfy Expression (4) shown below.

(Formula 1)

$$10^4 \cdot \frac{\sum_{A_{c1}}^{A_{c3}} f\gamma \cdot WMn\gamma \cdot \sqrt{D \cdot ts(T)}}{\sum_{A_{c1}}^{A_{c3}} \sqrt{D \cdot ts(T)}} \leq 1.0 \quad (4)$$

(in Expression (4), $f\gamma$ is a value represented by Expression (5), $WMn\gamma$ is a value represented by Expression (6), D is a value represented by Expression (7), and $A_{c1}$ Is a value represented by Expression (8), $A_{c3}$ is a value represented by Expression (9), and ts(T) is a slab holding time (sec) at a slab heating temperature T)

(Formula 2)

$$f\gamma = \frac{WC}{0.8} + \left(1 - \frac{WC}{0.8}\right) \cdot \frac{T - A_{c1}}{A_{c3} - A_{c1}} \quad (5)$$

(in Expression (5), T is a slab heating temperature (° C.), WC is a C content (mass %) in steel, $A_{c1}$ is a value represented by Expression (8), and $A_{c3}$ is a value represented by Expression (9))

(Formula 3)

$$WMn\gamma = \left\{3.4 \cdot WMn - 2.4 \cdot WMn \cdot \frac{T - A_{c1}}{A_{c3} - A_{c1}}\right\} / 100 \quad (6)$$

(in Expression (6), T is a slab heating temperature (° C.), WMn is a Mn content (mass %) in steel, $A_{c1}$ is a value represented by Expression (8), and $A_{c3}$ is a value represented by Expression (9))

(Formula 4)

$$D = 10^{-4.8} \cdot \exp\left(\frac{-262000}{R \cdot T}\right) \quad (7)$$

(in Expression (7), T is a slab heating temperature (° C.), and R is a gas constant; 8.314 J/mol)

$$A_{c1} = 723 - 10.7 \times Mn - 16.9 \times Ni + 29.1 \times Si + 16.9 \times Cr \quad (8)$$

(element symbols in Expression (8) indicate the mass % of the corresponding elements in steel)

$$A_{c3} = 879 - 346 \times C + 65 \times Si - 18 \times Mn + 54 \times Al \quad (9)$$

(element symbols in Expression (9) indicate the mass % of the corresponding elements in steel)

The numerator of Expression (4) represents the degree of Mn content to which Mn is distributed from α to γ during retention in a dual phase region of α (ferrite) and γ (austenite). The larger the numerator of Expression (4), the more inhomogeneous the Mn concentration distribution in the steel. The denominator of Expression (4) is a term corresponding to the distance of Mn atoms diffusing into γ during the retention in a γ single phase region. The larger the denominator of Expression (4), the more homogeneous the Mn concentration distribution. In order to sufficiently homogenize the Mn concentration distribution in the steel, it is preferable to select the slab heating conditions so that the value of Expression (4) is 1.0 or less. The smaller the value of Expression (4), the more the number density of coarse lump-like austenite grains in the steel sheet inside of the steel sheet for a heat treatment and the steel sheet can be reduced.

(Hot Rolling)

After heating the slab, hot rolling is performed. When the hot rolling completion temperature (finishing temperature) is lower than 850° C., the rolling reaction force increases and it becomes difficult to stably obtain a specified sheet thickness. Therefore, the hot rolling completion temperature is preferably set to 850° C. or higher. From the viewpoint of rolling reaction force, the hot rolling completion temperature is preferably set to 870° C. or higher. On the other hand, in order to cause the hot rolling completion temperature to be higher than 1050° C., it is necessary to heat the steel sheet using a heating apparatus or the like in the steps from the end of the heating of the slab to the end of the hot rolling, which requires a high cost. For this reason, it is preferable to set the hot rolling completion temperature to 1050° C. or lower. In order to easily secure the steel sheet temperature during hot rolling, the hot rolling completion temperature is set to preferably 1000° C. or lower, and more preferably 980° C. or lower.

(Pickling)

Next, the hot-rolled steel sheet thus manufactured is pickled. The pickling is a step of removing oxides on the surface of the hot-rolled steel sheet, and is important for improving the chemical convertibility of the steel sheet. The pickling of the hot-rolled steel sheet may be performed once or may be performed a plurality of times.

(Cold Rolling)

The pickled hot-rolled steel sheet may be cold-rolled into a cold-rolled steel sheet. By performing cold rolling on the hot-rolled steel sheet, it is possible to manufacture a steel sheet having a predetermined sheet thickness with high accuracy. In the cold rolling, when the total rolling reduction exceeds 85%, the ductility of the steel sheet is lost, and the risk of the steel sheet fracturing during the cold rolling increases. Therefore, the total rolling reduction is set to preferably 85% or less, and more preferably 75% or less. The lower limit of the total rolling reduction in the cold rolling step is not particularly specified, and cold rolling may be omitted. In order to improve the shape homogeneity of the steel sheet to obtain a good external appearance and to cause the steel sheet temperature during the first heat treatment and the second heat treatment to be uniform to obtain good ductility, the total rolling reduction in the cold rolling is set to preferably 0.5% or more, and more preferably 1.0% or more.

(First Heat Treatment)

Next, the pickled hot-rolled steel sheet or the cold-rolled steel sheet obtained by cold-rolling the hot-rolled steel sheet is subjected to the first heat treatment, whereby the steel sheet for a heat treatment is manufactured. The first heat treatment is performed under the conditions that satisfy the following (a) to (e).

(A) While heating from 650° C. to a highest heating temperature is performed, an atmosphere around the hot-rolled steel sheet or the cold-rolled steel sheet is set to an atmosphere containing 0.1 vol % or more of $H_2$ and satisfying Expression (2).

$$-1.1 \leq \log(PH_2O/PH_2) \leq -0.07 \quad (2)$$

(in Expression (2), $PH_2O$ represents the partial pressure of water vapor, and $PH_2$ represents the partial pressure of hydrogen)

In the first heat treatment, by satisfying (a), an oxidation reaction outside the steel sheet is suppressed and a decarburization reaction is promoted. In the first heat treatment, it is necessary to set the atmosphere around the steel sheet to the atmosphere described in (a) in a part of the temperature range while heating from 650° C. to the highest heating temperature is performed, and it is preferable to set the atmosphere around the steel sheet to the atmosphere described in (a) in the entire temperature range while heating from 650° C. to the highest heating temperature is performed.

When $H_2$ in the atmosphere is less than 0.1 vol %, an oxide film present on the surface of the steel sheet cannot be sufficiently reduced and the oxide film is formed on the steel sheet. For this reason, the chemical convertibility and plating adhesion of the steel sheet obtained after the second heat treatment are reduced. On the other hand, when the $H_2$ content in the atmosphere exceeds 20 vol %, the effect is saturated. When the $H_2$ content in the atmosphere exceeds 20 vol %, the risk of hydrogen explosion during an operation increases. Therefore, it is preferable to set the $H_2$ content in the atmosphere to 20 vol % or less.

In a case where the $\log(PH_2O/PH_2)$ is less than −1.1, external oxidation of Si and Mn in the surface layer portion of the steel sheet occurs, and the decarburization reaction becomes insufficient, so that the thickness of the soft layer forming the surface layer of the steel sheet for a heat treatment decreases. On the other hand, when the $\log(PH_2O/PH_2)$ exceeds −0.07, the decarburization reaction proceeds excessively, and the strength of the steel sheet after the second heat treatment becomes insufficient.

(b) Holding is performed at a highest heating temperature of $(A_{c3}-30)°$ C. to 1000° C. for 1 second to 1000 seconds.

In the first heat treatment, the highest heating temperature is set to $(A_{c3}-30)°$ C. or higher. When the highest heating temperature is lower than $(A_{c3}-30)°$ C., lump-like coarse ferrite remains in the steel sheet structure of the steel sheet inside in the steel sheet for a heat treatment. As a result, the soft ferrite of the steel sheet obtained after the second heat treatment of the steel sheet for a heat treatment becomes excessive, and the number proportion of retained austenite having an aspect ratio of 2.0 or more becomes insufficient, resulting in the deterioration of properties. The highest heating temperature is set to preferably $(A_{c3}-15)°$ C. or higher, and more preferably $(A_{c3}+5)°$ C. or higher. On the other hand, when heating to an excessively high temperature is performed, decarburization of the surface layer proceeds excessively and the fatigue resistance becomes insufficient in some cases, the fuel cost required for heating increases, and damage to the furnace body is incurred. Therefore, the highest heating temperature is set to 1000° C. or lower.

In the first heat treatment, the holding time at the highest heating temperature is set to 1 second to 1000 seconds.

When the holding time is shorter than 1 second, lump-like coarse ferrite remains in the steel sheet structure of the steel sheet inside in the steel sheet for a heat treatment. As a result, the volume percentage of soft ferrite of the steel sheet obtained after the second heat treatment becomes excessive, resulting in the deterioration of properties. The holding time is preferably 10 seconds or longer, and more preferably 50 seconds or longer. On the other hand, when the holding time is too long, not only is the effect of heating to the highest heating temperature saturated, but also productivity is impaired. Therefore, the holding time is set to 1000 seconds or shorter.

(c) Heating is performed such that an average heating rate from 650° C. to the highest heating temperature is 0.5° C./sec to 500° C./sec.

In the first heat treatment, when the average heating rate from 650° C. to the highest heating temperature is less than 0.5° C./sec, Mn segregation proceeds during the heating treatment, a coarse lump-like Mn-concentrated region is formed, and the properties of the steel sheet obtained after the second heat treatment deteriorate. In order to suppress the generation of lump-like austenite, the average heating rate is preferably set to 1.5° C./sec or more. On the other hand, when the average heating rate exceeds 500° C./sec, the decarburization reaction does not proceed sufficiently. Therefore, the average heating rate is set to 500° C./sec or less. The average heating rate from 650° C. to the highest heating temperature is a value obtained by dividing the difference between 650° C. and the highest heating temperature by the elapsed time from when the surface temperature of the steel sheet reaches 650° C. until the highest heating temperature is reached.

(d) After performing holding at the highest heating temperature, cooling is performed such that an average cooling rate in a temperature range from 700° C. to Ms is 5° C./sec or more.

In the first heat treatment, in order to cause the steel sheet structure of the steel sheet inside in the steel sheet for a heat treatment to primarily have a lath-like structure, cooling is performed so that a cooling rate in a temperature range from 700° C. to Ms represented by Expression (10) after holding at the highest heating temperature is 5° C./sec or more in terms of average cooling rate. When the average cooling rate is less than 5° C./sec, there are cases where lump-like ferrite is formed. The average cooling rate is set to preferably 10° C./sec or more, and more preferably 30° C./sec or more. The upper limit of the average cooling rate need not be particularly specified, but special equipment is required to perform cooling at an average cooling rate of more than 500° C./sec. Therefore, the average cooling rate is preferably 500° C./sec or less. The average cooling rate in the temperature range from 700° C. to Ms or less is a value obtained by dividing the difference between 700° C. and Ms by the elapsed time until the steel sheet surface temperature reaches from 700° C. to Ms. Ms is calculated by the following formula.

$$Ms = 561 - 407 \times C - 7.3 \times Si - 37.8 \times Mn - 20.5 \times Cu - 19.5 \times Ni - 19.8 \times Cr - 4.5 \times Mo \quad (10)$$

(element symbols in Expression (10) indicate the mass % of the corresponding elements in steel)

(e) Cooling at the average cooling rate of 5° C./sec or more is performed until a cooling stop temperature of Ms or lower.

In the first heat treatment, cooling in which the average cooling rate in the temperature range of 700° C. to Ms is 5° C./sec or more is performed until a cooling stop temperature of Ms or lower. The cooling stop temperature may be room temperature (25° C.). By setting the cooling stop temperature to Ms or lower, the steel sheet structure of the steel sheet inside in the steel sheet for a heat treatment obtained after the first heat treatment primarily has the lath-like structure. The cooling stop temperature is the surface temperature of the steel sheet at the time when the injection of a cooling medium (cooling water, air, or the like) that causes a temperature drop of the steel sheet is ended.

In the manufacturing method of the present embodiment, the steel sheet cooled to the cooling stop temperature of Ms or lower and room temperature or higher in the first heat treatment may be continuously subjected to the second heat treatment described below. In the first heat treatment, the second heat treatment described below may be performed after cooling to room temperature and coiling.

The steel sheet cooled to room temperature in the first heat treatment is the steel sheet for a heat treatment of the present embodiment described above. The steel sheet for a heat treatment becomes the steel sheet according to the present embodiment by performing the second heat treatment described below. In addition, the hot-dip galvanized steel sheet of the present embodiment is obtained by performing hot-dip galvanizing (and an alloying treatment as necessary) thereon.

In the present embodiment, various treatments may be performed on the steel sheet for a heat treatment before performing the second heat treatment. For example, the steel sheet for a heat treatment may be subjected to a temper rolling treatment in order to correct the shape of the steel sheet for a heat treatment. Otherwise, in order to remove oxides present on the surface of the steel sheet for a heat treatment, the steel sheet for a heat treatment may be subjected to a pickling treatment.

(Second Heat Treatment)

The second heat treatment is applied to the steel sheet (steel sheet for a heat treatment) subjected to the first heat treatment. The second heat treatment satisfies the following (A) to (E).

(A) While heating from 650° C. to the highest heating temperature is performed, the atmosphere around the steel sheet is set to an atmosphere containing 0.1 vol % or more of $H_2$ and satisfying Expression (3).

$$\log(PH_2O/PH_2) < -1.1 \quad (3)$$

(in Expression (3), $PH_2O$ represents the partial pressure of water vapor, and $PH_2$ represents the partial pressure of hydrogen)

In the second heat treatment, it is necessary to set the atmosphere around the hot-rolled steel sheet or the cold-rolled steel sheet to the atmosphere described in (A) in a part of the temperature range while heating from 650° C. to the highest heating temperature is performed, and it is preferable to set the atmosphere around the steel sheet to the atmosphere described in (A) in the entire temperature range while heating from 650° C. to the highest heating temperature is performed. In a case where the steel sheet is subjected to hot-dip galvanizing, in the second heat treatment, it is necessary to set the atmosphere of the steel sheet to the atmosphere described in (A) in the entire temperature range while heating from 650° C. to the highest heating temperature is performed. Furthermore, in the case where the steel sheet is subjected to hot-dip galvanizing, in the second heat treatment, the atmosphere around the steel sheet needs to contain 0.1 vol or more of H2 and 0.020 vol % of $O_2$ and satisfy Expression (3).

In the second heat treatment, since (A) is satisfied, the decarburization reaction on the surface of the steel sheet is suppressed, and carbon atoms are supplied from the inside of the steel sheet to the surface layer portion decarburized during the first heat treatment. As a result, a complex structure having a trace amount of martensite and retained austenite dispersed and having a predetermined thickness is formed on the surface of the steel sheet after the second heat treatment.

When $H_2$ in the atmosphere is less than 0.1 vol %, an oxide film present on the surface of the steel sheet cannot be sufficiently reduced and the oxide film is formed on the steel sheet. For this reason, the chemical convertibility of the steel sheet obtained after the second heat treatment is reduced. Furthermore, in the case where the steel sheet is subjected to hot-dip galvanizing, when $H_2$ in the atmosphere is less than 0.1 vol % or $O_2$ in the atmosphere is more than 0.020 vol %, the plating adhesion of the steel sheet decreases. When the $H_2$ content in the atmosphere exceeds 20 vol %, the effect is saturated. When the $H_2$ content in the atmosphere exceeds 20 vol %, the risk of hydrogen explosion during an operation increases. Therefore, it is preferable to set the $H_2$ content in the atmosphere to 20 vol % or less. A preferable range of $H_2$ is 2.0 vol % or more, and more preferably 3.0 vol % or more. A preferable range of $O_2$ is 0.010 vol % or less, and more preferably 0.005 vol % or less.

When the $\log(PH_2O/PH_2)$ is -1.1 or more, the decarburization reaction on the surface of the steel sheet proceeds excessively, the thickness of the soft layer forming the surface layer of the steel sheet obtained after the second heat treatment increases, so that the strength of the steel sheet becomes insufficient. The lower the numerical value of the $\log(PH_2O/PH_2)$ is, the more preferable it is. Therefore, it is not necessary to set a lower limit to the numerical value. However, in order to set the numerical value of the $\log(PH_2O/PH_2)$ to less than -2.2, special equipment is required. Therefore, it is preferable to set the lower limit of the numerical value of the $\log(PH_2O/PH_2)$ to -2.2.

(B) Holding is performed at a highest heating temperature of $(A_{c1}+25)°$ C. to $(A_{c3}-10)°$ C. for 1 second to 1000 seconds.

In the second heat treatment, the highest heating temperature is set to $(A_{c1}+25)°$ C. to $(A_{c3}-10)°$ C. When the highest heating temperature is lower than $(A_{c1}+25)°$ C., cementite in the steel is left unmelted, and the retained austenite fraction in the internal structure of the steel sheet obtained after the second heat treatment becomes insufficient, resulting in the deterioration of properties. The highest heating temperature is preferably set to $(A_{c1}+40)°$ C. or higher in order to increase the hard structure fraction of the steel sheet obtained after the second heat treatment and obtain a steel sheet having higher strength.

On the other hand, when the highest heating temperature exceeds $(A_{c3}-10)°$ C., most or all of the microstructure becomes austenite, so that the lath-like structure in the steel sheet (steel sheet for a heat treatment) before the second heat treatment disappears and is not succeeded to the steel sheet. As a result, the retained austenite fraction in the internal structure of the steel sheet obtained after the second heat treatment becomes insufficient, and the number proportion of retained austenite having an aspect ratio of 2.0 or more becomes insufficient, resulting in a significant deterioration in properties. From this, the highest heating temperature is set to $(A_{c3}-10)°$ C. or lower. The highest heating temperature is set to preferably $(A_{c3}-20)°$ C. or lower, and more preferably $(A_{c3}-30)°$ C. or lower in order to cause the lath-like structure in the steel sheet before the second heat treatment to be sufficiently succeeded to the steel sheet and further improve the properties of the steel sheet.

In the second heat treatment, the holding time at the highest heating temperature is set to 1 second to 1000 seconds. When the holding time is shorter than 1 second, diffusion of carbon atoms from the inside of the steel sheet to the surface layer may be insufficient, and there is concern that cementite in the steel may remain unmelted and the properties of the steel sheet may deteriorate. The holding time is preferably 30 seconds or longer. On the other hand, when the holding time is too long, the diffusion of carbon atoms from the steel sheet inside to the surface layer proceeds excessively, and the effect of decarburizing the surface layer in the first heat treatment disappears. Therefore, the upper limit of the holding time is set to 1000 seconds.

(C) Heating is performed such that an average heating rate from 650° C. to the highest heating temperature is 0.5° C./sec to 500° C./sec.

When the average heating rate from 650° C. to the highest heating temperature in the second heat treatment is less than 0.5° C./sec, recovery of the lath-like structure generated in the first heat treatment progresses and the volume fraction of soft ferrite having no austenite grains in the grains increases. On the other hand, when the average heating rate exceeds 500° C./sec, the decarburization reaction does not proceed sufficiently. The average heating rate from 650° C. to the highest heating rate is value obtained by dividing the difference between 650° C. and the highest heating rate by the elapsed time from when the surface temperature of the steel sheet reaches 650° C. until the highest heating rate is reached.

(D) Cooling from the highest heating temperature to 480° C. or lower is performed such that an average cooling rate between 600° C. and 700° C. is 3° C./sec or more.

In the second heat treatment, cooling from the highest heating temperature to 480° C. or lower is performed such that an average cooling rate between 600° C. and 700° C. is 3° C./sec or more. When average cooling rate is less than 3° C./sec in the above temperature range, coarse carbides are generated and the properties of the steel sheet are impaired. The average cooling rate is preferably set to 10° C./sec or more in the temperature range. The upper limit of the average cooling rate in the temperature range need not be particularly provided, but a special cooling device is required to perform cooling at more than 200° C./sec. Therefore, the upper limit is preferably set to 200° C./sec or less. The average cooling rate in the temperature range is a value obtained by dividing the temperature difference between 600° C. and 700° C. (that is, 100° C.) by the time required for cooling from 700° C. to 600° C.

(E) After performing cooling at the average cooling rate of 3° C./sec or more, holding is performed at 300° C. to 480° C. for 10 seconds or longer.

In the second heat treatment, when the holding time between 300° C. and 480° C. is shorter than 10 seconds, carbon is not sufficiently concentrated in untransformed austenite, so that lath-like ferrite does not grow sufficiently and concentration of C in austenite does not proceed. As a result, fresh martensite is generated, and the properties of the steel sheet greatly deteriorate. The holding time is preferably set to 100 seconds or longer in order to cause the concentration of carbon in austenite to sufficiently proceed, reduce the amount of martensite produced, and improve the properties of the steel sheet. Holding at 300° C. and 480° C. for N seconds or longer means that the period during which the temperature of the steel sheet is within the temperature range of 300° C. to 480° C. is N seconds or longer.

By performing the second heat treatment described above, the steel sheet of the present embodiment described above is obtained.

In the present embodiment, the steel sheet may be subjected to cold rolling for the purpose of shape correction. The cold rolling may be performed after performing the first heat treatment or may be performed after performing the second heat treatment. Otherwise, the cold rolling may be performed both after performing the first heat treatment and after performing the second heat treatment. Regarding the rolling reduction of the cold rolling, the rolling reduction is set to preferably 3.0% or less, and more preferably 1.2% or less. When the rolling reduction of cold rolling exceeds 3.0%, there is concern that a part of austenite may disappear by strain-induced transformation, and the properties may be impaired. On the other hand, the lower limit of the rolling reduction of the cold rolling is not particularly specified, and the properties of the steel sheet according to the present embodiment are exhibited even without performing cold rolling.

"Hot-Dip Galvanizing"

In the method for manufacturing the steel sheet according to the present embodiment, a hot-dip galvanizing step of forming a hot-dip galvanized layer on the surface of the base steel sheet after the second heat treatment may be performed. Subsequent to the formation of the hot-dip galvanized layer, an alloying treatment of the plated layer may be performed.

Figure 5:
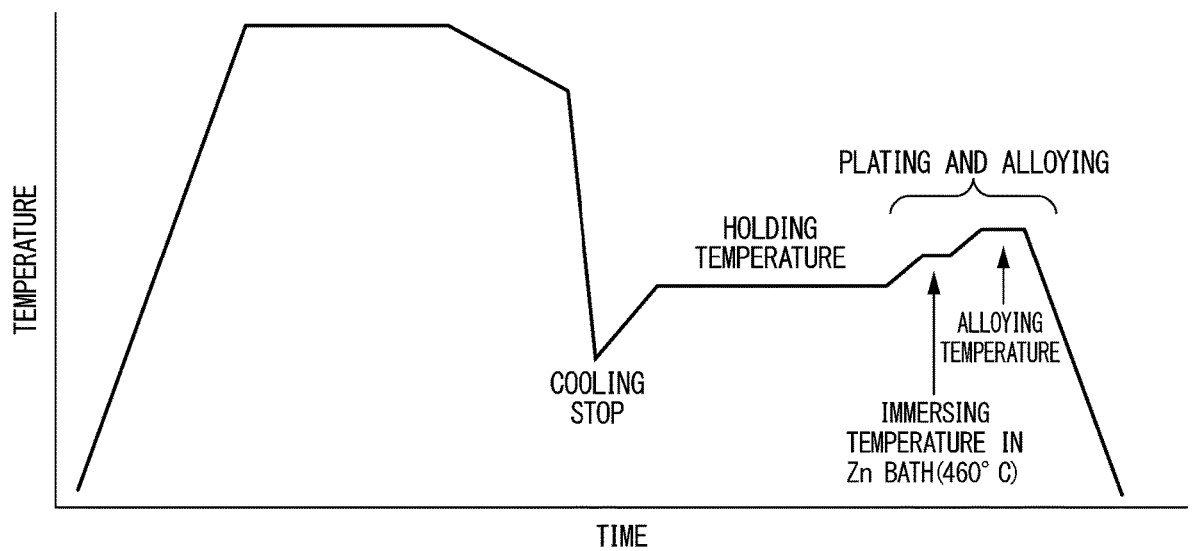
FIG. 5 is a diagram showing a first example of a temperature-time pattern of a second heat treatment to a hot-dip galvanizing and alloying treatment in a method for manufacturing a hot-dip galvanized steel sheet according to the present embodiment.
Figure 6:
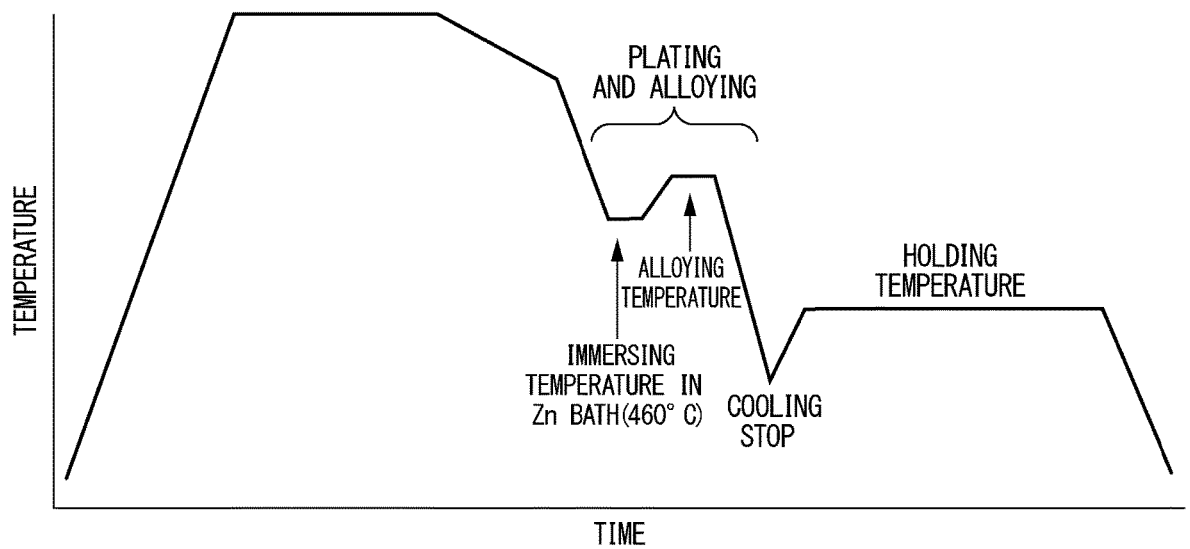
FIG. 6 is a diagram showing a second example of the temperature-time pattern of the second heat treatment to the hot-dip galvanizing and alloying treatment in the method for manufacturing the hot-dip galvanized steel sheet according to the present embodiment.
Figure 7:
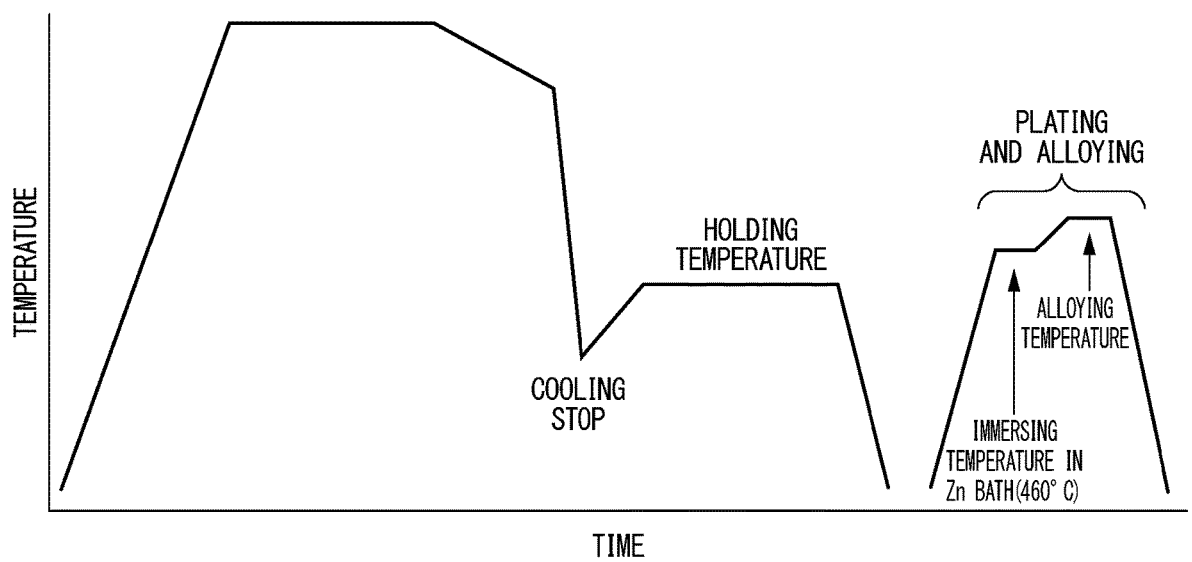
FIG. 7 is a diagram showing a third example of the temperature-time pattern of the second heat treatment to the hot-dip galvanizing and alloying treatment in the method for manufacturing the hot-dip galvanized steel sheet according to the present embodiment.

The hot-dip galvanizing and the alloying treatment may be performed at any timing after the completion of the cooling step (D) in the second heat treatment as long as the conditions specified in the manufacturing method according to the present embodiment are satisfied. For example, as shown as a pattern [1] in FIG. 5, a plating treatment (and an alloying treatment as necessary) may be performed after the cooling step (D) and the isothermal holding step (E). Otherwise, as shown as a pattern [2] in FIG. 6, a plating treatment (and an alloying treatment as necessary) may be performed after the cooling step (D), and thereafter the isothermal holding step (E) may be performed. Alternatively, as shown as a pattern [3] in FIG. 7, cooling to room temperature is performed once after the cooling step (D) and the isothermal holding step (E), and thereafter a plating treatment (and an alloying treatment as necessary) may be performed.

As plating conditions such as a molten zinc bath temperature and a molten zinc bath composition in the hot-dip galvanizing step, general conditions can be used, and there is no particular limitation. For example, the plating bath temperature may be 420° C. to 500° C., the sheet temperature of the steel sheet to be immersed may be 420° C. to 500° C., and the immersion time may be 5 seconds or shorter. The plating bath is preferably a plating bath containing 0.08% to 0.2% of Al, but may further contain Fe, Si, Mg, Mn, Cr, Ti, Pb, and the like as impurities. Furthermore, it is preferable to control the hot-dip galvanizing adhesion amount by a known method such as gas wiping. The adhesion amount may be usually 5 g/m$^2$ or more per side, but is set to preferably 25 to 75 g/m$^2$, and more preferably 20 to 120 g/m$^2$.

The high strength hot-dip galvanized steel sheet on which the hot-dip galvanized layer is formed may be subjected to an alloying treatment, as necessary, as described above.

The alloying treatment may be performed according to a normal method, but the alloying treatment temperature is preferably set to 460° C. to 600° C. When the alloying treatment is performed at lower than 460° C., the alloying rate becomes slow, and the productivity is impaired. Moreover, an irregular alloying treatment occurs. Accordingly, the alloying treatment temperature is preferably set to 460° C. or higher. On the other hand, when the alloying treatment temperature exceeds 600° C., alloying proceeds excessively and the plating adhesion of the steel sheet deteriorates. Accordingly, the alloying treatment temperature is preferably 600° C. or lower. The alloying treatment temperature is more preferably set to 480° C. to 580° C. or less. The heating time of the alloying treatment is preferably set to 5 to 60 seconds.

Furthermore, the alloying treatment is preferably performed under the condition that the iron concentration in the hot-dip galvanized layer is 6.0 mass % or more.

Furthermore, an electrogalvanized layer may be formed on the surface of the steel sheet of the present embodiment. The electrogalvanized layer can be formed by a known method.

Next, a method for measuring each configuration included in the steel sheet and the steel sheet for a heat treatment of the present embodiment will be described.

"Measurement of Steel Structure"

The volume fractions of ferrite (soft ferrite and hard ferrite), bainite, tempered martensite, fresh martensite, pearlite, cementite, upper bainite, and bainitic ferrite contained in the steel structures of the steel sheet inside and the surface layer in the steel sheet and the steel sheet for a heat treatment can be measured using the method described below.

A sample is taken with a cross section parallel to the rolling direction and the sheet thickness direction of the steel sheet as an observed section, and the observed section is polished and subjected to nital etching. Next, in one or a plurality of observed visual fields of the range from ⅛ thickness to ⅜ thickness centered on the ¼ thickness position from the surface in the observed section, a total area of 2.0×10$^{-9}$ m$^2$ or more is observed with a field emission scanning electron microscope (FE-SEM). In addition, the area fractions of ferrite, bainite, tempered martensite, fresh martensite, pearlite, and cementite are respectively measured, and are regarded as the volume fractions. Here, a region having a substructure in the grains and containing carbides precipitated with a plurality of variants is determined as tempered martensite. A region where cementite is precipitated in a lamellar form is determined as pearlite. A region where the brightness is low and the substructure is not recognized is determined as ferrite (soft ferrite or hard ferrite). A region where the brightness is high and the substructure is not revealed by etching is determined as fresh martensite or retained austenite. The volume fraction of each thereof is calculated by a point counting method and determined as the volume fraction of each structure. The volume fraction of fresh martensite can be obtained by subtracting the volume percentage of retained austenite obtained by an X-ray diffraction method.

Regarding the volume fractions of hard ferrite and soft ferrite, the volume fraction of each thereof is obtained by the method described below centered on the measured volume fraction of ferrite.

The volume fraction of fresh martensite can be obtained by subtracting the volume fraction of retained austenite obtained by an X-ray diffraction method described below from the volume fraction of fresh martensite or retained austenite.

In the steel sheet and the steel sheet for a heat treatment, the volume fraction of retained austenite contained in the steel sheet inside is evaluated by the X-ray diffraction method. Specifically, in the range from ⅛ thickness to ⅜ thickness centered on the ¼ thickness position of the sheet thickness from the surface, a surface parallel to the sheet surface is mirror-finished, and the area fraction of FCC iron is measured by the X-ray diffraction method and is determined as the volume fraction of retained austenite.

"Ratio Between Volume Fraction of Retained Austenite Contained in Soft Layer and Volume Fraction of Retained Austenite Contained in Steel Sheet Inside"

In the steel sheet according to the present embodiment, the ratio between the volume fraction of retained austenite contained in the soft layer and the volume fraction of retained austenite of the steel sheet inside is evaluated by performing a high-resolution crystal structure analysis by an electron back scattering diffraction (EBSD) method. Specifically, a sample is taken with a sheet thickness cross section parallel to the rolling direction of the steel sheet as an observed section, and the observed section is polished and mirror-finished. Furthermore, in order remove the processed layer of the surface layer, electrolytic polishing or mechanical polishing using colloidal silica is performed. Next, for the surface layer portion of the steel sheet including the soft layer and the steel sheet inside (in the range from ⅛ thickness to ⅜ thickness centered on the ¼ thickness position from the surface), a crystal structure analysis according to the EBSD method is performed so that the total area of the observed visual fields is $2.0 \times 10^{-9}$ m² or more in total (allowed in a plurality of visual fields or the same visual field). For the analysis of the data obtained by the EBSD method in the measurement, "OIM Analysys 6.0" manufactured by TSL is used. The distance between marks (step) is set to 0.01 to 0.20 μm. From the observation result, the region determined as FCC iron is determined as retained austenite, and the volume fraction of retained austenite of each of the soft layer and the steel sheet inside is calculated.

"Measurement of Aspect Ratio and Major Axis of Retained Austenite Grains"

In the steel sheet and the steel sheet for a heat treatment, the aspect ratio and major axis of the retained austenite grains contained in the steel structure of the steel sheet inside are evaluated by observing the grains using FE-SEM and performing a high-resolution crystal orientation analysis by the electron back scattering diffraction method (EBSD method).

First, a sample is taken with a cross section parallel to the rolling direction and the sheet thickness direction of the steel sheet as an observed section, and the observed section is polished and mirror-finished. Next, in one or a plurality of observed visual fields of the range from ⅛ thickness to ⅜ thickness centered on the ¼ thickness position from the surface in the observed section, a crystal structure analysis according to the EBSD method is performed on an area of $2.0 \times 10^{-9}$ m² or more in total (allowed in any of a plurality of visual fields and the same visual field). Next, from the crystal orientations of the retained austenite grains measured by the above method, in order to avoid a measurement error, only austenite having a major axis length of 0.1 μm or more is extracted and a crystal orientation map is drawn. A boundary that causes a crystal orientation difference of 10° or more is regarded as a grain boundary between retained austenite grains. The aspect ratio is a value obtained by dividing the major axis length of the retained austenite grains by the minor axis length. The major axis is the major axis length of the retained austenite grains. For the analysis of the data obtained by the EBSD method in the measurement, "OIM Analysys 6.0" manufactured by TSL is used. The distance between marks (step) is set to 0.01 to 0.20 μm. From the observation result, the region determined as FCC iron is determined as retained austenite. From this result, the number proportion of the retained austenite having an aspect ratio of 2.0 or more in the total retained austenite is obtained.

In addition, the aspect ratio of ferrite is evaluated by observing grains using FE-SEM and performing a high-resolution crystal orientation analysis by the electron back scattering diffraction method (EBSD method). For the analysis of the data obtained by the EBSD method, "OIM Analysys 6.0" manufactured by TSL is used. The distance between marks (step) is set to 0.01 to 0.20 μm. From the observation result, a region determined as BCC iron is regarded as ferrite, and a crystal orientation map is drawn. In addition, a boundary that causes a crystal orientation difference of 15° or more is regarded as a grain boundary. The aspect ratio is a value obtained by dividing the major axis length of each ferrite grain by the minor axis length.

As the ferrite having a large aspect ratio, there is unrecrystallized ferrite elongated in the rolling direction by cold rolling. However, the unrecrystallized ferrite is clearly distinguished from the ferrite having a large aspect ratio in the steel sheet according to the present embodiment. The unrecrystallized ferrite has a larger orientation gradient in crystal grains than the ferrite in the steel sheet according to the present embodiment. Specifically, both can be distinguished by a grain average misorientation value (GAM) obtained by the electron back scatter diffraction patterns (EBSD) method. In general, unrecrystallized ferrite has a GAM value of 0.5° or more, and ferrite having a large aspect ratio in the steel sheet according to the present embodiment has a GAM value of 0.5° or less.

"Ferrite Grains Containing Austenite Grains (Hard Ferrite)/Ferrite Grains not Containing Austenite Grains (Soft Ferrite)"

A method for separating ferrite grains into grains containing austenite grains and grains not containing austenite grains will be described. First, grains are observed using FE-SEM, and a high-resolution crystal orientation analysis is performed by the EBSD method. Specifically, a sample is taken with a sheet thickness cross section parallel to the rolling direction of the steel sheet as an observed section, and the observed section is polished and mirror-finished. Furthermore, in order to remove the processed layer of the surface layer, electrolytic polishing or mechanical polishing using colloidal silica is performed. Next, for the steel sheet inside (in the range from ⅛ thickness to ⅜ thickness centered on the ¼ thickness position from the surface), a crystal structure analysis according to the EBSD method is performed on an area of $2.0 \times 10^{-9}$ m² or more in total (allowed in a plurality of visual fields or the same visual field). Next, for the data obtained from BCC iron, a boundary that causes a crystal orientation difference of 15° or more is regarded as a grain boundary, and a grain boundary map of ferrite is drawn. Next, from the data obtained from FCC iron, in order to avoid a measurement error, a grain distribution map is drawn only with austenite grains with a major axis length of 0.1 μm or more, and is superimposed on the grain boundary map of ferrite grains.

When one ferrite grain has one or more austenite grains completely incorporated therein, the ferrite grain is referred to as "ferrite grain containing austenite grain". Furthermore, a case where the austenite grains are not adjacent to each other or only the austenite grains are adjacent to each other only at the boundary between the other grains is determined as "ferrite grains containing no austenite grain".

"Thickness of Soft Layer"

The hardness distribution from the surface layer to the steel sheet inside can be obtained, for example, by the following method. A sample is taken with a sheet thickness cross section parallel to the rolling direction of the steel sheet as an observed section, the observed section is polished and mirror-finished, and chemical polishing is performed using colloidal silica to remove the processed layer of the surface layer. For the observed section of the obtained sample, using a micro hardness measuring device, a Vickers indenter having a square-based pyramid shape with an apex angle of 136° is pressed against a range from a position at a depth of 5 μm from the outermost layer as the starting point to a ⅛ thickness position of the sheet thickness from the surface under a load of 2 g, at a pitch of 10 μm in the thickness direction of the steel sheet. At this time, the pressing load is set so that the Vickers indentations do not interfere with each other. Thereafter, the diagonal length of the indentation is measured using an optical microscope, a scanning electron microscope, or the like, and converted into a Vickers hardness (Hv).

Next, the measurement position is moved by 10 μm or more in the rolling direction, and the same measurement is performed on a range from a position at a depth of 10 μm from the outermost layer as the starting point to a ⅛ thickness position of the sheet thickness. In this manner, in effect, hardness measurement data can be obtained at a pitch of 5 μm in the depth direction. The measurement interval is not simply set to a pitch of 5 μm in order to avoid interference between the indentations. Five Vickers hardnesses are measured at each thickness position, and the average value thereof is taken as the hardness at the thickness position. By interpolating the data with a straight line, a hardness profile in the depth direction is obtained. The thickness of the soft layer is obtained by reading the depth position where the hardness is 80% or less of the hardness of the base metal from the hardness profile.

"Radio Frequency Glow Discharge Optical Emission Spectroscopy (Radio Frequency GDS)"

When the steel sheet and the steel sheet for a heat treatment are analyzed by a radio frequency glow discharge optical emission spectrometry method, a known radio frequency GDS method can be used.

Specifically, a method in which the surface of the steel sheet is analyzed in the depth direction while the surface of the steel sheet is sputtered in a state where a glow plasma is generated by applying a voltage in an Ar atmosphere. In addition, an element contained in the material (steel sheet) is identified from the emission spectrum wavelength peculiar to the element that is emitted when atoms are excited in the glow plasma, and the amount of the element contained in the material is estimated from the emission intensity of the identified element. Data in the depth direction can be estimated from a sputtering time. Specifically, the sputtering time can be converted into a sputtering depth by obtaining the relationship between the sputtering time and the sputtering depth using a standard sample in advance. Therefore, the sputtering depth converted from the sputtering time can be defined as the depth from the surface of the material.

In addition, in the radio frequency GDS analysis of the steel sheet and the steel sheet for a heat treatment in the present embodiment, a commercially available analyzer can be used. In the present embodiment, a radio frequency glow discharge optical emission spectrometer GD-Profiler 2 manufactured by Horiba Ltd. is used.

EXAMPLES

Next, examples of the present invention will be described. The conditions in the examples are one example of conditions adopted to confirm the feasibility and effects of the present invention. The present invention is not limited to this one example of conditions. The present invention can adopt various conditions as long as the object of the present invention is achieved without departing from the gist of the present invention.

Example 1

Steel having the chemical composition shown in Table 1 was melted to produce a slab. This slab was heated at the slab heating temperature shown in Tables 2 and 3 under the slab heating conditions having the numerical values of Expression (4) shown in Tables 2 and 3, and subjected to hot rolling at the temperature shown in Tables 2 and 3 as the rolling completion temperature, whereby a hot-rolled steel sheet was manufactured. Thereafter, the hot-rolled steel sheet was pickled to remove the scale on the surface. Thereafter, some of the hot-rolled steel sheets were subjected to cold rolling to obtain cold-rolled steel sheets.

TABLE 1

| Chemical composition | C | Si | Mn | P | S | Al | N | O | Nb | Ti | V | Ni | Cu | Cr | Mo | B | Others | Expression (1) | Remarks |
|---|---|---|---|---|---|---|---|---|---|---|---|---|---|---|---|---|---|---|---|
| A | 0.195 | 1.12 | 2.45 | 0.005 | 0.0016 | 0.059 | 0.0035 | 0.0008 | — | — | — | — | — | — | — | — | — | 1.40 | Example |
| B | 0.220 | 1.71 | 2.48 | 0.012 | 0.0015 | 0.035 | 0.0014 | 0.0011 | — | — | — | — | — | — | — | — | Co: 0.13 | 1.98 | Example |
| C | 0.350 | 1.80 | 2.80 | 0.005 | 0.0011 | 0.030 | 0.0008 | 0.0032 | — | — | — | — | — | — | — | — | Ca: 0.0018 | 2.10 | Example |
| D | 0.079 | 1.09 | 2.60 | 0.009 | 0.0005 | 0.020 | 0.0015 | 0.0017 | — | 0.030 | — | — | — | — | 0.200 | — | — | 1.36 | Example |
| E | 0.155 | 1.15 | 1.28 | 0.005 | 0.0030 | 0.042 | 0.0020 | 0.0012 | — | 0.036 | — | — | — | — | — | — | — | 1.30 | Example |
| F | 0.135 | 0.86 | 1.92 | 0.005 | 0.0016 | 0.059 | 0.0035 | 0.0008 | — | — | — | — | — | — | — | — | — | 1.09 | Example |
| G | 0.309 | 0.71 | 2.95 | 0.015 | 0.0034 | 0.035 | 0.0035 | 0.0010 | — | — | — | — | — | — | — | — | — | 1.03 | Example |
| H | 0.360 | 0.38 | 2.35 | 0.008 | 0.0048 | 0.750 | 0.0014 | 0.0010 | 0.013 | — | — | — | — | — | — | — | — | 1.07 | Example |
| I | 0.194 | 1.19 | 3.09 | 0.012 | 0.0038 | 0.086 | 0.0008 | 0.0010 | — | — | — | — | — | — | — | — | — | 1.55 | Example |
| J | 0.194 | 0.22 | 2.94 | 0.008 | 0.0040 | 1.246 | 0.0022 | 0.0019 | — | — | 0.109 | — | — | — | — | — | — | 1.26 | Example |
| K | 0.193 | 0.94 | 0.94 | 0.017 | 0.0003 | 0.038 | 0.0017 | 0.0025 | — | — | — | — | — | 1.05 | — | — | — | 1.05 | Example |
| L | 0.105 | 1.76 | 2.87 | 0.016 | 0.0040 | 0.081 | 0.0050 | 0.0018 | — | — | — | — | — | — | — | — | Sb: 0.086 | 2.10 | Example |
| M | 0.111 | 0.94 | 2.41 | 0.011 | 0.0015 | 0.004 | 0.0030 | 0.0027 | — | — | — | — | — | — | — | 0.0014 | — | 1.18 | Example |
| N | 0.086 | 1.52 | 1.56 | 0.014 | 0.0008 | 0.046 | 0.0096 | 0.0008 | — | — | — | — | — | — | — | 0.0020 | — | 1.70 | Example |
| O | 0.170 | 0.33 | 2.49 | 0.012 | 0.0029 | 0.644 | 0.0008 | 0.0012 | — | — | — | 0.350 | — | — | — | — | La: 0.0016 | 0.97 | Example |
| P | 0.171 | 1.90 | 2.00 | 0.010 | 0.0069 | 0.027 | 0.0041 | 0.0015 | — | — | — | — | 0.090 | — | 0.160 | — | — | 2.12 | Example |
| Q | 0.220 | 1.20 | 3.20 | 0.007 | 0.0030 | 0.032 | 0.0030 | 0.0010 | — | — | — | — | — | — | — | — | Zr: 0.003, REM: 0.003 | 1.54 | Example |
| R | 0.210 | 1.15 | 2.20 | 0.011 | 0.0034 | 0.040 | 0.0035 | 0.0010 | 0.020 | — | — | — | — | — | 0.050 | 0.0020 | W: 0.03, Sn: 0.03 | 1.39 | Example |
| S | 0.180 | 2.20 | 2.70 | 0.011 | 0.0048 | 0.035 | 0.0032 | 0.0020 | 0.050 | — | — | — | — | — | — | — | — | 2.49 | Example |
| T | 0.163 | 0.25 | 0.80 | 0.009 | 0.0026 | 0.020 | 0.0042 | 0.0013 | — | — | — | — | — | 0.40 | — | — | Mg: 0.004 | 0.34 | Example |
| U | 0.220 | 1.50 | 2.40 | 0.013 | 0.0015 | 0.040 | 0.0043 | 0.0020 | — | 0.050 | — | — | — | — | — | — | Hf: 0.005 | 1.76 | Example |
| V | 0.180 | 1.60 | 2.60 | 0.008 | 0.0011 | 0.032 | 0.0043 | 0.0008 | 0.020 | 0.020 | — | — | — | — | — | — | Bi: 0.002, Ce: 0.002 | 1.88 | Example |
| W | <u>0.041</u> | 1.15 | 1.86 | 0.006 | 0.0028 | 0.054 | 0.0027 | 0.0009 | — | — | — | — | — | — | — | — | — | 1.37 | Comparative example |
| X | 0.163 | 0.38 | 1.92 | 0.009 | 0.0026 | 0.063 | 0.0042 | 0.0013 | — | — | — | — | — | — | — | — | — | 0.61 | Comparative example |
| Y | 0.156 | 1.17 | <u>0.47</u> | 0.010 | 0.0024 | 0.059 | 0.0035 | 0.0011 | — | — | — | — | — | — | — | — | — | 1.25 | Comparative example |
| Z | 0.200 | <u>3.20</u> | <u>1.20</u> | 0.008 | 0.0130 | 0.035 | 0.0042 | 0.0012 | — | — | — | — | — | — | — | — | — | 3.34 | Comparative example |
| AA | 0.210 | <u>1.10</u> | <u>5.20</u> | <u>0.150</u> | <u>0.0030</u> | 0.035 | 0.0035 | 0.0013 | <u>0.350</u> | — | — | — | — | — | — | — | — | 1.64 | Comparative example |

*Underlined is outside the scope of the invention

TABLE 2

| Example | Chemical composition | Hot rolling | | | Cold rolling |
| | | Slab heating temperature °C. | Expression (4) | Rolling completion temperature °C. | Cold rolling reduction % |
| --- | --- | --- | --- | --- | --- |
| 1 | A | 1240 | 0.7 | 940 | 53 |
| 2 | A | 1230 | 0.7 | 930 | 53 |
| 3 | A | 1250 | 0.6 | 950 | 53 |
| 4 | A | 1230 | 1.3 | 920 | 53 |
| 5 | A | 1260 | 0.7 | 920 | 53 |
| 6 | A | 1220 | 0.7 | 950 | 53 |
| 7 | A | 1230 | 0.7 | 920 | 53 |
| 8 | A | 1260 | 0.5 | 910 | 53 |
| 9 | A | 1230 | 0.7 | 950 | 53 |
| 10 | A | 1230 | 0.7 | 950 | 53 |
| 11 | A | 1230 | 0.5 | 930 | 53 |
| 12 | A | 1260 | 0.5 | 910 | 53 |
| 13 | B | 1220 | 0.6 | 920 | 53 |
| 14 | B | 1240 | 0.6 | 910 | 53 |
| 15 | B | 1220 | 0.7 | 910 | 53 |
| 16 | B | 1260 | 0.5 | 940 | 53 |
| 17 | C | 1230 | 0.6 | 920 | 53 |
| 18 | C | 1250 | 1.5 | 910 | 53 |
| 19 | C | 1230 | 0.6 | 940 | 53 |
| 20 | C | 1260 | 0.7 | 950 | 53 |
| 21 | D | 1260 | 0.6 | 950 | 53 |
| 22 | D | 1220 | 0.6 | 950 | 53 |
| 23 | D | 1230 | 0.7 | 950 | 53 |
| 24 | D | 1240 | 0.6 | 910 | 53 |
| 25 | D | 1260 | 0.6 | 910 | 53 |
| 26 | D | 1220 | 0.7 | 920 | 53 |
| 27 | D | 1260 | 0.7 | 950 | 53 |
| 28 | E | 1230 | 0.7 | 930 | 53 |
| 29 | E | 1230 | 0.7 | 920 | 53 |
| 30 | F | 1250 | 0.5 | 930 | 53 |
| 31 | F | 1220 | 0.7 | 920 | 53 |
| 32 | G | 1250 | 0.5 | 910 | 53 |
| 33 | G | 1240 | 0.6 | 920 | 53 |
| 34 | G | 1230 | 0.6 | 910 | 53 |
| 35 | G | 1260 | 0.5 | 910 | 53 |
| 36 | G | 1220 | 0.6 | 940 | 53 |

*Underlined is outside the scope of the invention

TABLE 3

| Example | Chemical composition | Hot rolling | | | Cold rolling |
| | | Slab heating temperature °C. | Expression (4) | Rolling completion temperature °C. | Cold rolling reduction % |
| --- | --- | --- | --- | --- | --- |
| 37 | H | 1230 | 0.6 | 950 | 53 |
| 38 | I | 1260 | 0.6 | 940 | 53 |
| 39 | I | 1220 | 0.7 | 920 | 53 |
| 40 | I | 1220 | 0.5 | 930 | 53 |
| 41 | I | 1230 | 0.7 | 920 | 53 |
| 42 | I | 1230 | 0.6 | 950 | 53 |
| 43 | I | 1260 | 0.5 | 940 | Not performed |
| 44 | I | 1220 | 0.7 | 940 | Not performed |
| 45 | I | 1240 | 0.5 | 910 | 53 |
| 46 | I | 1220 | 0.6 | 930 | 53 |
| 47 | I | 1230 | 1.5 | 910 | 53 |
| 48 | J | 1230 | 0.6 | 920 | 53 |
| 49 | J | 1240 | 0.5 | 920 | 53 |
| 50 | K | 1260 | 0.6 | 950 | 53 |
| 51 | L | 1220 | 0.5 | 910 | 53 |
| 52 | L | 1240 | 0.6 | 930 | 53 |
| 53 | M | 1220 | 0.7 | 950 | 53 |
| 54 | N | 1240 | 0.6 | 950 | 53 |
| 55 | O | 1220 | 0.5 | 920 | 53 |
| 56 | P | 1250 | 0.6 | 940 | 53 |
| 57 | Q | 1240 | 0.6 | 910 | 53 |
| 58 | R | 1230 | 0.6 | 920 | 53 |
| 59 | S | 1220 | 0.6 | 920 | 53 |
| 60 | T | 1260 | 0.7 | 940 | 53 |

TABLE 3-continued

| | | Hot rolling | | | Cold rolling |
|---|---|---|---|---|---|
| Example | Chemical composition | Slab heating temperature ° C. | Expression (4) | Rolling completion temperature ° C. | Cold rolling reduction % |
| 61 | U | 1220 | 0.5 | 920 | 53 |
| 62 | U | 1230 | 0.7 | 910 | 53 |
| 63 | U | 1230 | 0.6 | 940 | 53 |
| 64 | U | 1260 | 0.6 | 940 | 53 |
| 65 | U | 1260 | 0.5 | 920 | 53 |
| 66 | U | 1230 | 0.7 | 910 | 53 |
| 67 | V | 1250 | 0.7 | 940 | 53 |
| 68 | <u>W</u> | 1220 | 0.7 | 930 | 53 |
| 69 | <u>X</u> | 1250 | 0.6 | 950 | 53 |
| 70 | <u>Y</u> | 1220 | 0.6 | 950 | 53 |
| 71 | <u>Z</u> | 1220 | 0.6 | 950 | 53 |
| 72 | <u>AA</u> | 1240 | 0.5 | 950 | 53 |
| 73 | A | 1230 | 0.7 | 950 | 53 |
| 74 | A | 1240 | 0.6 | 970 | 53 |
| 75 | A | 1240 | 0.6 | 940 | 53 |
| 76 | A | 1260 | 0.6 | 960 | 53 |
| 77 | B | 1250 | 0.6 | 920 | 53 |

*Underlined is outside the scope of the invention

The hot-rolled steel sheet having a sheet thickness of 1.2 mm or the cold-rolled steel sheet having a sheet thickness of 1.2 mm thus obtained was subjected to the following first heat treatment and/or second heat treatment. Regarding some of the steel sheets, the cold-rolled steel sheet cooled to the cooling stop temperature shown in Tables 4 and 5 in the first heat treatment was continuously subjected to the second heat treatment without being cooled to room temperature. In the other examples, after cooling to the cooling stop temperature in the first heat treatment and then cooling to room temperature, the second heat treatment was performed. Regarding some of the steel sheets, the first heat treatment was not performed.

(First Heat Treatment)

Heating to the highest heating temperature shown in Tables 4 and 5 at an average heating rate from 650° C. to the highest heating temperature shown in Tables 4 and 5 was performed, and holding at the highest heating temperature for the holding time shown in Tables 4 and 5 was performed.

Then, cooling from 700° C. to Ms was performed at the average cooling rate shown in Tables 4 and 5, and cooling to the cooling stop temperature shown in Tables 4 and 5 was performed. In the first heat treatment, heating was performed in the atmosphere containing $H_2$ at the concentration shown in Tables 4 and 5 and having a $\log(PH_2O/PH_2)$ of the numerical value shown in Tables 4 and 5 until the temperature reached from 650° C. to the highest heating temperature.

$A_{c3}$ shown in Tables 4 and 5 was obtained by Expression (9), and Ms was obtained by Expression (10).

$$A_{c3} = 879 - 346 \times C + 65 \times Si - 18 \times Mn + 54 \times Al \quad (9)$$

(element symbols in Expression (9) indicate the mass % of the corresponding elements in steel)

$$Ms = 561 - 407 \times C - 7.3 \times Si - 37.8 \times Mn - 20.5 \times Cu - 19.5 \times Ni - 19.8 \times Cr - 4.5 \times Mo \quad (10)$$

(element symbols in Expression (10) indicate the mass % of the corresponding elements in steel)

TABLE 4

| | | | | First heat treatment | | | | | |
|---|---|---|---|---|---|---|---|---|---|
| Example | $A_{c3}$ ° C. | Ms ° C. | Average heating rate within 650° C. or more ° C./s | Highest heating temperature ° C. | Holding time sec | $\log(PH_2O/PH_2)$ | $H_2$ volume % | Average cooling rate between 700° C. and Ms ° C./s | Cooling stop temperature ° C. |
| 1 | 825 | 381 | 2.0 | 840 | 60 | −0.6 | 2.0 | 40.0 | Room temperature |
| 2 | 825 | 381 | 2.0 | <u>780</u> | 60 | −0.6 | 2.0 | 40.0 | Room temperature |
| 3 | 825 | 381 | 2.0 | <u>1130</u> | 60 | −0.6 | 2.0 | 40.0 | Room temperature |
| 4 | 825 | 381 | 2.0 | 840 | 60 | −0.6 | 2.0 | 40.0 | Room temperature |
| 5 | 825 | 381 | <u>0.05</u> | 850 | 60 | −0.6 | 2.0 | 40.0 | Room temperature |
| 6 | 825 | 381 | 2.0 | 850 | 60 | <u>−1.6</u> | 2.0 | 40.0 | Room temperature |
| 7 | 825 | 381 | 2.0 | 835 | 60 | −0.6 | 2.0 | 12.0 | Room temperature |
| 8 | 825 | 381 | 2.0 | 845 | 60 | −0.6 | 2.0 | <u>2.0</u> | Room temperature |
| 9 | 825 | 381 | 2.0 | 840 | 60 | −0.6 | 2.0 | 40.0 | Room temperature |
| 10 | 825 | 381 | 2.0 | 840 | 60 | −0.6 | 2.0 | 40.0 | Room temperature |
| 11 | 825 | 381 | | | | Not performed | | | |
| 12 | 825 | 381 | 2.0 | 850 | 60 | −0.6 | 2.0 | 40.0 | 250 |
| 13 | 846 | 365 | 2.0 | 870 | 60 | −0.6 | 2.0 | 40.0 | Room temperature |
| 14 | 846 | 365 | 2.0 | 870 | 60 | −0.6 | 2.0 | 40.0 | 270 |
| 15 | 846 | 365 | 2.0 | 870 | 60 | <u>−1.2</u> | 2.0 | 40.0 | Room temperature |
| 16 | 846 | 365 | | | | Not performed | | | |
| 17 | 812 | 300 | 2.0 | 840 | 60 | −0.6 | 2.0 | 40.0 | Room temperature |
| 18 | 812 | 300 | 2.0 | 830 | 60 | −0.6 | 2.0 | 40.0 | Room temperature |

TABLE 4-continued

| | | | First heat treatment | | | | | | |
|---|---|---|---|---|---|---|---|---|---|
| Example | Ac₃ °C. | Ms °C. | Average heating rate within 650° C. or more °C./s | Highest heating temperature °C. | Holding time sec | log(PH₂O/PH₂) | H₂ volume % | Average cooling rate between 700° C. and Ms °C./s | Cooling stop temperature °C. |
| 19 | 812 | 300 | 2.0 | 840 | 60 | −0.6 | 2.0 | 40.0 | Room temperature |
| 20 | 812 | 300 | 2.0 | 830 | 60 | −0.6 | 2.0 | 40.0 | 230 |
| 21 | 856 | 422 | 2.0 | 840 | 60 | −0.6 | 2.0 | 40.0 | Room temperature |
| 22 | 856 | 422 | 2.0 | 885 | 60 | −0.6 | 2.0 | 40.0 | Room temperature |
| 23 | 856 | 422 | 2.0 | 885 | 60 | <u>−1.3</u> | 2.0 | 40.0 | Room temperature |
| 24 | 856 | 422 | 2.0 | 885 | 60 | −0.6 | 2.0 | 40.0 | Room temperature |
| 25 | 856 | 422 | 2.0 | 875 | 5 | −0.6 | 2.0 | 40.0 | Room temperature |
| 26 | 856 | 422 | 2.0 | 875 | 60 | −0.6 | 2.0 | 40.0 | 340 |
| 27 | 856 | 422 | | | | <u>Not performed</u> | | | |
| 28 | 861 | 441 | 2.0 | 900 | 60 | −0.6 | 2.0 | 40.0 | Room temperature |
| 29 | 861 | 441 | 2.0 | 900 | 60 | −0.6 | 2.0 | 40.0 | 330 |
| 30 | 841 | 427 | 2.0 | 870 | 60 | −0.6 | 2.0 | 40.0 | Room temperature |
| 31 | 841 | 427 | 2.0 | 870 | 60 | −0.6 | 2.0 | 40.0 | 250 |
| 32 | 775 | 319 | 2.0 | 800 | 60 | −0.6 | 2.0 | 40.0 | Room temperature |
| 33 | 775 | 319 | 2.0 | 800 | 60 | −0.6 | 2.0 | 40.0 | Room temperature |
| 34 | 775 | 319 | 2.0 | 800 | 60 | −0.6 | 2.0 | 40.0 | Room temperature |
| 35 | 775 | 319 | 2.0 | 800 | 60 | −0.6 | 2.0 | 40.0 | 280 |
| 36 | 775 | 319 | 2.0 | 800 | 60 | −0.6 | 2.0 | 40.0 | <u>400</u> |

*Underlined is outside the scope of the invention

TABLE 5

| | | | First heat treatment | | | | | | |
|---|---|---|---|---|---|---|---|---|---|
| Example | Ac₃ °C. | Ms °C. | Average heating rate within 650° C. or more °C./s | Highest heating temperature °C. | Holding time sec | log(PH₂O/PH₂) | H₂ volume % | Average cooling rate between 700° C. and Ms °C./s | Cooling stop temperature °C. |
| 37 | 868 | 323 | 2.0 | 880 | 60 | −0.6 | 2.0 | 40.0 | Room temperature |
| 38 | 822 | 357 | 2.0 | 840 | 60 | −0.6 | 2.0 | 40.0 | Room temperature |
| 39 | 822 | 357 | 0.7 | 835 | 60 | −0.6 | 2.0 | 40.0 | Room temperature |
| 40 | 822 | 357 | 2.0 | 835 | 60 | −0.6 | 2.0 | 40.0 | Room temperature |
| 41 | 822 | 357 | 2.0 | 850 | 60 | −0.6 | 2.0 | 40.0 | Room temperature |
| 42 | 822 | 357 | 2.0 | 840 | 60 | −0.6 | 2.0 | 40.0 | 280 |
| 43 | 822 | 357 | 2.0 | 845 | 60 | −0.6 | 2.0 | 40.0 | Room temperature |
| 44 | 822 | 357 | 2.0 | 805 | 60 | −0.6 | 2.0 | 40.0 | Room temperature |
| 45 | 822 | 357 | | | | <u>Not performed</u> | | | |
| 46 | 822 | 357 | | | | <u>Not performed</u> | | | |
| 47 | 822 | 357 | 2.0 | 850 | 60 | −0.6 | 2.0 | 40.0 | Room temperature |
| 48 | 953 | 369 | 2.0 | 970 | 60 | −0.6 | 2.0 | 40.0 | Room temperature |
| 49 | 953 | 369 | 2.0 | 970 | 60 | −0.6 | 2.0 | 40.0 | Room temperature |
| 50 | 847 | 419 | 2.0 | 860 | 60 | −0.6 | 2.0 | 40.0 | Room temperature |
| 51 | 878 | 397 | 2.0 | 910 | 60 | −0.6 | 2.0 | 40.0 | Room temperature |
| 52 | 878 | 397 | 2.0 | 910 | 60 | −0.6 | 2.0 | 40.0 | Room temperature |
| 53 | 837 | 418 | 2.0 | 850 | 60 | −0.6 | 2.0 | 40.0 | Room temperature |
| 54 | 892 | 456 | 2.0 | 920 | 60 | −0.6 | 2.0 | 40.0 | Room temperature |
| 55 | 887 | 395 | 2.0 | 930 | 60 | −0.6 | 2.0 | 40.0 | Room temperature |
| 56 | 880 | 401 | 2.0 | 895 | 60 | −0.6 | 2.0 | 40.0 | Room temperature |
| 57 | 802 | 342 | 2.0 | 880 | 60 | −0.6 | 2.0 | 40.0 | Room temperature |
| 58 | 832 | 384 | 2.0 | 850 | 60 | −0.6 | 2.0 | 40.0 | Room temperature |
| 59 | 871 | 370 | 2.0 | 890 | 60 | −0.6 | 2.0 | 40.0 | Room temperature |
| 60 | 826 | 455 | 2.0 | 875 | 60 | −0.6 | 2.0 | 40.0 | Room temperature |
| 61 | 840 | 370 | 2.0 | 860 | 60 | −0.6 | 2.0 | 40.0 | Room temperature |
| 62 | 840 | 370 | 2.0 | 860 | 60 | −0.6 | 2.0 | 40.0 | Room temperature |
| 63 | 840 | 370 | 2.0 | 855 | 60 | −0.9 | 2.0 | 40.0 | Room temperature |
| 64 | 840 | 370 | 2.0 | 860 | 60 | −0.6 | 2.0 | 40.0 | 320 |
| 65 | 840 | 370 | 2.0 | 860 | 60 | −0.6 | 2.0 | 40.0 | 170 |
| 66 | 840 | 370 | 2.0 | 855 | 60 | −0.6 | 2.0 | 40.0 | Room temperature |
| 67 | 844 | 378 | 2.0 | 905 | 60 | −0.6 | 2.0 | 40.0 | Room temperature |
| 68 | 889 | 466 | 2.0 | 920 | 60 | −0.6 | 2.0 | 40.0 | Room temperature |
| 69 | 816 | 419 | 2.0 | 870 | 60 | −0.6 | 2.0 | 40.0 | Room temperature |
| 70 | 888 | 471 | 2.0 | 905 | 60 | −0.6 | 2.0 | 40.0 | Room temperature |
| 71 | 945 | 411 | 2.0 | 965 | 60 | −0.6 | 2.0 | 40.0 | Room temperature |
| 72 | 853 | 271 | 2.0 | 895 | 60 | −0.6 | 2.0 | 40.0 | Room temperature |
| 73 | 825 | 381 | 2.0 | 845 | 60 | −0.8 | 3.0 | 40.0 | Room temperature |
| 74 | 825 | 381 | 2.0 | 855 | 60 | −0.6 | 2.0 | 40.0 | Room temperature |

TABLE 5-continued

| | | | First heat treatment | | | | | | |
|---|---|---|---|---|---|---|---|---|---|
| Example | $Ac_3$ ° C. | Ms ° C. | Average heating rate within 650° C. or more ° C./s | Highest heating temperature ° C. | Holding time sec | $\log(P_{H_2O}/P_{H_2})$ | $H_2$ volume % | Average cooling rate between 700° C. and Ms ° C./s | Cooling stop temperature ° C. |
| 75 | 825 | 381 | 2.0 | 840 | 60 | −0.6 | 2.0 | 40.0 | Room temperature |
| 76 | 825 | 381 | 2.0 | 920 | 60 | −0.3 | 2.0 | 40.0 | 200 |
| 77 | 846 | 365 | 2.0 | 880 | 60 | −0.6 | 2.0 | 40.0 | 200 |

*Underlined is outside the scope of the invention (Second Heat Treatment)

Heating to the highest heating temperature shown in Tables 6 and 7 at an average heating rate from 650° C. to the highest heating temperature shown in Tables 6 and 7 was performed, and holding at the highest heating temperature for the holding time shown in Tables 6 and 7 was performed. Then, cooling was performed at the average cooling rate shown in Tables 6 and 7, and cooling to the cooling stop temperature shown in Tables 6 and 7 was performed. Thereafter, holding at 300° C. to 480° C. for the holding time shown in Tables 6 and 7 was performed and cooling to room temperature was performed, whereby a steel sheet was obtained. In the second heat treatment, heating was performed in the atmosphere containing $H_2$ at the concentration shown in Tables 6 and 7 and having a $\log(P_{H_2O}/P_{H_2})$ of the numerical value shown in Tables 6 and 7 until the temperature reached from 650° C. to the highest heating temperature.

Next, an electrogalvanizing step is performed on some of the steel sheets after the second heat treatment to form electrogalvanized layers on both surfaces of the steel sheet, whereby electrogalvanized steel sheets (EG) were obtained.

$A_{c1}$ shown in Tables 6 and 7 was obtained by Expression (8).

$$A_{c1} = 723 - 10.7 \times Mn - 16.9 \times Ni + 29.1 \times Si + 16.9 \times Cr \quad (8)$$

(element symbols in Expression (8) indicate the mass % of the corresponding elements in steel)

TABLE 6

| | | | Second heat treatment | | | | | | | |
|---|---|---|---|---|---|---|---|---|---|---|
| Example | $Ac_1$ ° C. | $Ac_3$ ° C. | Average heating rate within 650° C. or more ° C./s | Highest heating temperature ° C. | Holding time sec | $\log(P_{H_2O}/P_{H_2})$ | $H_2$ volume % | Average cooling rate between 600° C. and 700° C. ° C./s | Cooling stop temperature ° C. | Holding time of 300–480° C. sec |
| 1 | 729 | 825 | 1.8 | 780 | 110 | −1.6 | 2.0 | 40 | 390 | 250 |
| 2 | 729 | 825 | 1.8 | 780 | 110 | −1.6 | 2.0 | 40 | 390 | 250 |
| 3 | 729 | 825 | 1.8 | 780 | 110 | −1.6 | 2.0 | 40 | 390 | 250 |
| 4 | 729 | 825 | 1.8 | 780 | 110 | −1.6 | 2.0 | 40 | 390 | 250 |
| 5 | 729 | 825 | 1.8 | 780 | 110 | −1.6 | 2.0 | 40 | 390 | 250 |
| 6 | 729 | 825 | 1.8 | 780 | 110 | −1.6 | 2.0 | 40 | 390 | 250 |
| 7 | 729 | 825 | 1.8 | 780 | 110 | −1.6 | 2.0 | 40 | 390 | 250 |
| 8 | 729 | 825 | 1.8 | 780 | 110 | −1.6 | 2.0 | 40 | 390 | 250 |
| 9 | 729 | 825 | 1.8 | 780 | 110 | −0.5 | 2.0 | 40 | 390 | 250 |
| 10 | 729 | 825 | 1.8 | 780 | 40 | −0.5 | 2.0 | 40 | 390 | 250 |
| 11 | 729 | 825 | 1.8 | 780 | 110 | −1.6 | 2.0 | 40 | 390 | 250 |
| 12 | 729 | 825 | 1.8 | 780 | 110 | −1.6 | 2.0 | 40 | 390 | 250 |
| 13 | 746 | 846 | 1.8 | 810 | 110 | −1.6 | 2.0 | 40 | 220 | 250 |
| 14 | 746 | 846 | 1.8 | 800 | 110 | −1.6 | 2.0 | 40 | 220 | 250 |
| 15 | 746 | 846 | 1.8 | 810 | 110 | −1.6 | 2.0 | 40 | 230 | 250 |
| 16 | 746 | 846 | 1.8 | 815 | 110 | −1.7 | 2.0 | 40 | 260 | 250 |
| 17 | 745 | 812 | 1.8 | 780 | 110 | −1.6 | 2.0 | 40 | 150 | 250 |
| 18 | 745 | 812 | 1.8 | 790 | 110 | −1.6 | 2.0 | 40 | 200 | 250 |
| 19 | 745 | 812 | 1.8 | 780 | 110 | −0.5 | 2.0 | 40 | 150 | 250 |
| 20 | 745 | 812 | 1.8 | 780 | 110 | −1.6 | 2.0 | 40 | 150 | 250 |
| 21 | 727 | 856 | 1.8 | 810 | 110 | −1.6 | 2.0 | 40 | 370 | 250 |
| 22 | 727 | 856 | 1.8 | 805 | 110 | −0.5 | 2.0 | 40 | 370 | 250 |
| 23 | 727 | 856 | 1.8 | 810 | 110 | −1.6 | 2.0 | 40 | 370 | 250 |
| 24 | 727 | 856 | 1.8 | 880 | 110 | −1.6 | 2.0 | 40 | 370 | 250 |
| 25 | 727 | 856 | 1.8 | 800 | 110 | −1.6 | 2.0 | 40 | 370 | 250 |
| 26 | 727 | 856 | 1.8 | 800 | 110 | −1.6 | 2.0 | 40 | 370 | 250 |
| 27 | 727 | 856 | 1.8 | 810 | 110 | −0.5 | 2.0 | 40 | 280 | 250 |
| 28 | 743 | 861 | 1.8 | 810 | 110 | −1.6 | 2.0 | 40 | 380 | 250 |
| 29 | 743 | 861 | 1.8 | 810 | 110 | −1.6 | 2.0 | 40 | 380 | 250 |
| 30 | 727 | 841 | 1.8 | 800 | 110 | −1.6 | 2.0 | 40 | 350 | 250 |
| 31 | 727 | 841 | 1.8 | 800 | 110 | −1.6 | 2.0 | 40 | 350 | 250 |
| 32 | 712 | 775 | 1.8 | 740 | 110 | −1.6 | 2.0 | 40 | 390 | 250 |
| 33 | 712 | 775 | 1.8 | 740 | 110 | −1.6 | 2.0 | 40 | 390 | 8 |

TABLE 6-continued

| | | | Second heat treatment | | | | | | | |
|---|---|---|---|---|---|---|---|---|---|---|
| Example | $Ac_1$ °C. | $Ac_3$ °C. | Average heating rate within 650° C. or more °C./s | Highest heating temperature °C. | Holding time sec | $\log(PH_2O/PH_2)$ | $H_2$ volume % | Average cooling rate between 600° C. and 700° C. °C./s | Cooling stop temperature °C. | Holding time of 300–480° C. sec |
| 34 | 712 | 775 | 1.8 | 740 | 110 | −1.6 | 2.0 | 40 | 390 | 50 |
| 35 | 712 | 775 | 1.8 | 740 | 110 | −1.6 | 2.0 | 40 | 390 | 250 |
| 36 | 712 | 775 | 1.8 | 740 | 110 | −1.6 | 2.0 | 40 | 390 | 250 |

*Underlined is outside the scope of the invention

TABLE 7

| | | | Second heat treatment | | | | | | | |
|---|---|---|---|---|---|---|---|---|---|---|
| Example | $Ac_1$ °C. | $Ac_3$ °C. | Average heating rate within 650° C. or more °C./s | Highest heating temperature °C. | Holding time sec | $\log(PH_2O/PH_2)$ | $H_2$ volume % | Average cooling rate between 600° C. and 700° C. °C./s | Cooling stop temperature °C. | Holding time of 300–480° C. sec |
| 37 | 709 | 868 | 1.8 | 790 | 110 | −1.6 | 2.0 | 40 | 390 | 250 |
| 38 | 725 | 822 | 1.8 | 780 | 110 | −1.6 | 2.0 | 40 | 410 | 250 |
| 39 | 725 | 822 | 1.8 | 780 | 110 | −1.6 | 2.0 | 40 | 380 | 250 |
| 40 | 725 | 822 | 1.8 | 785 | 5 | −1.6 | 2.0 | 40 | 380 | 250 |
| 41 | 725 | 822 | 1.8 | 785 | 110 | −1.6 | 2.0 | <u>2</u> | 375 | 250 |
| 42 | 725 | 822 | 1.8 | 785 | 110 | −1.6 | 2.0 | 40 | 380 | 250 |
| 43 | 725 | 822 | 1.8 | 770 | 110 | −1.6 | 2.0 | 40 | 365 | 250 |
| 44 | 725 | 822 | 1.8 | 780 | 110 | −1.6 | 2.0 | 40 | 365 | 250 |
| 45 | 725 | 822 | 1.8 | 790 | 110 | <u>−0.5</u> | 2.0 | 40 | 400 | 250 |
| 46 | 725 | 822 | 1.8 | 790 | 110 | −1.5 | 2.0 | 40 | 400 | 250 |
| 47 | 725 | 822 | 1.8 | 790 | 110 | −1.6 | 2.0 | 40 | 400 | 250 |
| 48 | 698 | 953 | 1.8 | 880 | 110 | <u>−0.5</u> | 2.0 | 40 | 360 | 250 |
| 49 | 698 | 953 | 1.8 | 880 | 110 | −1.5 | 2.0 | 40 | 360 | 250 |
| 50 | 758 | 847 | 1.8 | 800 | 110 | −1.5 | 2.0 | 40 | 320 | 250 |
| 51 | 744 | 878 | 1.8 | 820 | 110 | −1.6 | 2.0 | 40 | 330 | 80 |
| 52 | 744 | 878 | 1.8 | 815 | 110 | −1.6 | 2.0 | 40 | 330 | 250 |
| 53 | 725 | 837 | 1.8 | 790 | 110 | −1.6 | 2.0 | 40 | 260 | 250 |
| 54 | 751 | 892 | 1.8 | 830 | 110 | −1.6 | 2.0 | 40 | 350 | 250 |
| 55 | 706 | 887 | 1.8 | 805 | 110 | −1.6 | 2.0 | 40 | 350 | 250 |
| 56 | 757 | 880 | 1.8 | 825 | 110 | −1.6 | 2.0 | 40 | 350 | 250 |
| 57 | 724 | 802 | 1.8 | 765 | 110 | −1.6 | 2.0 | 40 | 300 | 250 |
| 58 | 733 | 832 | 1.8 | 780 | 110 | −1.6 | 2.0 | 40 | 340 | 250 |
| 59 | 758 | 871 | 1.8 | 830 | 110 | −1.5 | 2.0 | 40 | 380 | 250 |
| 60 | 728 | 826 | 1.8 | 785 | 110 | −1.6 | 2.0 | 40 | 395 | 250 |
| 61 | 741 | 840 | 1.8 | 790 | 110 | −1.6 | 2.0 | 40 | 375 | 250 |
| 62 | 741 | 840 | 1.8 | <u>740</u> | 110 | −1.6 | 2.0 | 40 | 380 | 250 |
| 63 | 741 | 840 | 1.8 | 790 | 110 | −1.6 | 2.0 | 40 | 400 | 250 |
| 64 | 741 | 840 | 1.8 | 775 | 110 | −1.5 | 2.0 | 40 | 380 | 250 |
| 65 | 741 | 840 | 1.8 | 825 | 110 | −1.6 | 2.0 | 40 | 370 | 250 |
| 66 | 741 | 840 | 1.8 | 795 | 110 | −1.6 | 2.0 | 40 | 380 | 250 |
| 67 | 742 | 844 | 1.8 | 800 | 110 | −1.5 | 2.0 | 40 | 400 | 250 |
| 68 | 737 | 889 | 1.8 | 810 | 110 | −1.6 | 2.0 | 40 | 400 | 250 |
| 69 | 714 | 816 | 1.8 | 775 | 110 | −1.6 | 2.0 | 40 | 370 | 250 |
| 70 | 752 | 888 | 1.8 | 820 | 110 | −1.6 | 2.0 | 40 | 390 | 250 |
| 71 | 803 | 945 | 1.8 | 875 | 110 | −1.6 | 2.0 | 40 | 390 | 250 |
| 72 | 699 | 853 | 1.8 | 765 | 110 | −1.6 | 2.0 | 40 | 390 | 250 |
| 73 | 729 | 825 | 1.8 | 780 | 110 | −1.6 | 4.0 | 40 | 390 | 250 |
| 74 | 729 | 825 | 15.0 | 795 | 110 | −1.6 | 2.0 | 40 | 390 | 250 |
| 75 | 729 | 825 | 0.5 | 770 | 110 | −1.6 | 2.0 | 40 | 390 | 250 |
| 76 | 729 | 825 | 1.8 | 790 | 110 | −1.6 | 2.0 | 40 | 400 | 250 |
| 77 | 746 | 846 | 1.8 | 800 | 110 | −1.6 | 2.0 | 40 | 150 | 250 |

*Underlined is outside the scope of the invention

Next, for each of the steel sheets thus obtained, the steel structure (the steel structure of the steel sheet inside) in the range from ⅛ thickness to ⅜ thickness centered on the ¼ thickness position from the surface was measured by the above-described method, and the volume fractions of soft ferrite, retained austenite, tempered martensite, fresh martensite, and the sum of pearlite and cementite (pearlite+cementite) were examined. Furthermore, the volume fractions of bainite and hard ferrite were also examined.

In addition, for the inside of each of the steel sheets, the number proportion of retained austenite having an aspect ratio of 2.0 or more in the total retained austenite was examined by the above-described method.

The results are shown in Tables 8 and 9.

TABLE 8

| | Internal structure | | | | | | | | |
|---|---|---|---|---|---|---|---|---|---|
| | | Retained austenite | | | | | | | |
| Example | Soft ferrite volume % | Volume fraction volume % | Number proportion of aspect ratio >2.0 % | Tempered martensite volume % | Fresh martensite volume % | Pearlite + Cementite volume % | Bainite volume % | Hard ferrite volume % | Main remainder structure | Remarks |
| 1 | 8 | 13 | 90 | 0 | 3 | 0 | 15 | 61 | Hard α | Example |
| 2 | 33 | 14 | 45 | 0 | 7 | 0 | 14 | 32 | Hard α | Comparative example |
| 3 | 5 | 13 | 86 | 0 | 3 | 0 | 12 | 67 | Hard α | Comparative example |
| 4 | 7 | 14 | 65 | 0 | 6 | 0 | 15 | 58 | Hard α | Example |
| 5 | 7 | 14 | 40 | 0 | 5 | 0 | 30 | 44 | Hard α | Comparative example |
| 6 | 5 | 14 | 80 | 0 | 4 | 0 | 15 | 62 | Hard α | Comparative example |
| 7 | 21 | 14 | 70 | 0 | 4 | 0 | 28 | 33 | Hard α | Example |
| 8 | 37 | 14 | 66 | 0 | 4 | 0 | 30 | 15 | Bainite | Comparative example |
| 9 | 6 | 14 | 84 | 0 | 3 | 0 | 13 | 64 | Hard α | Comparative example |
| 10 | 7 | 13 | 80 | 0 | 4 | 0 | 14 | 62 | Hard α | Comparative example |
| 11 | 36 | 14 | 42 | 0 | 5 | 0 | 45 | 0 | Bainite | Comparative example |
| 12 | 8 | 14 | 86 | 0 | 4 | 0 | 16 | 58 | Hard α | Example |
| 13 | 4 | 15 | 87 | 19 | 3 | 0 | 10 | 49 | Hard α | Example |
| 14 | 4 | 17 | 89 | 20 | 3 | 0 | 10 | 46 | Hard α | Example |
| 15 | 5 | 16 | 80 | 15 | 3 | 0 | 11 | 50 | Hard α | Comparative example |
| 16 | 26 | 15 | 45 | 23 | 5 | 0 | 31 | 0 | Bainite | Comparative example |
| 17 | 0 | 27 | 73 | 25 | 8 | 0 | 0 | 40 | Hard α | Example |
| 18 | 0 | 21 | 62 | 15 | 18 | 0 | 7 | 39 | Hard α | Example |
| 19 | 0 | 26 | 77 | 25 | 8 | 0 | 2 | 39 | Hard α | Comparative example |
| 20 | 0 | 28 | 75 | 25 | 7 | 0 | 3 | 37 | Hard α | Example |
| 21 | 22 | 6 | 82 | 0 | 3 | 0 | 15 | 54 | Hard α | Example |
| 22 | 9 | 6 | 87 | 0 | 4 | 0 | 14 | 67 | Hard α | Comparative example |
| 23 | 8 | 5 | 81 | 0 | 4 | 0 | 17 | 66 | Hard α | Comparative example |
| 24 | 8 | 1 | 52 | 45 | 4 | 0 | 42 | 0 | Bainite | Comparative example |
| 25 | 18 | 6 | 78 | 0 | 2 | 0 | 16 | 58 | Hard α | Example |
| 26 | 7 | 5 | 80 | 0 | 2 | 0 | 20 | 66 | Hard α | Example |
| 27 | 40 | 0 | — | 29 | 2 | 0 | 29 | 0 | Bainite | Comparative example |
| 28 | 7 | 11 | 83 | 0 | 3 | 0 | 14 | 65 | Hard α | Example |
| 29 | 5 | 11 | 83 | 0 | 3 | 0 | 14 | 67 | Hard α | Example |
| 30 | 6 | 8 | 83 | 0 | 3 | 0 | 12 | 71 | Hard α | Example |
| 31 | 7 | 9 | 81 | 0 | 3 | 0 | 14 | 67 | Hard α | Example |
| 32 | 5 | 19 | 84 | 0 | 5 | 0 | 10 | 61 | Hard α | Example |
| 33 | 8 | 18 | 89 | 0 | 31 | 0 | 8 | 35 | Hard α | Comparative example |
| 34 | 8 | 18 | 81 | 0 | 13 | 0 | 10 | 51 | Hard α | Example |
| 35 | 8 | 20 | 87 | 0 | 4 | 0 | 11 | 57 | Hard α | Example |
| 36 | 18 | 18 | 39 | 14 | 10 | 0 | 30 | 10 | Bainite | Comparative example |

*Underlined is outside the scope of the invention

TABLE 9

| | Internal structure | | | | | | | | |
|---|---|---|---|---|---|---|---|---|---|
| | | Retained austenite | | | | | | | |
| Example | Soft ferrite volume % | Volume fraction volume % | Number proportion of aspect ratio ≥2.0 % | Tempered martensite volume % | Fresh martensite volume % | Pearlite + Cementite volume % | Bainite volume % | Hard ferrite volume % | Main remainder structure | Remarks |
| 37 | 8 | 22 | 81 | 0 | 8 | 0 | 12 | 50 | Hard α | Example |
| 38 | 7 | 13 | 89 | 0 | 4 | 0 | 15 | 61 | Hard α | Example |
| 39 | 8 | 14 | 68 | 0 | 4 | 0 | 15 | 59 | Hard α | Example |
| 40 | 9 | 6 | 87 | 0 | 3 | 6 | 11 | 65 | Hard α | Example |
| 41 | 6 | 3 | 84 | 0 | 1 | 12 | 13 | 65 | Hard α | Comparative example |
| 42 | 9 | 15 | 78 | 0 | 3 | 0 | 14 | 59 | Hard α | Example |

TABLE 9-continued

| | | Retained austenite | | | | | | | | |
|---|---|---|---|---|---|---|---|---|---|---|
| Example | Soft ferrite volume % | Volume fraction volume % | Number proportion of aspect ratio ≥2.0 % | Tempered martensite volume % | Fresh martensite volume % | Pearlite + Cementite volume % | Bainite volume % | Hard ferrite volume % | Main remainder structure | Remarks |
| 43 | 8 | 13 | 79 | 0 | 3 | 0 | 13 | 63 | Hard α | Example |
| 44 | 25 | 14 | 81 | 0 | 3 | 0 | 10 | 48 | Hard α | Example |
| 45 | 12 | 14 | _45_ | 0 | 8 | 0 | 66 | _0_ | Bainite | Comparative example |
| 46 | 13 | 15 | _48_ | 0 | 8 | 0 | 64 | _0_ | Bainite | Comparative example |
| 47 | 6 | 15 | 63 | 0 | 4 | 0 | 12 | 63 | Hard α | Example |
| 48 | 9 | 14 | 87 | 0 | 2 | 0 | 14 | 61 | Hard α | Comparative example |
| 49 | 8 | 14 | 89 | 0 | 2 | 0 | 12 | 64 | Hard α | Example |
| 50 | 25 | 12 | 89 | 0 | 2 | 7 | 9 | 45 | Hard α | Example |
| 51 | 6 | 7 | 85 | 0 | 11 | 0 | 10 | 66 | Hard α | Example |
| 52 | 7 | 9 | 83 | 0 | 2 | 0 | 15 | 67 | Hard α | Example |
| 53 | 5 | 4 | 88 | 32 | 0 | 0 | 16 | 43 | Hard α | Example |
| 54 | 5 | 5 | 83 | 0 | 4 | 0 | 14 | 72 | Hard α | Example |
| 55 | 6 | 11 | 80 | 0 | 1 | 0 | 15 | 67 | Hard α | Example |
| 56 | 3 | 14 | 89 | 0 | 4 | 0 | 12 | 67 | Hard α | Example |
| 57 | 0 | 16 | 87 | 0 | 7 | 0 | 13 | 64 | Hard α | Example |
| 58 | 0 | 14 | 82 | 0 | 3 | 0 | 16 | 67 | Hard α | Example |
| 59 | 0 | 16 | 85 | 0 | 5 | 0 | 14 | 65 | Hard α | Example |
| 60 | 24 | 5 | 82 | 17 | 0 | 6 | 9 | 39 | Hard α | Example |
| 61 | 2 | 17 | 87 | 0 | 4 | 0 | 15 | 62 | Hard α | Example |
| 62 | 5 | _1_ | 84 | 0 | 2 | 6 | 86 | _0_ | Bainite | Comparative example |
| 63 | 3 | 17 | 82 | 0 | 3 | 0 | 16 | 61 | Hard α | Example |
| 64 | 5 | 16 | 66 | 0 | 4 | 0 | 15 | 60 | Hard α | Example |
| 65 | 12 | 12 | 64 | 10 | 6 | 0 | 13 | 47 | Hard α | Example |
| 66 | 4 | 17 | 82 | 0 | 4 | 0 | 17 | 58 | Hard α | Example |
| 67 | 3 | 15 | 89 | 0 | 4 | 0 | 15 | 63 | Hard α | Example |
| 68 | 26 | _2_ | 80 | 0 | 4 | 0 | 10 | 58 | Hard α | Comparative example |
| 69 | 13 | 5 | 88 | 0 | 2 | 0 | 15 | 65 | Hard α | Comparative example |
| 70 | _68_ | 4 | _35_ | 0 | 0 | 8 | 4 | 16 | Hard α | Comparative example |
| 71 | 4 | 20 | 87 | 0 | 12 | 0 | 11 | 53 | Hard α | Comparative example |
| 72 | 0 | 8 | _36_ | 0 | 25 | 0 | 10 | 57 | Hard α | Comparative example |
| 73 | 6 | 14 | 81 | 0 | 3 | 0 | 15 | 62 | Hard α | Example |
| 74 | 7 | 14 | 85 | 0 | 4 | 0 | 16 | 59 | Hard α | Example |
| 75 | 23 | 14 | 70 | 0 | 6 | 0 | 11 | 46 | Hard α | Example |
| 76 | 6 | 14 | 88 | 0 | 6 | 0 | 12 | 62 | Hard α | Example |
| 77 | 5 | 7 | 90 | 65 | 0 | 0 | 0 | 23 | Hard α | Example |

*Underlined is outside the scope of the invention

Next, for each of the steel sheets, the steel structure was measured by the above-described method, and the thickness (depth range from the surface) of the soft layer and the number proportion of grains having an aspect ratio of less than 3.0 among ferrite grains contained in the soft layer were examined.

In addition, for each of the steel sheets, the steel structure was measured by the above-described method, and the ratio between the volume fraction of retained austenite in the soft layer and the volume fraction of retained austenite in the range from ⅛ thickness to ⅜ thickness (residual γ volume percentage in the soft layer/residual γ volume percentage of the steel sheet inside) was examined.

The results are shown in Tables 10 and 11.

Furthermore, each of the steel sheets was analyzed by the radio frequency glow discharge optical emission spectrometry method in the depth direction from the surface by the above-described method, and whether or not a peak (a peak indicating that an internal oxide layer containing Si oxides was included) of the emission intensity at a wavelength indicating Si had appeared in a depth range of more than 0.2 μm to 5 μm or less was examined. In addition, for each of the steel sheets, the peak of the emission intensity at a wavelength indicating Si appearing in the depth range of more than 0.2 μm to 5 μm or less in the depth direction from the surface was evaluated as an internal oxide peak "present", and no peak appeared was evaluated as an internal oxide peak "absent". The results are shown in Tables 10 and 11.

"EG" described regarding the surface in Tables 10 and 11 indicates the electrogalvanized steel sheet.

TABLE 10

| | | Surface layer structure | | | |
|---|---|---|---|---|---|
| Example | Surface | Soft layer thickness μm | Volume fraction of grains having an aspect ratio of less than 3.0 among ferrite volume % | Residual γ volume percentage in the soft layer/residual γ volume percentage of the steel sheet inside % | Internal oxide peak | Remarks |
| 1 | | 25 | 77 | 62 | Present | Example |
| 2 | | 22 | 79 | 64 | Present | Comparative example |
| 3 | | 110 | 82 | 37 | Present | Comparative example |
| 4 | | 23 | 75 | 67 | Present | Example |
| 5 | | 29 | 77 | 65 | Present | Comparative example |
| 6 | | 0 | — | — | Absent | Comparative example |
| 7 | | 30 | 82 | 65 | Present | Example |
| 8 | | 29 | 85 | 66 | Present | Comparative example |
| 9 | | 38 | 84 | 14 | Present | Comparative example |
| 10 | | 40 | 81 | 15 | Present | Comparative example |
| 11 | | 0 | — | — | Absent | Comparative example |
| 12 | | 24 | 74 | 60 | Present | Example |
| 13 | | 34 | 73 | 70 | Present | Example |
| 14 | | 36 | 75 | 66 | Present | Example |
| 15 | | 0 | — | — | Absent | Comparative example |
| 16 | | 0 | — | — | Absent | Comparative example |
| 17 | | 44 | 83 | 66 | Present | Example |
| 18 | | 41 | 79 | 76 | Present | Example |
| 19 | | 58 | 85 | 15 | Present | Comparative example |
| 20 | | 40 | 82 | 65 | Present | Example |
| 21 | | 14 | 87 | 58 | Present | Example |
| 22 | | 19 | 88 | 10 | Present | Comparative example |
| 23 | | 0 | — | — | Absent | Comparative example |
| 24 | | 9 | 76 | 70 | Present | Comparative example |
| 25 | | 12 | 85 | 61 | Present | Example |
| 26 | | 15 | 83 | 55 | Present | Example |
| 27 | | 10 | 80 | — | Present | Comparative example |
| 28 | | 26 | 75 | 66 | Present | Example |
| 29 | | 28 | 72 | 57 | Present | Example |
| 30 | | 19 | 74 | 72 | Present | Example |
| 31 | | 17 | 77 | 67 | Present | Example |
| 32 | | 32 | 79 | 65 | Present | Example |
| 33 | | 34 | 80 | 65 | Present | Comparative example |
| 34 | | 31 | 75 | 63 | Present | Example |
| 35 | | 35 | 78 | 67 | Present | Example |
| 36 | | 33 | 75 | 74 | Present | Comparative example |

*Underlined is outside the scope of the invention

TABLE 11

| | | Surface layer structure | | | |
|---|---|---|---|---|---|
| Example | Surface | Soft layer thickness μm | Volume fraction of grains having an aspect ratio of less than 3.0 among ferrite volume % | Residual γ volume percentage in the soft layer/residual γ volume percentage of the steel sheet inside % | Internal oxide peak | Remarks |
| 37 | | 35 | 77 | 69 | Present | Example |
| 38 | | 26 | 81 | 67 | Present | Example |
| 39 | | 28 | 75 | 62 | Present | Example |
| 40 | | 36 | 79 | 66 | Present | Example |
| 41 | | 48 | 91 | 0 | Present | Comparative example |
| 42 | | 25 | 80 | 70 | Present | Example |
| 43 | | 25 | 71 | 60 | Present | Example |
| 44 | | 27 | 75 | 72 | Present | Example |
| 45 | | 39 | 84 | 22 | Present | Comparative example |
| 46 | | 0 | — | — | Absent | Comparative example |
| 47 | | 26 | 83 | 69 | Present | Example |
| 48 | | 38 | 83 | 10 | Present | Comparative example |
| 49 | | 27 | 77 | 73 | Present | Example |
| 50 | | 18 | 86 | 78 | Present | Example |

TABLE 11-continued

| | | Surface layer structure | | | | |
|---|---|---|---|---|---|---|
| Example | Surface | Soft layer thickness μm | Volume fraction of grains having an aspect ratio of less than 3.0 among ferrite volume % | Residual γ volume percentage in the soft layer/residual γ volume percentage of the steel sheet inside % | Internal oxide peak | Remarks |
| 51 | | 21 | 78 | 69 | Present | Example |
| 52 | EG | 23 | 74 | 61 | Present | Example |
| 53 | | 31 | 80 | 81 | Present | Example |
| 54 | | 16 | 78 | 79 | Present | Example |
| 55 | | 30 | 74 | 75 | Present | Example |
| 56 | | 28 | 68 | 71 | Present | Example |
| 57 | | 28 | 76 | 62 | Present | Example |
| 58 | | 33 | 77 | 57 | Present | Example |
| 59 | | 25 | 81 | 61 | Present | Example |
| 60 | | 31 | 73 | 68 | Present | Example |
| 61 | | 27 | 75 | 60 | Present | Example |
| 62 | | 25 | 72 | <u>0</u> | Present | Comparative example |
| 63 | | 20 | 53 | 92 | Present | Example |
| 64 | | 30 | 71 | 65 | Present | Example |
| 65 | | 14 | 70 | 78 | Present | Example |
| 66 | EG | 28 | 80 | 80 | Present | Example |
| 67 | | 24 | 65 | 67 | Present | Example |
| 68 | | <u>10</u> | 90 | <u>0</u> | Present | <u>Comparative example</u> |
| 69 | | <u>20</u> | 79 | 64 | Present | <u>Comparative example</u> |
| 70 | | <u>11</u> | 95 | 50 | Present | <u>Comparative example</u> |
| 71 | | <u>45</u> | 76 | 58 | Present | <u>Comparative example</u> |
| 72 | | 16 | <u>51</u> | 66 | Present | <u>Comparative example</u> |
| 73 | | 19 | 76 | 71 | Present | Example |
| 74 | | 32 | 70 | 64 | Present | Example |
| 75 | | 15 | 72 | 80 | Present | Example |
| 76 | | 90 | 86 | 61 | Present | Example |
| 77 | | 33 | 78 | 65 | Present | Example |

*Underlined is outside the scope of the invention

Moreover, for each of the steel sheets, the maximum tensile stress (TS), elongation (El), hole expansibility (hole expansion ratio), bendability (minimum bend radius), and fatigue resistance (fatigue limit/TS) were examined by the following methods. The results are shown in Tables 12 and 13.

A JIS No. 5 tensile test piece was taken so that the direction perpendicular to the rolling direction was the tensile direction, the maximum tensile stress and elongation were measured according to JIS Z 2241, and the hole expansibility was measured according to JIS Z 2256. Those having a maximum tensile stress of 700 MPa or more were evaluated as good.

In addition, in order to evaluate the balance between strength, elongation, and hole expansibility, a value represented by Expression (11) was calculated using the results of the maximum tensile stress (TS), elongation (El), and hole expansibility (hole expansion ratio) measured by the above-described methods. In a case where the value represented by Expression (11) was $80 \times 10^{-7}$ or more, the balance between strength, elongation, and hole expansibility was evaluated as good.

$$TS^2 \times El \times \lambda \quad (11)$$

(in Expression (11), TS represents the maximum tensile stress (MPa), El represents the elongation (%), and λ represents the hole expansibility (%))

The results are shown in Tables 12 and 13.

Based on JIS Z 2248, a steel sheet was cut out in a direction perpendicular to the rolling direction and the end surface was mechanically ground to produce a 35 mm×100 mm test piece. Then, a 90 degree V-bending test was performed on the produced test piece using a 90° die and a punch with a tip R of 0.5 to 6 mm. The bend ridge of the test piece after the bending test was observed with a magnifying glass, and the minimum bend radius without cracking was determined as a limit bend radius. Steel sheets with a limit bend radius of less than 3.0 mm were evaluated to have good bendability.

The fatigue resistance strength was evaluated by a plane bending fatigue test. A JIS No. 1 test piece was used as the test piece, and a stress ratio was set to −1. A repetition frequency was set to 25 Hz, and the maximum stress that did not cause fracture at the number of repetitions of $10^7$ was determined as a fatigue limit. Then, a steel sheet having a ratio of the fatigue limit to the maximum tensile stress (TS) (fatigue limit/TS) of 0.45 or more was evaluated to have good fatigue resistance.

The chemical convertibility of each of the steel sheets was measured by the method described below.

Each of the steel sheets was cut into 70 mm×150 mm, and an 18 g/l aqueous solution of a degreasing agent (trade name: FINECLEANER E2083) manufactured by Nihon Parkerizing Co., Ltd. was sprayed and applied thereto at 40° C. for 120 seconds. Next, the steel sheet to which the degreasing agent was applied was washed with water to be degreased, and immersed in a 0.5 g/l aqueous solution of a surface conditioner (trade name: PREPALENE XG) manufactured by Nippon Parkerizing Co., Ltd. at room temperature for 60 seconds. Thereafter, the steel sheet to which the surface conditioner was applied was immersed in a zinc phosphate treatment agent (trade name: PALBOND L3065) manufactured by Nippon Parkerizing Co., Ltd. for 120 seconds, washed with water, and dried. As a result, a chemical conversion film formed of the zinc phosphate coating was formed on the surface of the steel sheet.

A test piece having a width of 70 min and a length of 150 mm was taken from the steel sheet on which the chemical conversion film was formed. Thereafter, three locations (center portion and both end portions) along the length direction of the test piece were observed with a scanning electron microscope (SEM) at a magnification of 1,000 folds. For each test piece, the degree of adhesion of grains of the chemical conversion film was evaluated according to the following criteria.

"G" (GOOD) Points that are not coated with the chemical conversion coating are not clearly seen on the surface.

"B" (BAD) Points that are not coated with the chemical conversion coating are clearly seen on the surface.

TABLE 12

| Example | Mechanical properties | | | | | | | |
|---|---|---|---|---|---|---|---|---|
| | TS MPa | El % | Hole expansion ratio % | $TS^2 \times El \times \lambda \times 10^{-7}$ | Limit bend radius mm | Fatigue limit/TS | Chemical convertibility | Remarks |
| 1 | 1012 | 27.8 | 50 | 143 | 1.0 | 0.48 | G | Example |
| 2 | 998 | 29.7 | 14 | <u>41</u> | 1.0 | 0.49 | G | Comparative example |
| 3 | 865 | 31.1 | 51 | 119 | 1.0 | <u>0.35</u> | G | Comparative example |
| 4 | 1077 | 27.0 | 34 | 105 | 2.0 | 0.48 | G | Example |
| 5 | 1055 | 27.4 | 26 | <u>79</u> | <u>3.0</u> | 0.48 | G | Comparative example |
| 6 | 1062 | 26.8 | 45 | 135 | <u>3.5</u> | 0.52 | <u>B</u> | Comparative example |
| 7 | 984 | 29.6 | 35 | 99 | 1.0 | 0.49 | G | Example |
| 8 | 918 | 31.6 | 27 | <u>72</u> | 2.0 | 0.48 | G | Comparative example |
| 9 | 993 | 28.6 | 48 | 136 | 1.0 | <u>0.36</u> | G | Comparative example |
| 10 | 1035 | 27.1 | 44 | 129 | 1.0 | <u>0.36</u> | G | Comparative example |
| 11 | 958 | 30.9 | 15 | <u>44</u> | <u>4.0</u> | 0.50 | <u>B</u> | Comparative example |
| 12 | 1034 | 27.9 | 46 | 136 | 1.0 | 0.48 | G | Example |
| 13 | 1213 | 21.2 | 48 | 149 | 1.5 | 0.48 | G | Example |
| 14 | 1223 | 21.7 | 48 | 155 | 1.5 | 0.48 | G | Example |
| 15 | 1199 | 22.7 | 44 | 145 | <u>3.0</u> | 0.50 | <u>B</u> | Comparative example |
| 16 | 1219 | 21.5 | 19 | <u>62</u> | <u>4.0</u> | 0.50 | <u>B</u> | Comparative example |
| 17 | 1530 | 22.3 | 27 | 142 | 2.0 | 0.48 | G | Example |
| 18 | 1611 | 20.6 | 15 | 80 | 2.5 | 0.46 | G | Example |
| 19 | 1492 | 22.1 | 29 | 144 | 1.5 | <u>0.30</u> | G | Comparative example |
| 20 | 1513 | 22.6 | 30 | 154 | 2.0 | 0.49 | G | Example |
| 21 | 720 | 37.3 | 48 | 93 | 1.0 | 0.48 | G | Example |
| 22 | 770 | 34.4 | 53 | 108 | 1.0 | <u>0.37</u> | G | Comparative example |
| 23 | 812 | 32.6 | 51 | 109 | <u>4.0</u> | 0.52 | <u>B</u> | Comparative example |
| 24 | 1149 | 10.3 | 38 | <u>51</u> | 2.0 | 0.48 | G | Comparative example |
| 25 | 736 | 32.2 | 53 | 93 | 1.0 | 0.48 | G | Example |
| 26 | 779 | 30.0 | 58 | 106 | 1.0 | 0.48 | G | Example |
| 27 | 845 | 21.1 | 49 | <u>74</u> | 1.0 | <u>0.39</u> | G | Comparative example |
| 28 | 950 | 27.8 | 50 | 124 | 1.0 | 0.48 | G | Example |
| 29 | 956 | 27.5 | 50 | 127 | 1.0 | 0.48 | G | Example |
| 30 | 913 | 27.5 | 52 | 118 | 1.0 | 0.48 | G | Example |
| 31 | 911 | 27.9 | 50 | 116 | 1.0 | 0.48 | G | Example |
| 32 | 1211 | 26.8 | 41 | 160 | 1.5 | 0.48 | G | Example |
| 33 | 1708 | 21.9 | 9 | <u>57</u> | <u>5.0</u> | 0.48 | G | Comparative example |
| 34 | 1359 | 25.0 | 23 | 104 | 2.0 | 0.49 | G | Example |
| 35 | 1180 | 28.0 | 42 | 165 | 1.5 | 0.48 | G | Example |
| 36 | 1363 | 22.4 | 9 | <u>37</u> | <u>3.5</u> | 0.48 | G | Comparative example |

*Underlined values do not meet the acceptance criteria of the invention

TABLE 13

| Example | Mechanical properties | | | | | | | |
|---|---|---|---|---|---|---|---|---|
| | TS MPa | El % | Hole expansion ratio % | $TS^2 \times El \times \lambda \times 10^{-7}$ | Limit bend radius mm | Fatigue limit/TS | Chemical convertibility | Remarks |
| 37 | 1306 | 27.4 | 24 | 110 | 1.5 | 0.48 | G | Example |
| 38 | 1034 | 27.4 | 48 | 140 | 1.0 | 0.48 | G | Example |
| 39 | 1028 | 27.9 | 39 | 114 | 2.0 | 0.48 | G | Example |
| 40 | 1008 | 24.3 | 40 | 99 | 2.0 | 0.48 | G | Example |
| 41 | 929 | 22.4 | 35 | <u>67</u> | <u>3.0</u> | 0.48 | G | Comparative example |
| 42 | 1006 | 26.6 | 44 | 119 | 1.0 | 0.48 | G | Example |
| 43 | 1008 | 25.9 | 46 | 120 | 1.0 | 0.48 | G | Example |
| 44 | 940 | 28.5 | 40 | 101 | 1.5 | 0.48 | G | Example |
| 45 | 1097 | 26.5 | 20 | <u>64</u> | 1.0 | <u>0.37</u> | G | Comparative example |
| 46 | 1109 | 27.0 | 20 | <u>67</u> | <u>4.0</u> | 0.54 | <u>B</u> | Comparative example |

TABLE 13-continued

| Example | TS MPa | El % | Hole expansion ratio % | $TS^2 \times El \times \lambda \times 10^{-7}$ | Limit bend radius mm | Fatigue limit/TS | Chemical convert- ibility | Remarks |
|---|---|---|---|---|---|---|---|---|
| 47 | 1036 | 28.0 | 37 | 111 | 1.5 | 0.48 | G | Example |
| 48 | 947 | 29.4 | 51 | 134 | 1.0 | 0.35 | G | Comparative example |
| 49 | 995 | 28.4 | 52 | 145 | 1.0 | 0.49 | G | Example |
| 50 | 915 | 30.0 | 40 | 99 | 2.0 | 0.47 | G | Example |
| 51 | 1064 | 23.3 | 36 | 95 | 2.0 | 0.48 | G | Example |
| 52 | 886 | 28.4 | 53 | 119 | 1.0 | 0.48 | G | Example |
| 53 | 1054 | 15.6 | 61 | 105 | 1.0 | 0.47 | G | Example |
| 54 | 819 | 28.4 | 53 | 100 | 1.0 | 0.47 | G | Example |
| 55 | 941 | 28.0 | 53 | 131 | 1.0 | 0.48 | G | Example |
| 56 | 1013 | 27.9 | 37 | 107 | 1.5 | 0.48 | G | Example |
| 57 | 1223 | 25.3 | 41 | 155 | 1.5 | 0.49 | G | Example |
| 58 | 1070 | 26.6 | 49 | 150 | 1.0 | 0.49 | G | Example |
| 59 | 1061 | 28.0 | 45 | 143 | 1.0 | 0.48 | G | Example |
| 60 | 970 | 22.0 | 44 | 91 | 1.5 | 0.48 | G | Example |
| 61 | 1094 | 27.7 | 47 | 155 | 1.0 | 0.48 | G | Example |
| 62 | 890 | 19.3 | 46 | 71 | 3.5 | 0.48 | G | Comparative example |
| 63 | 1076 | 28.3 | 46 | 152 | 2.5 | 0.49 | G | Example |
| 64 | 1084 | 27.7 | 38 | 123 | 1.0 | 0.49 | G | Example |
| 65 | 1172 | 22.6 | 32 | 98 | 1.5 | 0.48 | G | Example |
| 66 | 1086 | 27.9 | 44 | 145 | 1.0 | 0.48 | G | Example |
| 67 | 1026 | 28.1 | 49 | 144 | 1.0 | 0.48 | G | Example |
| 68 | 585 | 38.2 | 47 | 62 | 1.0 | 0.47 | G | Comparative example |
| 69 | 919 | 25.9 | 14 | 31 | 6.0 | 0.48 | G | Comparative example |
| 70 | 631 | 33.7 | 84 | 113 | 2.0 | 0.45 | G | Comparative example |
| 71 | 1204 | 22.8 | 5 | 17 | 5.0 | 0.48 | B | Comparative example |
| 72 | 1494 | 9.8 | 6 | 13 | 5.0 | 0.48 | G | Comparative example |
| 73 | 1030 | 26.9 | 46 | 131 | 1.0 | 0.50 | G | Example |
| 74 | 1018 | 27.3 | 51 | 144 | 1.0 | 0.51 | G | Example |
| 75 | 984 | 29.0 | 35 | 98 | 1.0 | 0.49 | G | Example |
| 76 | 915 | 31.9 | 51 | 136 | 1.0 | 0.45 | G | Example |
| 77 | 1302 | 15.0 | 42 | 107 | 2.0 | 0.47 | G | Example |

*Underlined values do not meet the acceptance criteria of the invention

The steel sheets of examples of the present invention had high strength, good balance between strength, elongation and hole expansibility, and good fatigue resistance, bendability, and chemical convertibility.

Regarding the steel sheets of Experimental Examples Nos. 11, 16, 27, 45, and 46, since the first heat treatment was not performed, the metallographic structure did not contain hard ferrite, and the balance between strength, elongation, and hole expansion ratio was poor.

In the steel sheet of Experimental Example No. 2', since the highest heating temperature in the first heat treatment was low, the number proportion of retained austenite having an aspect ratio of 2.0 or more was insufficient, and the balance between strength, elongation, and hole expansion ratio was poor.

In the steel sheet of Experimental Example No. 3, since the highest heating temperature in the first heat treatment was high, the thickness of the soft layer in the steel sheet for a heat treatment and the steel sheet was large, and the fatigue resistance was low.

In the steel sheet of Experimental Example No. 5, since the average heating rate from 650° C. to the highest heating temperature in the first heat treatment was slow, the number proportion of retained austenite having an aspect ratio of 2.0 or more was insufficient, and the balance between strength, elongation, and hole expansion ratio was poor.

In the steel sheets of Experimental Examples Nos. 6, 15, and 23, since the $\log(PH_2O/PH_2)$ in the first heat treatment was low, the thickness of the soft layer in the steel sheet for a heat treatment and the steel sheet was insufficient, and the bendability was poor.

In the steel sheet of Experimental Example No. 8, since the cooling rate in the first heat treatment was slow, the lath-like structure of the steel sheet for a heat treatment was insufficient, and the fraction of soft ferrite in the internal structure of the steel sheet was large. For this reason, the steel sheet of Experimental Example No. 8 had a poor balance between strength, elongation, and hole expansion ratio.

In the steel sheets of Experimental Examples Nos. 9, 10, 19, 22, and 48, since the $\log(PH_2O/PH_2)$ in the second heat treatment was high, the ratio between the residual γ volume percentage in the soft layer and the residual γ volume percentage of the steel sheet inside was insufficient, and the fatigue resistance was poor.

Regarding the steel sheets of Experimental Examples Nos. 6, 15, and 23, since the $\log(PH_2O/PH_2)$ in both the first heat treatment and the second heat treatment was low, no internal oxide layer was formed, and the chemical convertibility was evaluated as "B". Regarding the steel sheets of Experimental Examples Nos. 11, 16, and 46, since the first heat treatment was not performed and the $\log(PH_2O/PH_2)$ in the second heat treatment was low, no internal oxide layer was formed, and the chemical convertibility was evaluated as "B".

In the steel sheet of Experimental Example No. 24, since the maximum attainment temperature in the second heat treatment was high, the metallographic structure did not contain hard ferrite, and the balance between strength, elongation, and hole expansion ratio was poor.

In the steel sheet of Experimental Example No. 33, since the holding time at 300° C. to 480° C. in the second heat treatment was insufficient, the fraction of fresh martensite in the internal structure was large, and the balance between strength, elongation and hole expansion ratio was poor.

In the steel sheet of Experimental Example No. 36, since the cooling stop temperature in the first heat treatment was high, the number proportion of retained austenite having an aspect ratio of 2.0 or more was insufficient, and the balance between strength, elongation, and hole expansion ratio was poor.

In the steel sheet of Experimental Example No. 41, since the cooling rate in the second heat treatment was slow, the fraction of the sum of pearlite and cementite in the internal structure of the steel sheet was large, and the balance between strength, elongation, and hole expansion ratio was poor.

In the steel sheet of Experimental Example No. 62, since the highest heating temperature in the second heat treatment was low, the fraction of retained austenite in the internal structure of the steel sheet was insufficient, and the balance between strength, elongation, and hole expansion ratio was poor.

In the steel sheets of Experimental Examples Nos. 68 to 72, the chemical composition was outside the range of the present invention. In the steel sheet of Experimental Example No. 68, since the C content was insufficient, the maximum tensile stress (TS) was insufficient. In the steel sheet of Experimental Example No. 69, since the Nb content was large, the bendability was poor. In the steel sheet of Experimental Example No. 70, since the Mn content was insufficient, the maximum tensile stress (TS) was insufficient. In the steel sheet of Experimental Example No. 71, since the Si content was large, the hole expansibility was poor. In the steel sheet of Experimental Example No. 72, since the Mn content and the P content were large, the elongation and the hole expansibility were poor.

Example 2

Steel having the chemical composition shown in Table 14 was melted to produce a slab. This slab was heated at the slab heating temperature shown in Tables 15 and 16 under the slab heating conditions having the numerical values of Expression (4) shown in Tables 15 and 16, and subjected to hot rolling at the temperature shown in Tables 15 and 16 as the rolling completion temperature, whereby a hot-rolled steel sheet was manufactured. Thereafter, the hot-rolled steel sheet was pickled to remove the scale on the surface. Thereafter, some of the hot-rolled steel sheets were subjected to cold rolling to obtain cold-rolled steel sheets.

TABLE 14

| Chemical composition | C | Si | Mn | P | S | Al | N | O | Nb | Ti |
|---|---|---|---|---|---|---|---|---|---|---|
| | | | | mass % (remainder is iron and impurities) | | | | | | |
| A' | 0.195 | 1.12 | 2.45 | 0.005 | 0.0016 | 0.059 | 0.0035 | 0.0008 | — | — |
| B' | 0.220 | 1.71 | 2.48 | 0.012 | 0.0015 | 0.035 | 0.0014 | 0.0011 | — | — |
| C' | 0.350 | 1.80 | 2.80 | 0.005 | 0.0011 | 0.030 | 0.0008 | 0.0032 | — | — |
| D' | 0.079 | 1.09 | 2.60 | 0.009 | 0.0005 | 0.020 | 0.0015 | 0.0017 | — | 0.030 |
| E' | 0.155 | 1.15 | 1.28 | 0.005 | 0.0030 | 0.042 | 0.0020 | 0.0012 | — | 0.036 |
| F' | 0.135 | 0.86 | 1.92 | 0.005 | 0.0016 | 0.059 | 0.0035 | 0.0008 | — | 0.000 |
| G' | 0.309 | 0.71 | 2.95 | 0.015 | 0.0034 | 0.035 | 0.0073 | 0.0010 | — | — |
| H' | 0.360 | 0.38 | 2.35 | 0.008 | 0.0048 | 0.750 | 0.0014 | 0.0010 | 0.013 | — |
| I' | 0.194 | 1.19 | 3.09 | 0.012 | 0.0038 | 0.086 | 0.0008 | 0.0020 | — | — |
| J' | 0.194 | 0.22 | 2.94 | 0.008 | 0.0040 | 1.246 | 0.0022 | 0.0019 | — | — |
| K' | 0.193 | 0.94 | 0.94 | 0.017 | 0.0003 | 0.038 | 0.0017 | 0.0025 | — | — |
| L' | 0.105 | 1.76 | 2.87 | 0.016 | 0.0040 | 0.081 | 0.0050 | 0.0018 | — | — |
| M' | 0.111 | 0.94 | 2.41 | 0.011 | 0.0015 | 0.004 | 0.0030 | 0.0027 | — | — |
| N' | 0.086 | 1.52 | 1.56 | 0.014 | 0.0008 | 0.046 | 0.0096 | 0.0008 | — | — |
| O' | 0.170 | 0.33 | 2.49 | 0.012 | 0.0029 | 0.644 | 0.0008 | 0.0012 | — | — |
| P' | 0.171 | 1.90 | 2.00 | 0.010 | 0.0069 | 0.027 | 0.0041 | 0.0015 | — | — |
| Q' | 0.220 | 1.20 | 3.20 | 0.007 | 0.0030 | 0.032 | 0.0030 | 0.0010 | — | — |
| R' | 0.210 | 1.15 | 2.20 | 0.011 | 0.0034 | 0.040 | 0.0035 | 0.0010 | 0.020 | — |
| S' | 0.180 | 2.20 | 2.70 | 0.011 | 0.0048 | 0.035 | 0.0032 | 0.0020 | 0.050 | — |
| T' | 0.163 | 0.25 | 0.80 | 0.009 | 0.0026 | 0.020 | 0.0042 | 0.0013 | — | — |
| U' | 0.220 | 1.50 | 2.40 | 0.013 | 0.0015 | 0.040 | 0.0043 | 0.0020 | — | 0.050 |
| V' | 0.180 | 1.60 | 2.60 | 0.008 | 0.0011 | 0.032 | 0.0043 | 0.0008 | 0.020 | 0.020 |
| W' | 0.041 | 1.15 | 1.86 | 0.006 | 0.0028 | 0.054 | 0.0027 | 0.0009 | — | — |
| X' | 0.163 | 0.38 | 1.92 | 0.009 | 0.0026 | 0.063 | 0.0042 | 0.0013 | 0.350 | — |
| Y' | 0.156 | 1.17 | 0.47 | 0.010 | 0.0024 | 0.059 | 0.0035 | 0.0011 | — | — |
| Z' | 0.200 | 3.20 | 1.20 | 0.008 | 0.0130 | 0.035 | 0.0042 | 0.0012 | — | — |
| AA' | 0.210 | 1.10 | 5.20 | 0.150 | 0.0030 | 0.035 | 0.0035 | 0.0013 | — | — |

| Chemical composition | V | Ni | Cu | Cr | Mo | B | Others | Expression (1) | Remarks |
|---|---|---|---|---|---|---|---|---|---|
| | mass % (remainder is iron and impurities) | | | | | | | | |
| A' | — | — | — | — | — | — | — | 1.40 | Example |
| B' | — | — | — | — | — | — | Co: 0.13 | 1.98 | Example |
| C' | — | — | — | — | — | — | Ca: 0.0018 | 2.10 | Example |
| D' | — | — | — | — | 0.200 | — | — | 1.36 | Example |
| E' | — | — | — | — | — | — | — | 1.30 | Example |
| F' | — | — | — | — | — | — | — | 1.09 | Example |

TABLE 14-continued

| | | | | | | | | | |
|---|---|---|---|---|---|---|---|---|---|
| G' | — | — | — | — | — | — | | 1.03 | Example |
| H' | — | — | — | — | — | — | | 1.07 | Example |
| I' | — | — | — | — | — | — | | 1.55 | Example |
| J' | 0.109 | — | — | — | — | — | | 1.26 | Example |
| K' | — | — | — | 1.05 | — | — | | 1.05 | Example |
| L' | — | — | — | — | — | — | Sb: 0.086 | 2.10 | Example |
| M' | — | — | — | — | — | 0.0014 | | 1.18 | Example |
| N' | — | 0.350 | 0.090 | — | — | 0.0020 | | 1.70 | Example |
| O' | — | — | — | — | — | — | La: 0.0016 | 0.97 | Example |
| P' | — | — | — | — | 0.160 | — | | 2.12 | Example |
| Q' | — | — | — | — | — | — | Zr: 0.003, REM: 0.003 | 1.54 | Example |
| R' | — | — | — | — | 0.050 | 0.0020 | | 1.39 | Example |
| S' | — | — | — | — | — | — | Sn: 0.03 | 2.49 | Example |
| T' | — | — | — | 0.40 | — | — | Mg: 0.004 | 0.34 | Example |
| U' | — | — | — | — | — | — | Hf: 0.005 | 1.76 | Example |
| V' | — | — | — | — | — | — | Bi: 0.002, | 1.88 | Example |
| W' | — | — | — | — | — | — | | 1.37 | Comparative example |
| X' | — | — | — | — | — | — | | 0.61 | Comparative example |
| Y' | — | — | — | — | — | — | | 1.25 | Comparative example |
| Z' | — | — | — | — | — | — | | 3.34 | Comparative example |
| AA' | — | — | — | — | — | — | | 1.64 | Comparative example |

*Underlined is outside the scope of the invention

TABLE 15

| | | Hot rolling | | | Cold rolling |
|---|---|---|---|---|---|
| Example | Chemical composition | Slab heating temperature ° C. | Expression (4) | Rolling completion temperature ° C. | Cold rolling reduction % |
| 1' | A' | 1240 | 0.7 | 940 | 53 |
| 2' | A' | 1230 | 0.7 | 930 | 53 |
| 3' | A' | 1250 | 0.6 | 950 | 53 |
| 4' | A' | 1230 | 1.3 | 920 | 53 |
| 5' | A' | 1260 | 0.7 | 920 | 53 |
| 6' | A' | 1220 | 0.7 | 950 | 53 |
| 7' | A' | 1230 | 0.7 | 920 | 53 |
| 8' | A' | 1260 | 0.5 | 910 | 53 |
| 9' | A' | 1230 | 0.7 | 950 | 53 |
| 10' | A' | 1230 | 0.7 | 950 | 53 |
| 11' | A' | 1230 | 0.7 | 950 | 53 |
| 12' | A' | 1240 | 0.6 | 970 | 53 |
| 13' | A' | 1240 | 0.6 | 940 | 53 |
| 14' | A' | 1230 | 0.5 | 930 | 53 |
| 15' | A' | 1260 | 0.5 | 910 | 53 |
| 16' | B' | 1220 | 0.6 | 920 | 53 |
| 17' | B' | 1240 | 0.6 | 910 | 53 |
| 18' | B' | 1220 | 0.7 | 910 | 53 |
| 19' | B' | 1260 | 0.5 | 940 | 53 |
| 20' | C' | 1230 | 0.6 | 920 | 53 |
| 21' | C' | 1250 | 1.5 | 910 | 53 |
| 22' | C' | 1230 | 0.6 | 940 | 53 |
| 23' | C' | 1260 | 0.7 | 950 | 53 |
| 24' | D' | 1260 | 0.6 | 950 | 53 |
| 25' | D' | 1220 | 0.6 | 950 | 53 |
| 26' | D | 1230 | 0.7 | 950 | 53 |
| 27' | D' | 1240 | 0.6 | 910 | 53 |
| 28' | D' | 1260 | 0.6 | 910 | 53 |
| 29' | D' | 1220 | 0.7 | 920 | 53 |
| 30' | D' | 1260 | 0.7 | 950 | 53 |
| 31' | E' | 1230 | 0.7 | 930 | 53 |
| 32' | E' | 1230 | 0.7 | 920 | 53 |
| 33' | F' | 1250 | 0.5 | 930 | 53 |
| 34' | F' | 1220 | 0.7 | 920 | 53 |

TABLE 15-continued

| | | Hot rolling | | | Cold rolling |
|---|---|---|---|---|---|
| Example | Chemical composition | Slab heating temperature °C. | Expression (4) | Rolling completion temperature °C. | Cold rolling reduction % |
| 35' | G' | 1250 | 0.5 | 910 | 53 |
| 36' | G' | 1240 | 0.6 | 920 | 53 |
| 37' | G' | 1230 | 0.6 | 910 | 53 |
| 38' | G' | 1260 | 0.5 | 910 | 53 |
| 39' | G' | 1220 | 0.6 | 940 | 53 |

*Underlined is outside the scope of the invention

TABLE 16

| | | Hot rolling | | | Cold rolling |
|---|---|---|---|---|---|
| Example | Chemical composition | Slab heating temperature °C. | Expression (4) | Rolling completion temperature °C. | Cold rolling reduction % |
| 40' | H' | 1230 | 0.6 | 950 | 53 |
| 41' | I' | 1260 | 0.6 | 940 | 53 |
| 42' | I' | 1220 | 0.7 | 920 | 53 |
| 43' | I' | 1220 | 0.5 | 930 | 53 |
| 44' | I' | 1230 | 0.7 | 920 | 53 |
| 45' | I' | 1230 | 0.6 | 950 | 53 |
| 46' | I' | 1260 | 0.5 | 940 | Not performed |
| 47' | I' | 1220 | 0.7 | 940 | Not performed |
| 48' | I' | 1240 | 0.5 | 910 | 53 |
| 49' | I' | 1220 | 0.6 | 930 | 53 |
| 50' | I' | 1230 | 1.5 | 910 | 53 |
| 51' | J' | 1230 | 0.6 | 920 | 53 |
| 52' | J' | 1240 | 0.5 | 920 | 53 |
| 53' | K' | 1260 | 0.6 | 950 | 53 |
| 54' | L' | 1220 | 0.5 | 910 | 53 |
| 55' | L' | 1240 | 0.6 | 930 | 53 |
| 56' | M' | 1220 | 0.7 | 950 | 53 |
| 57' | N' | 1240 | 0.6 | 950 | 53 |
| 58' | O' | 1220 | 0.5 | 920 | 53 |
| 59' | P' | 1250 | 0.6 | 940 | 53 |
| 60' | Q' | 1240 | 0.6 | 910 | 53 |
| 61' | R' | 1230 | 0.6 | 920 | 53 |
| 62' | S' | 1220 | 0.6 | 920 | 53 |
| 63' | T' | 1260 | 0.7 | 940 | 53 |
| 64' | U' | 1220 | 0.5 | 920 | 53 |
| 65' | U' | 1230 | 0.7 | 910 | 53 |
| 66' | U' | 1230 | 0.6 | 940 | 53 |
| 67' | U' | 1260 | 0.6 | 940 | 53 |
| 68' | U' | 1260 | 0.5 | 920 | 53 |
| 69' | U' | 1230 | 0.7 | 910 | 53 |
| 70' | V' | 1250 | 0.7 | 940 | 53 |
| 71' | W' | 1220 | 0.7 | 930 | 53 |
| 72' | X' | 1250 | 0.6 | 950 | 53 |
| 73' | Y' | 1220 | 0.6 | 950 | 53 |
| 74' | Z' | 1220 | 0.6 | 950 | 53 |
| 75' | AA' | 1240 | 0.5 | 950 | 53 |
| 76' | A' | 1250 | 0.8 | 950 | 53 |
| 77' | A' | 1250 | 0.7 | 930 | 53 |
| 78' | A' | 1250 | 0.7 | 930 | 53 |
| 79' | A' | 1250 | 0.7 | 930 | 53 |
| 80' | A' | 1250 | 0.7 | 930 | 53 |
| 81' | A' | 1250 | 0.7 | 930 | 53 |
| 82' | A' | 1250 | 0.7 | 930 | 53 |
| 83' | B' | 1260 | 0.6 | 950 | 53 |
| 84' | C' | 1240 | 0.6 | 940 | 53 |
| 85' | A' | 1260 | 0.7 | 950 | 53 |
| 86' | A' | 1250 | 0.5 | 930 | 53 |
| 87' | B' | 1250 | 0.6 | 940 | 53 |

*Underlined is outside the scope of the invention

The hot-rolled steel sheet having a sheet thickness of 1.2 mm or the cold-rolled steel sheet having a sheet thickness of 1.2 mm thus obtained was subjected to the following first heat treatment and/or second heat treatment. Regarding some of the experimental examples, the cold-rolled steel sheet cooled to the cooling stop temperature shown in Tables 17 and 18 in the first heat treatment was continuously subjected to the second heat treatment without being cooled to room temperature. In the other examples, after cooling to the cooling stop temperature in the first heat treatment and then cooling to room temperature, the second heat treatment was performed.

(First Heat Treatment)

Heating to the highest heating temperature shown in Tables 17 and 18 at an average heating rate from 650° C. to the highest heating temperature shown in Tables 17 and 18 was performed, and holding at the highest heating temperature for the holding time shown in Tables 17 and 18 was performed. Then, cooling from 700° C. to Ms was performed at the average cooling rate shown in Tables 17 and 18, and cooling to the cooling stop temperature shown in Tables 17 and 18 was performed. In the first heat treatment, heating was performed in the atmosphere containing $H_2$ at the concentration shown in Tables 17 and 18 and having a $\log(PH_2O/PH_2)$ of the numerical value shown in Tables 17 and 18 until the temperature reached from 650° C. to the highest heating temperature.

$A_{c3}$ shown in Tables 17 and 18 was obtained by Expression (9), and Ms was obtained by Expression (10).

$$A_{c3}=879-346\times C+65\times Si-18\times Mn+54\times Al \tag{9}$$

(element symbols in Expression (9) indicate the mass % of the corresponding elements in steel)

$$Ms=561-407\times C-7.3\times Si-37.8\times Mn-20.5\times Cu-19.5\times Ni-19.8\times Cr-4.5\times Mo \tag{10}$$

(element symbols in Expression (10) indicate the mass % of the corresponding elements in steel)

TABLE 17

| | | | First heat treatment | | | | | | |
|---|---|---|---|---|---|---|---|---|---|
| Example | $A_{c3}$ ° C. | Ms ° C. | Average heating rate within 650° C. or more ° C./s | Highest heating temperature ° C. | Holding time sec | $\log(PH_2O/PH_2)$ | $H_2$ volume % | Average cooling rate between 700° C. and Ms ° C./s | Cooling stop temperature ° C. |
| 1' | 825 | 381 | 2.0 | 840 | 60 | −0.6 | 2.0 | 40.0 | Room temperature |
| 2' | 825 | 381 | 2.0 | <u>780</u> | 60 | −0.6 | 2.0 | 40.0 | Room temperature |
| 3' | 825 | 381 | 2.0 | <u>1130</u> | 60 | −0.6 | 2.0 | 40.0 | Room temperature |
| 4' | 825 | 381 | 2.0 | 840 | 60 | −0.6 | 2.0 | 40.0 | Room temperature |
| 5' | 825 | 381 | <u>0.05</u> | 850 | 60 | −0.6 | 2.0 | 40.0 | Room temperature |
| 6' | 825 | 381 | 2.0 | 850 | 60 | <u>−1.6</u> | 2.0 | 40.0 | Room temperature |
| 7' | 825 | 381 | 2.0 | 835 | 60 | −0.6 | 2.0 | 12.0 | Room temperature |
| 8' | 825 | 381 | 2.0 | 845 | 60 | −0.6 | <u>2.0</u> | 2.0 | Room temperature |
| 9' | 825 | 381 | 2.0 | 840 | 60 | −0.6 | 2.0 | 40.0 | Room temperature |
| 10' | 825 | 381 | 2.0 | 840 | 60 | −0.6 | 2.0 | 40.0 | Room temperature |
| 11' | 825 | 381 | 2.0 | 845 | 60 | −0.8 | 3.5 | 40.0 | Room temperature |
| 12' | 825 | 381 | 2.0 | 855 | 60 | −0.6 | 2.0 | 40.0 | Room temperature |
| 13' | 825 | 381 | 2.0 | 840 | 60 | −0.6 | 2.0 | 40.0 | Room temperature |
| 14' | 825 | 381 | | | | Not performed | | | |
| 15' | 825 | 381 | 2.0 | 850 | 60 | −0.6 | 2.0 | 40.0 | 250 |
| 16' | 846 | 365 | 2.0 | 870 | 60 | −0.6 | 2.0 | 40.0 | Room temperature |
| 17' | 846 | 365 | 2.0 | 870 | 60 | −0.6 | 2.0 | 40.0 | 270 |
| 18' | 846 | 365 | 2.0 | 870 | 60 | <u>−1.2</u> | 2.0 | 40.0 | Room temperature |
| 19' | 846 | 365 | | | | Not performed | | | |
| 20' | 812 | 300 | 2.0 | 840 | 60 | −0.6 | 2.0 | 40.0 | Room temperature |
| 21' | 812 | 300 | 2.0 | 830 | 60 | −0.6 | 2.0 | 40.0 | Room temperature |
| 22' | 812 | 300 | 2.0 | 840 | 60 | −0.6 | 2.0 | 40.0 | Room temperature |
| 23' | 812 | 300 | 2.0 | 830 | 60 | −0.6 | 2.0 | 40.0 | 230 |
| 24' | 856 | 422 | 2.0 | 840 | 60 | −0.6 | 2.0 | 40.0 | Room temperature |
| 25' | 856 | 422 | 2.0 | 885 | 60 | −0.6 | 2.0 | 40.0 | Room temperature |
| 26' | 856 | 422 | 2.0 | 885 | 60 | <u>−1.3</u> | 2.0 | 40.0 | Room temperature |
| 27' | 856 | 422 | 2.0 | 885 | 60 | −0.6 | 2.0 | 40.0 | Room temperature |
| 28' | 856 | 422 | 2.0 | 875 | 5 | −0.6 | 2.0 | 40.0 | Room temperature |
| 29' | 856 | 422 | 2.0 | 875 | 60 | −0.6 | 2.0 | 40.0 | 340 |
| 30' | 856 | 422 | | | | Not performed | | | |
| 31' | 861 | 441 | 2.0 | 900 | 60 | −0.6 | 2.0 | 40.0 | Room temperature |
| 32' | 861 | 441 | 2.0 | 900 | 60 | −0.6 | 2.0 | 40.0 | 330 |
| 33' | 841 | 427 | 2.0 | 870 | 60 | −0.6 | 2.0 | 40.0 | Room temperature |
| 34' | 841 | 427 | 2.0 | 870 | 60 | −0.6 | 2.0 | 40.0 | 250 |
| 35' | 775 | 319 | 2.0 | 800 | 60 | −0.6 | 2.0 | 40.0 | Room temperature |
| 36' | 775 | 319 | 2.0 | 800 | 60 | −0.6 | 2.0 | 40.0 | Room temperature |
| 37' | 775 | 319 | 2.0 | 800 | 60 | −0.6 | 2.0 | 40.0 | Room temperature |
| 38' | 775 | 319 | 2.0 | 800 | 60 | −0.6 | 2.0 | 40.0 | 280 |
| 39' | 775 | 319 | 2.0 | 800 | 60 | −0.6 | 2.0 | 40.0 | 400 |

*Underlined is outside the scope of the invention

TABLE 18

| | | | First heat treatment | | | | | | |
|---|---|---|---|---|---|---|---|---|---|
| Example | Ac₃ ° C. | Ms ° C. | Average heating rate within 650° C. or more ° C./s | Highest heating temperature ° C. | Holding time sec | log(PH₂O/ PH₂) | H₂ volume % | Average cooling rate between 700° C. and Ms ° C./s | Cooling stop temperature ° C. |
| 40' | 868 | 323 | 2.0 | 880 | 60 | −0.6 | 2.0 | 40.0 | Room temperature |
| 41' | 822 | 357 | 2.0 | 840 | 60 | −0.6 | 2.0 | 40.0 | Room temperature |
| 42' | 822 | 357 | <u>0.7</u> | 835 | 60 | −0.6 | 2.0 | 40.0 | Room temperature |
| 43' | 822 | 357 | 2.0 | 835 | 60 | −0.6 | 2.0 | 40.0 | Room temperature |
| 44' | 822 | 357 | 2.0 | 850 | 60 | −0.6 | 2.0 | 40.0 | Room temperature |
| 45' | 822 | 357 | 2.0 | 840 | 60 | −0.6 | 2.0 | 40.0 | 280 |
| 46' | 822 | 357 | 2.0 | 845 | 60 | −0.6 | 2.0 | 40.0 | Room temperature |
| 47' | 822 | 357 | 2.0 | <u>805</u> | 60 | −0.6 | 2.0 | 40.0 | Room temperature |
| 48' | 822 | 357 | | | Not performed | | | | |
| 49' | 822 | 357 | | | Not performed | | | | |
| 50' | 822 | 357 | 2.0 | 850 | 60 | −0.6 | 2.0 | 40.0 | Room temperature |
| 51' | 953 | 369 | 2.0 | 970 | 60 | −0.6 | 2.0 | 40.0 | Room temperature |
| 52' | 953 | 369 | 2.0 | 970 | 60 | −0.6 | 2.0 | 40.0 | Room temperature |
| 53' | 847 | 419 | 2.0 | 860 | 60 | −0.6 | 2.0 | 40.0 | Room temperature |
| 54' | 878 | 397 | 2.0 | 910 | 60 | −0.6 | 2.0 | 40.0 | Room temperature |
| 55' | 878 | 397 | 2.0 | 910 | 60 | −0.6 | 2.0 | 40.0 | Room temperature |
| 56' | 837 | 418 | 2.0 | 850 | 60 | −0.6 | 2.0 | 40.0 | Room temperature |
| 57' | 892 | 456 | 2.0 | 920 | 60 | −0.6 | 2.0 | 40.0 | Room temperature |
| 58' | 887 | 395 | 2.0 | 930 | 60 | −0.6 | 2.0 | 40.0 | Room temperature |
| 59' | 880 | 401 | 2.0 | 895 | 60 | −0.6 | 2.0 | 40.0 | Room temperature |
| 60' | 802 | 342 | 2.0 | 880 | 60 | −0.6 | 2.0 | 40.0 | Room temperature |
| 61' | 832 | 384 | 2.0 | 850 | 60 | −0.6 | 2.0 | 40.0 | Room temperature |
| 62' | 871 | 370 | 2.0 | 890 | 60 | −0.6 | 2.0 | 40.0 | Room temperature |
| 63' | 826 | 455 | 2.0 | 875 | 60 | −0.6 | 2.0 | 40.0 | Room temperature |
| 64' | 840 | 370 | 2.0 | 860 | 60 | −0.6 | 2.0 | 40.0 | Room temperature |
| 65' | 840 | 370 | 2.0 | 860 | 60 | −0.6 | 2.0 | 40.0 | Room temperature |
| 66' | 840 | 370 | 2.0 | 855 | 60 | −0.9 | 2.0 | 40.0 | Room temperature |
| 67' | 840 | 370 | 2.0 | 860 | 60 | −0.6 | 2.0 | 40.0 | 320 |
| 68' | 840 | 370 | 2.0 | 860 | 60 | −0.6 | 2.0 | 40.0 | 170 |
| 69' | 840 | 370 | 2.0 | 855 | 60 | −0.6 | 2.0 | 40.0 | Room temperature |
| 70' | 844 | 378 | 2.0 | 905 | 60 | −0.6 | 2.0 | 40.0 | Room temperature |
| 71' | 889 | 466 | 2.0 | 920 | 60 | −0.6 | 2.0 | 40.0 | Room temperature |
| 72' | 816 | 419 | 2.0 | 870 | 60 | −0.6 | 2.0 | 40.0 | Room temperature |
| 73' | 888 | 471 | 2.0 | 905 | 60 | −0.6 | 2.0 | 40.0 | Room temperature |
| 74' | 945 | 411 | 2.0 | 965 | 60 | −0.6 | 2.0 | 40.0 | Room temperature |
| 75' | 853 | 271 | 2.0 | 895 | 60 | −0.6 | 2.0 | 40.0 | Room temperature |
| 76' | 825 | 381 | 2.0 | 845 | 60 | −0.6 | 2.0 | 40.0 | Room temperature |
| 77' | 825 | 381 | 2.0 | 850 | 60 | −0.6 | 2.0 | 40.0 | Room temperature |
| 78' | 825 | 381 | 2.0 | 850 | 60 | −0.6 | 2.0 | 40.0 | Room temperature |
| 79' | 825 | 381 | 2.0 | 850 | 60 | −0.6 | 2.0 | 40.0 | 210 |
| 80' | 825 | 381 | 2.0 | 850 | 60 | −0.6 | 2.0 | 40.0 | Room temperature |
| 81' | 825 | 381 | 2.0 | 850 | 60 | −0.6 | 2.0 | 40.0 | Room temperature |
| 82' | 825 | 381 | 2.0 | 850 | 60 | −0.6 | 2.0 | 40.0 | Room temperature |
| 83' | 846 | 365 | 2.0 | 875 | 60 | −0.7 | 2.0 | 40.0 | Room temperature |
| 84' | 812 | 300 | 2.0 | 840 | 60 | −0.7 | 2.0 | 40.0 | Room temperature |
| 85' | 825 | 381 | 2.0 | 850 | 60 | −0.6 | 2.0 | 40.0 | Room temperature |
| 86' | 825 | 381 | 2.0 | 920 | 60 | −0.3 | 2.0 | 40.0 | 200 |
| 87' | 846 | 365 | 2.0 | 860 | 60 | −0.6 | 2.0 | 40.0 | 220 |

*Underlined is outside the scope of the invention (Second Heat Treatment to Hot-Dip Galvanizing)

Among the experimental examples, Experimental Examples Nos. 1' to 76' were subjected to an alloying treatment by being heated under the conditions shown in Tables 19 and 20, cooled to the cooling stop temperature at the cooling rate shown in Tables 19 and 20, subjected to isothermal holding under the conditions shown in Tables 19 and 20, and thereafter immersed in a hot-dip galvanizing bath. That is, hot-dip galvanizing was performed at the timing shown in the pattern [1] of FIG. 5. However, the alloying treatment was not performed in Experimental Example 76'.

Regarding Experimental examples Nos. 77' to 84', 86' and 87', they were subjected to an alloying treatment by being heated under the conditions shown in Table 20, cooled to a hot-dip galvanizing bath temperature at the cooling rate shown in Table 20, and thereafter immersed in a hot-dip galvanizing bath. Then, after further performing cooling to the cooling stop temperature shown in Table 20, isothermal holding was performed under the conditions shown in Table 20. That is, hot-dip galvanizing was performed at the timing shown in the pattern [2] of FIG. 6. However, the alloying treatment was not performed in Experimental Example 82'.

In addition, Experimental Example No. 85' was heated under the conditions shown in Table 20, cooled to the cooling stop temperature at the cooling rate shown in Table 20, subjected to isothermal holding under the conditions shown in Table 20, and then once cooled to room temperature. Thereafter, the steel sheet was heated again to the hot-dip galvanizing bath temperature and then immersed in the hot-dip galvanizing bath, thereby being subjected to the alloying treatment. That is, hot-dip galvanizing was performed according to the pattern [3] shown in FIG. 7.

The hot-dip galvanizing was performed in each of the examples by immersing the steel sheet into a molten zinc bath at 460° C. to cause the adhesion amount to both surfaces of the steel sheet to be 50 g/m² per side.

In addition, in the second heat treatment, heating was performed in the atmosphere containing $H_2$ at the concentration shown in Tables 19 and 20 and having a log($PH_2O$/$PH_2$) of the numerical value shown in Tables 19 and 20 until the temperature reached from 650° C. to the highest heating temperature.

$A_{c1}$ shown in Tables 6 and 7 was obtained by Expression (8).

$$A_{c1}=723-10.7\times Mn-16.9\times Ni+29.1\times Si+16.9\times Cr \qquad (8)$$

(element symbols in Expression (8) indicate the mass % of the corresponding elements in steel)

TABLE 19

| | | | | Second heat treatment | | | | | | | | | |
|---|---|---|---|---|---|---|---|---|---|---|---|---|---|
| Example | $A_{c1}$ ° C. | $A_{c3}$ ° C. | Average heating rate within 650° C. or more ° C./s | Highest heating temperature ° C. | Holding time sec | log($PH_2O$/$PH_2$) | $H_2$ volume % | $O_2$ volume % | Average cooling rate between 600° C. and 700° C. ° C./s | Cooling stop temperature ° C. | Holding temperature ° C. | Holding time between 300° C. and 480° C. | Alloying temperature ° C. | Timing of hot-dip galvanizing |
| 1' | 729 | 825 | 1.3 | 790 | 108 | −1.6 | 4.0 | 0.003 | 30 | 410 | 410 | 120 | 510 | (1) |
| 2' | 729 | 825 | 1.3 | 790 | 108 | −1.6 | 4.0 | 0.003 | 30 | 410 | 410 | 120 | 490 | (1) |
| 3' | 729 | 825 | 1.3 | 790 | 108 | −1.6 | 4.0 | 0.003 | 30 | 420 | 400 | 120 | 500 | (1) |
| 4' | 729 | 825 | 1.3 | 790 | 108 | −1.6 | 4.0 | 0.003 | 30 | 420 | 380 | 120 | 500 | (1) |
| 5' | 729 | 825 | 1.3 | 790 | 108 | −1.6 | 4.0 | 0.003 | 30 | 420 | 400 | 120 | 480 | (1) |
| 6' | 729 | 825 | 1.3 | 790 | 108 | −1.6 | 4.0 | 0.003 | 30 | 410 | 390 | 120 | 510 | (1) |
| 7' | 729 | 825 | 1.3 | 790 | 108 | −1.6 | 4.0 | 0.003 | 30 | 420 | 380 | 120 | 490 | (1) |
| 8' | 729 | 825 | 1.3 | 790 | 108 | −1.6 | 4.0 | 0.003 | 30 | 420 | 420 | 120 | 520 | (1) |
| 9' | 729 | 825 | 1.3 | 790 | 108 | <u>−0.5</u> | 4.0 | 0.003 | 30 | 400 | 400 | 120 | 500 | (1) |
| 10' | 729 | 825 | 1.3 | 790 | <u>40</u> | <u>−0.6</u> | 4.0 | 0.003 | 30 | 400 | 420 | 120 | 500 | (1) |
| 11' | 729 | 825 | 1.3 | 790 | 108 | −1.6 | <u>1.0</u> | 0.003 | 30 | 420 | 380 | 120 | 490 | (1) |
| 12' | 729 | 825 | <u>16.0</u> | 800 | 108 | −1.6 | 4.0 | 0.003 | 30 | 420 | 390 | 120 | 510 | (1) |
| 13' | 729 | 825 | <u>0.5</u> | 780 | 108 | −1.6 | 4.0 | 0.003 | 30 | 420 | 390 | 120 | 520 | (1) |
| 14' | 729 | 825 | 1.3 | 790 | 108 | −1.6 | 4.0 | 0.003 | 30 | 400 | 390 | 120 | 490 | (1) |
| 15' | 729 | 825 | 1.3 | 790 | 108 | −1.6 | 4.0 | 0.003 | 30 | 420 | 410 | 120 | 490 | (1) |
| 16' | 746 | 846 | 1.3 | 810 | 108 | −1.6 | 4.0 | 0.003 | 30 | 230 | 420 | 120 | 500 | (1) |
| 17' | 746 | 846 | 1.3 | 800 | 108 | −1.6 | 4.0 | 0.003 | 30 | 220 | 380 | 120 | 480 | (1) |
| 18' | 746 | 846 | 1.3 | 810 | 108 | −1.6 | 4.0 | 0.003 | 30 | 230 | 420 | 120 | 490 | (1) |
| 19' | 746 | 846 | 1.3 | 815 | 108 | −1.7 | 4.0 | 0.003 | 30 | 250 | 380 | 120 | 510 | (1) |
| 20' | 745 | 812 | 1.3 | 780 | 108 | −1.6 | 4.0 | 0.003 | 30 | 140 | 390 | 120 | 520 | (1) |
| 21' | 745 | 812 | 1.3 | 790 | 108 | −1.6 | 4.0 | 0.003 | 30 | 210 | 410 | 120 | 500 | (1) |
| 22' | 745 | 812 | 1.3 | 780 | 108 | <u>−0.6</u> | 4.0 | 0.003 | 30 | 160 | 420 | 120 | 520 | (1) |
| 23' | 745 | 812 | 1.3 | 780 | 108 | −1.6 | 4.0 | 0.003 | 30 | 150 | 410 | 120 | 490 | (1) |
| 24' | 727 | 856 | 1.3 | 810 | 108 | −1.6 | 4.0 | 0.003 | 30 | 380 | 410 | 120 | 500 | (1) |
| 25' | 727 | 856 | 1.3 | 805 | 108 | <u>−0.6</u> | 4.0 | 0.003 | 30 | 380 | 410 | 120 | 510 | (1) |
| 26' | 727 | 856 | 1.3 | 810 | 108 | −1.6 | 4.0 | 0.003 | 30 | 380 | 410 | 120 | 480 | (1) |
| 27' | 727 | 856 | 1.3 | 880 | 108 | −1.6 | 4.0 | 0.003 | 30 | 370 | 410 | 120 | 490 | (1) |
| 28' | 727 | 856 | 1.3 | 800 | 108 | −1.6 | 4.0 | 0.003 | 30 | 370 | 410 | 120 | 490 | (1) |
| 29' | 727 | 856 | 1.3 | 800 | 108 | −1.6 | 4.0 | 0.003 | 30 | 370 | 400 | 120 | 520 | (1) |
| 30' | 727 | 856 | 1.3 | 810 | 108 | <u>−0.6</u> | 4.0 | 0.003 | 30 | 280 | 380 | 120 | 510 | (1) |
| 31' | 743 | 861 | 1.3 | 810 | 108 | −1.6 | 4.0 | 0.003 | 30 | 370 | 420 | 120 | 480 | (1) |
| 32' | 743 | 861 | 1.3 | 810 | 108 | −1.6 | 4.0 | 0.003 | 30 | 370 | 420 | 120 | 510 | (1) |
| 33' | 727 | 841 | 1.3 | 800 | 108 | −1.6 | 4.0 | 0.003 | 30 | 350 | 420 | 120 | 510 | (1) |
| 34' | 727 | 841 | 1.3 | 800 | 108 | −1.6 | 4.0 | 0.003 | 30 | 350 | 410 | 120 | 520 | (1) |
| 35' | 712 | 775 | 1.3 | 740 | 108 | −1.6 | 4.0 | 0.003 | 30 | 400 | 390 | 120 | 520 | (1) |
| 36' | 712 | 775 | 1.3 | 740 | 108 | −1.6 | 4.0 | 0.003 | 30 | 400 | 400 | 8 | 480 | (1) |
| 37' | 712 | 775 | 1.3 | 740 | 108 | −1.6 | 4.0 | 0.003 | 30 | 400 | 380 | 40 | 520 | (1) |
| 38' | 712 | 775 | 1.3 | 740 | 108 | −1.6 | 4.0 | 0.003 | 30 | 400 | 380 | 120 | 480 | (1) |
| 39' | 712 | 775 | 1.3 | 740 | 108 | −1.6 | 4.0 | 0.003 | 30 | 400 | 380 | 120 | 520 | (1) |

*Underlined is outside the scope of the invention

TABLE 20

| | | | | | | | | Second heat treatment | | | | | |
|---|---|---|---|---|---|---|---|---|---|---|---|---|---|
| Example | $Ac_1$ °C. | $Ac_3$ °C. | Average heating rate within 650° C. or more °C./s | Highest heating temperature °C. | Holding time sec | $\log(P_{H_2O}/P_{H_2})$ | $H_2$ volume % | $O_2$ volume % | Average cooling rate between 600° C. and 700° C. °C./s | Cooling stop temperature °C. | Holding temperature °C. | Holding time between 300° C. and 480° C. | Alloying temperature °C. | Timing of hot-dip galvanizing |
| 40' | 709 | 868 | 1.3 | 790 | 108 | −1.6 | 4.0 | 0.003 | 30 | 410 | 380 | 120 | 490 | (1) |
| 41' | 725 | 822 | 1.3 | 780 | 108 | −1.6 | 4.0 | 0.003 | 30 | 410 | 410 | 120 | 500 | (1) |
| 42' | 725 | 822 | 1.3 | 780 | 108 | −1.6 | 4.0 | 0.003 | 30 | 420 | 390 | 120 | 490 | (1) |
| 43' | 725 | 822 | 1.3 | 785 | 5 | −1.6 | 4.0 | 0.003 | 30 | 420 | 420 | 120 | 490 | (1) |
| 44' | 725 | 822 | 1.3 | 785 | 108 | −1.6 | 4.0 | 0.003 | 2 | 410 | 390 | 120 | 520 | (1) |
| 45' | 725 | 822 | 1.3 | 785 | 108 | −1.6 | 4.0 | 0.003 | 30 | 410 | 420 | 120 | 480 | (1) |
| 46' | 725 | 822 | 1.3 | 770 | 108 | −1.6 | 4.0 | 0.003 | 30 | 400 | 390 | 120 | 490 | (1) |
| 47' | 725 | 822 | 1.3 | 780 | 108 | −1.6 | 4.0 | 0.003 | 30 | 400 | 400 | 120 | 520 | (1) |
| 48' | 725 | 822 | 1.3 | 790 | 108 | −0.6 | 4.0 | 0.003 | 30 | 420 | 410 | 120 | 500 | (1) |
| 49' | 725 | 822 | 1.3 | 790 | 108 | −1.5 | 4.0 | 0.003 | 30 | 420 | 390 | 120 | 490 | (1) |
| 50' | 725 | 822 | 1.3 | 790 | 108 | −1.6 | 4.0 | 0.003 | 30 | 420 | 410 | 120 | 510 | (1) |
| 51' | 698 | 953 | 1.3 | 880 | 108 | −0.5 | 4.0 | 0.003 | 30 | 360 | 400 | 120 | 500 | (1) |
| 52' | 698 | 953 | 1.3 | 880 | 108 | −1.5 | 4.0 | 0.003 | 30 | 350 | 410 | 120 | 480 | (1) |
| 53' | 758 | 847 | 1.3 | 800 | 108 | −1.5 | 4.0 | 0.003 | 30 | 350 | 390 | 120 | 500 | (1) |
| 54' | 744 | 878 | 1.3 | 820 | 108 | −1.6 | 4.0 | 0.003 | 30 | 350 | 400 | 80 | 480 | (1) |
| 55' | 744 | 878 | 1.3 | 815 | 108 | −1.6 | 4.0 | 0.003 | 30 | 340 | 420 | 120 | 510 | (1) |
| 56' | 725 | 837 | 1.3 | 790 | 108 | −1.6 | 4.0 | 0.003 | 30 | 270 | 380 | 120 | 520 | (1) |
| 57' | 751 | 892 | 1.3 | 830 | 108 | −1.6 | 4.0 | 0.003 | 30 | 370 | 380 | 120 | 510 | (1) |
| 58' | 706 | 887 | 1.3 | 805 | 108 | −1.6 | 4.0 | 0.003 | 30 | 370 | 400 | 120 | 500 | (1) |
| 59' | 757 | 880 | 1.3 | 825 | 108 | −1.6 | 4.0 | 0.003 | 30 | 370 | 400 | 120 | 520 | (1) |
| 60' | 724 | 802 | 1.3 | 765 | 108 | −1.6 | 4.0 | 0.003 | 30 | 310 | 400 | 120 | 500 | (1) |
| 61' | 733 | 832 | 1.3 | 780 | 108 | −1.6 | 4.0 | 0.003 | 30 | 370 | 410 | 120 | 510 | (1) |
| 62' | 758 | 871 | 1.3 | 830 | 108 | −1.5 | 4.0 | 0.003 | 30 | 400 | 410 | 120 | 520 | (1) |
| 63' | 728 | 826 | 1.3 | 785 | 108 | −1.6 | 4.0 | 0.003 | 30 | 400 | 420 | 120 | 490 | (1) |
| 64' | 741 | 840 | 1.3 | 790 | 108 | −1.6 | 4.0 | 0.003 | 30 | 380 | 410 | 120 | 490 | (1) |
| 65' | 741 | 840 | 1.3 | 750 | 108 | −1.6 | 4.0 | 0.003 | 30 | 380 | 380 | 120 | 520 | (1) |
| 66' | 741 | 840 | 1.3 | 790 | 108 | −1.6 | 4.0 | 0.003 | 30 | 400 | 400 | 120 | 480 | (1) |
| 67' | 741 | 840 | 1.3 | 775 | 108 | −1.5 | 4.0 | 0.003 | 30 | 390 | 420 | 120 | 490 | (1) |
| 68' | 741 | 840 | 1.3 | 825 | 108 | −1.6 | 4.0 | 0.003 | 30 | 390 | 390 | 120 | 520 | (1) |
| 69' | 741 | 840 | 1.3 | 795 | 108 | −1.6 | 4.0 | 0.003 | 30 | 380 | 420 | 120 | 510 | (1) |
| 70' | 742 | 844 | 1.3 | 800 | 108 | −1.5 | 4.0 | 0.003 | 30 | 400 | 380 | 120 | 520 | (1) |
| 71' | 737 | 889 | 1.3 | 810 | 108 | −1.6 | 4.0 | 0.003 | 30 | 410 | 400 | 120 | 480 | (1) |
| 72' | 714 | 816 | 1.3 | 775 | 108 | −1.6 | 4.0 | 0.003 | 30 | 380 | 420 | 120 | 520 | (1) |
| 73' | 752 | 888 | 1.3 | 820 | 108 | −1.6 | 4.0 | 0.003 | 30 | 390 | 400 | 120 | 510 | (1) |
| 74' | 803 | 945 | 1.3 | 875 | 108 | −1.6 | 4.0 | 0.003 | 30 | 400 | 400 | 120 | 510 | (1) |
| 75' | 699 | 853 | 1.3 | 765 | 108 | −1.6 | 4.0 | 0.003 | 30 | 390 | 410 | 120 | 500 | (1) |
| 76' | 729 | 825 | 1.3 | 790 | 108 | −1.6 | 4.0 | 0.003 | 30 | 390 | 390 | 120 | Not performed | (1) |
| 77' | 729 | 825 | 1.3 | 780 | 108 | −1.6 | 4.0 | 0.003 | 30 | 380 | 400 | 150 | 500 | (2) |
| 78' | 729 | 825 | 1.3 | 785 | 108 | −1.6 | 4.0 | 0.003 | 30 | 200 | 400 | 120 | 500 | (2) |
| 79' | 729 | 825 | 1.3 | 780 | 108 | −1.6 | 4.0 | 0.003 | 30 | 300 | 400 | 200 | 490 | (2) |
| 80' | 729 | 825 | 1.3 | 790 | 108 | −1.6 | 4.0 | 0.003 | 30 | 50 | 410 | 120 | 490 | (2) |
| 81' | 729 | 825 | 1.3 | 780 | 108 | −1.6 | 4.0 | 0.003 | 30 | 180 | 380 | 310 | 490 | (2) |
| 82' | 729 | 825 | 1.3 | 795 | 108 | −1.6 | 4.0 | 0.003 | 30 | 190 | 400 | 120 | — | (2) |
| 83' | 746 | 846 | 1.3 | 810 | 108 | −1.6 | 4.0 | 0.003 | 30 | 180 | 400 | 150 | 490 | (2) |
| 84' | 745 | 812 | 1.3 | 790 | 108 | −1.6 | 4.0 | 0.003 | 30 | 170 | 390 | 150 | 500 | (2) |
| 85' | 729 | 825 | 1.3 | 780 | 108 | −1.6 | 4.0 | 0.003 | 30 | 400 | 400 | 120 | 510 | (3) |
| 86' | 729 | 825 | 1.3 | 785 | 108 | −1.6 | 4.0 | 0.003 | 30 | 400 | 400 | 120 | 480 | (2) |
| 87' | 746 | 846 | 1.3 | 800 | 108 | −1.6 | 4.0 | 0.003 | 30 | 150 | 390 | 120 | 480 | (2) |

*Underlined is outside the scope of the invention

Next, for each of the hot-dip galvanized steel sheets thus obtained, the steel structure (the steel structure of the steel sheet inside) in the range from ⅛ thickness to ⅜ thickness centered on the ¼ thickness position from the surface was measured by the above-described method, and the volume fractions of soft ferrite, retained austenite, tempered martensite, fresh martensite, and the sum of pearlite and cementite (pearlite+cementite) were examined. Furthermore, the volume fractions of bainite and hard ferrite were also examined.

In addition, for the steel sheet inside of each of the hot-dip galvanized steel sheets, the number proportion of retained austenite having an aspect ratio of 2.0 or more in the total retained austenite was examined by the above-described method.

The results are shown in Tables 21 and 22.

TABLE 21

| | Internal structure of base steel sheet | | | | | | | | | |
|---|---|---|---|---|---|---|---|---|---|---|
| | | Retained austenite | | | | | | | | |
| Example | Soft ferrite volume % | Volume fraction volume % | Number proportion of aspect ratio ≥2.0 % | Tempered martensite volume % | Fresh martensite volume % | Pearlite + Cementite volume % | Bainite volume % | Hard ferrite volume % | Main remainder structure | Remarks |
| 1' | 7 | 15 | 93 | 0 | 3 | 0 | 18 | 57 | Hard α | Example |
| 2' | <u>33</u> | 14 | <u>43</u> | 0 | 6 | 0 | 11 | 36 | Hard α | <u>Comparative example</u> |
| 3' | 5 | 14 | 90 | 0 | 3 | 0 | 9 | 69 | Hard α | <u>Comparative example</u> |
| 4' | 7 | 13 | 64 | 0 | 6 | 0 | 16 | 58 | Hard α | Example |
| 5' | 5 | 13 | <u>42</u> | 0 | 4 | 0 | 36 | 42 | Hard α | <u>Comparative example</u> |
| 6' | 4 | 16 | 80 | 0 | 5 | 0 | 15 | 60 | Hard α | <u>Comparative example</u> |
| 7' | 19 | 12 | 72 | 0 | 3 | 0 | 32 | 34 | Hard α | Example |
| 8' | <u>39</u> | 12 | 64 | 0 | 4 | 0 | 30 | 15 | Bainite | <u>Comparative example</u> |
| 9' | 5 | 16 | 83 | 0 | 2 | 0 | 14 | 63 | Hard α | <u>Comparative example</u> |
| 10' | 6 | 11 | 82 | 0 | 4 | 0 | 15 | 64 | Hard α | <u>Comparative example</u> |
| 11' | 6 | 13 | 77 | 0 | 3 | 0 | 12 | 66 | Example | Example |
| 12' | 6 | 13 | 83 | 0 | 3 | 0 | 17 | 61 | Hard α | Example |
| 13' | 22 | 15 | 71 | 0 | 7 | 0 | 20 | 36 | Hard α | Example |
| 14' | <u>35</u> | 12 | <u>44</u> | 0 | 5 | 0 | 48 | <u>0</u> | Bainite | <u>Comparative example</u> |
| 15' | 7 | 13 | 83 | 0 | 3 | 0 | 17 | 60 | Hard α | Example |
| 16' | 5 | 17 | 91 | 20 | 2 | 0 | 11 | 45 | Hard α | Example |
| 17' | 6 | 19 | 93 | 19 | 2 | 0 | 11 | 43 | Hard α | Example |
| 18' | 4 | 16 | 83 | 14 | 4 | 0 | 12 | 50 | Hard α | <u>Comparative example</u> |
| 19' | 27 | 13 | <u>46</u> | 24 | 3 | 0 | 33 | <u>0</u> | Bainite | <u>Comparative example</u> |
| 20' | 0 | 26 | 76 | 40 | 7 | 0 | 0 | 27 | Hard α | Example |
| 21' | 0 | 19 | 65 | 16 | 17 | 0 | 5 | 43 | Hard α | Example |
| 22' | 0 | 24 | 79 | 25 | 10 | 0 | 5 | 36 | Hard α | <u>Comparative example</u> |
| 23' | 0 | 30 | 78 | 24 | 8 | 0 | 4 | 35 | Hard α | Example |
| 24' | 24 | 6 | 84 | 0 | 3 | 0 | 15 | 52 | Hard α | Example |
| 25' | 7 | 4 | 88 | 0 | 4 | 0 | 14 | 71 | Hard α | <u>Comparative example</u> |
| 26' | 10 | 5 | 78 | 0 | 6 | 0 | 16 | 63 | Hard α | <u>Comparative example</u> |
| 27' | 8 | 0 | — | 47 | 6 | 0 | 39 | <u>0</u> | Bainite | <u>Comparative example</u> |
| 28' | 17 | 7 | 78 | 0 | 1 | 0 | 15 | 60 | Hard α | Example |
| 29' | 8 | 5 | 78 | 0 | 2 | 0 | 21 | 64 | Hard α | Example |
| 30' | <u>41</u> | <u>0</u> | — | 30 | 0 | 0 | 29 | <u>0</u> | Bainite | <u>Comparative example</u> |
| 31' | 6 | 12 | 82 | 0 | 5 | 0 | 14 | 63 | Hard α | Example |
| 32' | 6 | 13 | 81 | 0 | 5 | 0 | 16 | 60 | Hard α | Example |
| 33' | 7 | 10 | 85 | 0 | 2 | 0 | 13 | 68 | Hard α | Example |
| 34' | 9 | 7 | 79 | 0 | 5 | 0 | 14 | 65 | Hard α | Example |
| 35' | 3 | 21 | 80 | 0 | 3 | 0 | 11 | 62 | Hard α | Example |
| 36' | 9 | 18 | 86 | 0 | <u>32</u> | 0 | 6 | 35 | Hard α | <u>Comparative example</u> |
| 37' | 9 | 17 | 83 | 0 | 12 | 0 | 11 | 51 | Hard α | Example |
| 38' | 10 | 22 | 86 | 0 | 3 | 0 | 11 | 54 | Hard α | Example |
| 39' | 20 | 18 | <u>41</u> | 13 | 8 | 0 | 33 | 8 | Bainite | <u>Comparative example</u> |

*Underlined is outside the scope of the invention

TABLE 22

| | Internal structure of base steel sheet | | | | | | | | | |
|---|---|---|---|---|---|---|---|---|---|---|
| | | Retained austenite | | | | | | | | |
| Example | Soft ferrite volume % | Volume fraction volume % | Number proportion of aspect ratio ≥2.0 % | Tempered martensite volume % | Fresh martensite volume % | Pearlite + Cementite volume % | Bainite volume % | Hard ferrite volume % | Main remainder structure | Remarks |
| 40' | 6 | 21 | 81 | 0 | 7 | 0 | 14 | 52 | Hard α | Example |
| 41' | 7 | 15 | 92 | 0 | 3 | 0 | 15 | 60 | Hard α | Example |
| 42' | 6 | 14 | 69 | 0 | 5 | 0 | 17 | 58 | Hard α | Example |
| 43' | 7 | 5 | 91 | 0 | 4 | 6 | 9 | 69 | Hard α | Example |
| 44' | 4 | 3 | 86 | 0 | 1 | <u>13</u> | 14 | 65 | Hard α | <u>Comparative example</u> |
| 45' | 7 | 17 | 82 | 0 | 3 | 0 | 11 | 62 | Hard α | Example |
| 46' | 10 | 15 | 81 | 0 | 4 | 0 | 16 | 55 | Hard α | Example |
| 47' | 25 | 16 | 80 | 0 | 4 | 0 | 13 | 42 | Hard α | Example |
| 48' | 11 | 12 | <u>45</u> | 0 | 9 | 0 | 68 | <u>0</u> | Bainite | <u>Comparative example</u> |
| 49' | 12 | 13 | <u>49</u> | 0 | 9 | 0 | 66 | <u>0</u> | Bainite | <u>Comparative example</u> |
| 50' | 4 | 16 | 62 | 0 | 5 | 0 | 12 | 63 | Hard α | Example |
| 51' | 7 | 15 | 90 | 0 | 1 | 0 | 12 | 65 | Hard α | <u>Comparative example</u> |
| 52' | 7 | 16 | 90 | 0 | 2 | 0 | 11 | 64 | Hard α | Example |
| 53' | 23 | 12 | 89 | 0 | 1 | 6 | 11 | 47 | Hard α | Example |
| 54' | 7 | 8 | 82 | 0 | 12 | 0 | 13 | 60 | Hard α | Example |
| 55' | 6 | 11 | 83 | 0 | 1 | 0 | 16 | 66 | Hard α | Example |
| 56' | 5 | 4 | 84 | 30 | 0 | 0 | 16 | 45 | Hard α | Example |
| 57' | 6 | 4 | 81 | 0 | 3 | 0 | 11 | 76 | Hard α | Example |
| 58' | 5 | 9 | 80 | 0 | 1 | 0 | 17 | 68 | Hard α | Example |
| 59' | 1 | 16 | 85 | 0 | 5 | 0 | 13 | 65 | Hard α | Example |
| 60' | 0 | 14 | 90 | 0 | 6 | 0 | 13 | 67 | Hard α | Example |
| 61' | 0 | 14 | 80 | 0 | 4 | 0 | 15 | 67 | Hard α | Example |
| 62' | 0 | 16 | 87 | 0 | 5 | 0 | 15 | 64 | Hard α | Example |
| 63' | 24 | 6 | 83 | 16 | 0 | 7 | 9 | 38 | Hard α | Example |
| 64' | 0 | 15 | 84 | 0 | 4 | 0 | 15 | 66 | Hard α | Example |
| 65' | 7 | <u>1</u> | 80 | 0 | 2 | 6 | 84 | <u>0</u> | Bainite | <u>Comparative example</u> |
| 66' | 2 | 17 | 83 | 0 | 4 | 0 | 12 | 65 | Hard α | Example |
| 67' | 7 | 16 | 63 | 0 | 3 | 0 | 16 | 58 | Hard α | Example |
| 68' | 14 | 14 | 62 | 10 | 6 | 0 | 14 | 42 | Hard α | Example |
| 69' | 6 | 17 | 82 | 0 | 5 | 0 | 16 | 56 | Hard α | Example |
| 70' | 3 | 13 | 91 | 0 | 3 | 0 | 15 | 66 | Hard α | Example |
| 71' | 24 | <u>1</u> | 78 | 0 | 4 | 0 | 11 | 60 | Hard α | <u>Comparative example</u> |
| 72' | 12 | 7 | 92 | 0 | 2 | 0 | 16 | 63 | Hard α | <u>Comparative example</u> |
| 73' | <u>67</u> | 6 | <u>35</u> | 0 | 0 | 6 | 3 | 18 | Hard α | <u>Comparative example</u> |
| 74' | 4 | 21 | 91 | 0 | 11 | 0 | 12 | 52 | Hard α | <u>Comparative example</u> |
| 75' | 0 | 6 | <u>38</u> | 0 | 26 | 0 | 10 | 58 | Hard α | <u>Comparative example</u> |
| 76' | 5 | 16 | 91 | 0 | 2 | 0 | 16 | 61 | Hard α | Example |
| 77' | 7 | 18 | 90 | 0 | 5 | 0 | 14 | 56 | Hard α | Example |
| 78' | 7 | 17 | 90 | 21 | 1 | 0 | 8 | 46 | Hard α | Example |
| 79' | 6 | 18 | 87 | 5 | 4 | 0 | 13 | 54 | Hard α | Example |
| 80' | 6 | 14 | 88 | 46 | 0 | 0 | 2 | 32 | Hard α | Example |
| 81' | 7 | 16 | 89 | 25 | 1 | 0 | 7 | 44 | Hard α | Example |
| 82' | 6 | 17 | 85 | 21 | 1 | 0 | 8 | 47 | Hard α | Example |
| 83' | 4 | 20 | 85 | 30 | 1 | 0 | 9 | 36 | Hard α | Example |
| 84' | 0 | 30 | 79 | 41 | 3 | 0 | 4 | 22 | Hard α | Example |
| 85' | 7 | 12 | 88 | 8 | 0 | 0 | 15 | 58 | Hard α | Example |
| 86' | 7 | 13 | 83 | 0 | 3 | 0 | 17 | 60 | Hard α | Example |
| 87' | 5 | 6 | 91 | 65 | 0 | 0 | 0 | 24 | Hard α | Example |

*Underlined is outside the scope of the invention

Next, for each of the hot-dip galvanized steel sheets, the steel structure was measured by the above-described method, and the thickness (depth range from the surface) of the soft layer and the number proportion of grains having an aspect ratio of less than 3.0 in soft ferrite grains contained in the soft layer were examined.

In addition, for each of the hot-dip galvanized steel sheets, the steel structure was measured by the above-described method, and the ratio between the residual γ volume percentage in the soft layer and the residual γ volume percentage of the steel sheet inside (residual γ volume percentage in the soft layer/residual γ volume percentage of the steel sheet inside) was examined.

The results are shown in Tables 23 and 24.

Furthermore, each of the hot-dip galvanized steel sheets was analyzed by the radio frequency glow discharge optical emission spectrometry method in the depth direction from the surface by the above-described method, and whether or not a peak (a peak indicating that an internal oxide layer containing Si oxides was included) of the emission intensity at a wavelength indicating Si had appeared in a depth range of more than 0.2 μm to 5 μm or less was examined.

In addition, for each of the hot-dip galvanized steel sheets, the peak of the emission intensity at a wavelength indicating Si appearing in the depth range of more than 0.2 μm to 5 μm or less in the depth direction from the surface was evaluated as an internal oxide peak "present", and no peak appeared was evaluated as an internal oxide peak "absent". The results are shown in Tables 23 and 24.

TABLE 23

| | Surface layer structure of base steel sheet | | | | |
| --- | --- | --- | --- | --- | --- |
| Example | Soft layer thickness μm | Volume fraction of grains having an aspect ratio of less than 3.0 among ferrite volume % | Residual γ volume percentage in the soft layer/residual γ volume percentage of the steel sheet inside % | Internal oxide peak | Remarks |
| 1' | 32 | 78 | 69 | Present | Example |
| 2' | 29 | 86 | 65 | Present | Comparative example |
| 3' | 120 | 85 | 38 | Present | Comparative example |
| 4' | 30 | 79 | 67 | Present | Example |
| 5' | 34 | 77 | 70 | Present | Comparative example |
| 6' | 0 | — | — | Absent | Comparative example |
| 7' | 31 | 80 | 64 | Present | Example |
| 8' | 36 | 82 | 61 | Present | Comparative example |
| 9' | 45 | 78 | 13 | Present | Comparative example |
| 10' | 38 | 74 | 15 | Present | Comparative example |
| 11' | 21 | 79 | 71 | Present | Example |
| 12' | 33 | 81 | 72 | Present | Example |
| 13' | 19 | 74 | 86 | Present | Example |
| 14' | 0 | — | — | Absent | Comparative example |
| 15' | 30 | 76 | 67 | Present | Example |
| 16' | 37 | 74 | 75 | Present | Example |
| 17' | 40 | 78 | 69 | Present | Example |
| 18' | 0 | — | — | Absent | Comparative example |
| 19' | 0 | — | — | Absent | Comparative example |
| 20' | 47 | 80 | 68 | Present | Example |
| 21' | 43 | 77 | 77 | Present | Example |
| 22' | 58 | 82 | 14 | Present | Comparative example |
| 23' | 49 | 81 | 69 | Present | Example |
| 24' | 16 | 84 | 55 | Present | Example |
| 25' | 18 | 87 | 12 | Present | Comparative example |
| 26' | 0 | — | — | Absent | Comparative example |
| 27' | 8 | 79 | 74 | Present | Comparative example |
| 28' | 15 | 82 | 59 | Present | Example |
| 29' | 17 | 80 | 53 | Present | Example |
| 30' | 11 | 80 | — | Present | Comparative example |
| 31' | 25 | 79 | 65 | Present | Example |
| 32' | 27 | 76 | 55 | Present | Example |
| 33' | 20 | 75 | 74 | Present | Example |
| 34' | 16 | 76 | 67 | Present | Example |
| 35' | 31 | 81 | 62 | Present | Example |
| 36' | 34 | 78 | 68 | Present | Comparative example |
| 37' | 31 | 71 | 62 | Present | Example |
| 38' | 36 | 74 | 67 | Present | Example |
| 39' | 32 | 76 | 76 | Present | Comparative example |

*Underlined is outside the scope of the invention

TABLE 24

| | | | Residual γ volume | | |
| | | Volume fraction of | percentage in the soft | | |
| | | grains having an aspect | layer/residual γ volume | | |
| | Soft layer | ratio of less than 3.0 | percentage of the steel | | |
| | thickness | among ferrite | sheet inside | Internal | |
| Example | μm | volume % | % | oxide peak | Remarks |
|---|---|---|---|---|---|
| 40' | 36 | 81 | 72 | Present | Example |
| 41' | 25 | 77 | 68 | Present | Example |
| 42' | 29 | 71 | 63 | Present | Example |
| 43' | 35 | 76 | 63 | Present | Example |
| 44' | 48 | 93 | <u>0</u> | Present | <u>Comparative example</u> |
| 45' | 24 | 77 | 67 | Present | Example |
| 46' | 24 | 75 | 60 | Present | Example |
| 47' | 28 | 79 | 73 | Present | Example |
| 48' | 39 | 80 | <u>21</u> | Present | <u>Comparative example</u> |
| 49' | <u>0</u> | <u>−</u> | <u>−</u> | Absent | <u>Comparative example</u> |
| 50' | 25 | 79 | 72 | Present | Example |
| 51' | 38 | 85 | <u>10</u> | Present | <u>Comparative example</u> |
| 52' | 27 | 75 | 71 | Present | Example |
| 53' | 18 | 84 | 74 | Present | Example |
| 54' | 21 | 77 | 69 | Present | Example |
| 55' | 24 | 75 | 59 | Present | Example |
| 56' | 30 | 79 | 83 | Present | Example |
| 57' | 16 | 79 | 80 | Present | Example |
| 58' | 30 | 76 | 74 | Present | Example |
| 59' | 28 | 71 | 70 | Present | Example |
| 60' | 27 | 74 | 60 | Present | Example |
| 61' | 31 | 77 | 58 | Present | Example |
| 62' | 26 | 83 | 63 | Present | Example |
| 63' | 31 | 71 | 67 | Present | Example |
| 64' | 26 | 74 | 61 | Present | Example |
| 65' | 24 | 71 | <u>0</u> | Present | <u>Comparative example</u> |
| 66' | 21 | 54 | 91 | Present | Example |
| 67' | 32 | 72 | 68 | Present | Example |
| 68' | 15 | 69 | 80 | Present | Example |
| 69' | 27 | 83 | 76 | Present | Example |
| 70' | 25 | 67 | 66 | Present | Example |
| 71' | <u>10</u> | 93 | <u>0</u> | Present | <u>Comparative example</u> |
| 72' | <u>19</u> | 81 | 66 | Present | <u>Comparative example</u> |
| 73' | <u>11</u> | 99 | 52 | Present | <u>Comparative example</u> |
| 74' | <u>46</u> | 78 | 57 | Present | <u>Comparative example</u> |
| 75' | <u>15</u> | 54 | 66 | Present | <u>Comparative example</u> |
| 76' | 31 | 76 | 72 | Present | Example |
| 77' | 34 | 78 | 74 | Present | Example |
| 78' | 31 | 75 | 79 | Present | Example |
| 79' | 33 | 76 | 80 | Present | Example |
| 80' | 33 | 80 | 75 | Present | Example |
| 81' | 30 | 79 | 72 | Present | Example |
| 82' | 32 | 83 | 72 | Present | Example |
| 83' | 39 | 81 | 70 | Present | Example |
| 84' | 50 | 86 | 74 | Present | Example |
| 85' | 33 | 75 | 71 | Present | Example |
| 86' | 90 | 85 | 57 | Present | Example |
| 87' | 38 | 80 | 75 | Present | Example |

*Underlined is outside the scope of the invention

For each of the hot-dip galvanized steel sheets, the maximum tensile stress (TS), elongation (El), hole expansibility (hole expansion ratio), bendability (minimum bend radius), and fatigue resistance (fatigue limit/TS) were examined by the following methods. The results are shown in Tables 25 and 26.

A JIS No. 5 tensile test piece was taken so that the direction perpendicular to the rolling direction was the tensile direction, the maximum tensile stress and elongation were measured according to JIS Z 2241, and the hole expansibility was measured according to JIS Z 2256. Those having a maximum tensile stress of 700 MPa or more were evaluated as good.

In addition, in order to evaluate the balance between strength, elongation, and hole expansibility, a value represented by Expression (11) was calculated using the results of the maximum tensile stress (TS), elongation (El), and hole expansibility (hole expansion ratio) measured by the above-described methods. In a case where the value represented by Expression (11) was $80 \times 10^{-7}$ or more, the balance between strength, elongation, and hole expansibility was evaluated as good.

$$TS^2 \times El \times \lambda \qquad (11)$$

(in Expression (11), TS represents the maximum tensile stress (MPa), El represents the elongation (%), and λ represents the hole expansibility (%))

The results are shown in Tables 25 and 26.

Based on JIS Z 2248, a steel sheet was cut out in a direction perpendicular to the rolling direction and the end surface was mechanically ground to produce a 35 mm×100 mm test piece. Then, a 90 degree V-bending test was performed on the produced test piece using a 90° die and a punch with a tip R of 0.5 to 6 mm. The bend ridge of the test piece after the bending test was observed with a magnifying glass, and the minimum bend radius without cracking was determined as a limit bend radius. Steel sheets with a limit bend radius of less than 3.0 mm were evaluated to have good bendability.

The fatigue resistance strength was evaluated by a plane bending fatigue test. A JIS No. 1 test piece was used as the test piece, and a stress ratio was set to −1. A repetition frequency was set to 25 Hz, and the maximum stress that did not cause fracture at the number of repetitions of 107 was determined as a fatigue limit. Then, a steel sheet having a ratio of the fatigue limit to the maximum tensile stress (TS) (fatigue limit/TS) of 0.45 or more was evaluated to have good fatigue resistance.

The plating adhesion of each of the hot-dip galvanized steel sheets was measured by the method described below.

A 30 mm×100 mm test piece was taken from each of the hot-dip galvanized steel sheets and subjected to a 90° V bending test. Thereafter, a commercially available sellotape (registered trademark) was attached along the bend ridge, and the width of the plating attached to the tape was measured as the peeling width. The evaluation was performed as follows.

"G" (GOOD): Small plating peeling, or peeling to the extent that there is no practical problem (peeling width 0 to less than 10 mm)

"B" (BAD): Peeling is severe (peeling width 10 mm or more)

Regarding the plating adhesion, samples evaluated as G was determined to be acceptable.

TABLE 25

| Example | TS MPa | El % | Hole expansion ratio % | $TS^2 \times El \times \lambda \times 10^{-7}$ | Limit bend radius mm | Fatigue limit/ TS | Plating adhesion | Remarks |
|---|---|---|---|---|---|---|---|---|
| 1' | 1012 | 29.0 | 45 | 135 | 1.0 | 0.50 | G | Example |
| 2' | 998 | 29.4 | 14 | _40_ | 1.0 | 0.47 | G | Comparative example |
| 3' | 908 | 30.1 | 53 | 131 | 1.0 | _0.36_ | G | Comparative example |
| 4' | 1077 | 27.2 | 31 | 99 | 2.0 | 0.46 | G | Example |
| 5' | 1076 | 26.1 | 25 | _75_ | _3.0_ | 0.48 | G | Comparative example |
| 6' | 1105 | 27.8 | 46 | 155 | _3.5_ | 0.54 | _B_ | Comparative example |
| 7' | 1034 | 30.2 | 36 | 117 | 1.0 | 0.47 | G | Example |
| 8' | 898 | 30.1 | 30 | _73_ | 2.0 | 0.47 | G | Comparative example |
| 9' | 953 | 27.4 | 46 | 114 | 1.0 | _0.34_ | G | Comparative example |
| 10' | 1066 | 26.3 | 46 | 138 | 1.0 | _0.38_ | G | Comparative example |
| 11' | 999 | 27.2 | 46 | 125 | 1.0 | 0.50 | G | Example |
| 12' | 1008 | 25.9 | 49 | 129 | 1.0 | 0.51 | G | Example |
| 13' | 1004 | 28.1 | 32 | 90 | 1.0 | 0.47 | G | Example |
| 14' | 920 | 29.4 | 14 | _36_ | _4.0_ | 0.49 | _B_ | Comparative example |
| 15' | 1034 | 28.5 | 48 | 147 | 1.0 | 0.50 | G | Example |
| 16' | 1213 | 20.4 | 46 | 138 | 1.5 | 0.50 | G | Example |
| 17' | 1162 | 22.1 | 46 | 137 | 1.5 | 0.46 | G | Example |
| 18' | 1247 | 21.8 | 42 | 141 | _3.0_ | 0.49 | _B_ | Comparative example |
| 19' | 1183 | 21.1 | 21 | _62_ | _4.0_ | 0.51 | _B_ | Comparative example |
| 20' | 1514 | 23.5 | 27 | 143 | 2.0 | 0.50 | G | Example |
| 21' | 1592 | 20.2 | 21 | 107 | 2.5 | 0.46 | G | Example |
| 22' | 1448 | 21.2 | 27 | 119 | 1.5 | _0.28_ | G | Comparative example |
| 23' | 1559 | 22.2 | 31 | 166 | 2.0 | 0.51 | G | Example |
| 24' | 742 | 36.2 | 53 | 106 | 1.0 | 0.47 | G | Example |
| 25' | 754 | 35.8 | 49 | 101 | 1.0 | _0.37_ | G | Comparative example |
| 26' | 845 | 33.2 | 52 | 124 | _4.0_ | 0.52 | _B_ | Comparative example |
| 27' | 1183 | 10.5 | 35 | _51_ | 2.0 | 0.48 | G | Comparative example |
| 28' | 736 | 30.6 | 56 | 93 | 1.0 | 0.49 | G | Example |
| 29' | 818 | 31.2 | 54 | 112 | 1.0 | 0.47 | G | Example |
| 30' | 878 | 20.8 | 48 | _77_ | 1.0 | _0.40_ | G | Comparative example |
| 31' | 912 | 27.5 | 50 | 115 | 1.0 | 0.47 | G | Example |
| 32' | 947 | 28.3 | 55 | 139 | 1.0 | 0.49 | G | Example |
| 33' | 877 | 26.7 | 46 | 95 | 1.0 | 0.50 | G | Example |
| 34' | 875 | 26.8 | 53 | 109 | 1.0 | 0.47 | G | Example |
| 35' | 1235 | 27.6 | 38 | 160 | 1.5 | 0.49 | G | Example |
| 36' | 1776 | 22.3 | 8 | _57_ | _5.0_ | 0.47 | G | Comparative example |
| 37' | 1346 | 25.3 | 23 | 103 | 2.0 | 0.48 | G | Example |
| 38' | 1203 | 29.1 | 40 | 168 | 1.5 | 0.46 | G | Example |
| 39' | 1390 | 21.5 | 8 | _34_ | _3.5_ | 0.49 | G | Comparative example |

*Underlined values do not meet the acceptance criteria of the invention

TABLE 26

| | | | Mechanical properties | | | | | |
|---|---|---|---|---|---|---|---|---|
| Example | TS MPa | El % | Hole expansion ratio % | $TS^2 \times El \times \lambda \times 10^{-7}$ | Limit bend radius mm | Fatigue limit/ TS | Plating adhesion | Remarks |
| 40' | 1319 | 26.9 | 24 | 112 | 1.5 | 0.47 | G | Example |
| 41' | 1075 | 27.4 | 44 | 141 | 1.0 | 0.48 | G | Example |
| 42' | 997 | 27.9 | 41 | 114 | 2.0 | 0.47 | G | Example |
| 43' | 1059 | 23.3 | 42 | 109 | 2.0 | 0.47 | G | Example |
| 44' | 966 | 21.5 | 37 | <u>74</u> | <u>3.0</u> | 0.46 | G | Comparative example |
| 45' | 1006 | 26.6 | 41 | 111 | 1.0 | 0.48 | G | Example |
| 46' | 988 | 25.7 | 43 | 107 | 1.0 | 0.49 | G | Example |
| 47' | 893 | 28.5 | 42 | 95 | 1.5 | 0.48 | G | Example |
| 48' | 1053 | 26.0 | 21 | <u>61</u> | 1.0 | <u>0.39</u> | G | Comparative example |
| 49' | 1109 | 26.8 | 20 | <u>66</u> | <u>4.0</u> | 0.54 | <u>B</u> | Comparative example |
| 50' | 1005 | 28.0 | 36 | 102 | 1.5 | 0.46 | G | Example |
| 51' | 994 | 30.3 | 55 | 163 | 1.0 | <u>0.35</u> | G | Comparative example |
| 52' | 1005 | 28.9 | 53 | 154 | 1.0 | 0.50 | G | Example |
| 53' | 887 | 29.4 | 38 | 87 | 2.0 | 0.45 | G | Example |
| 54' | 1106 | 23.8 | 35 | 101 | 2.0 | 0.46 | G | Example |
| 55' | 868 | 29.0 | 58 | 127 | 1.0 | 0.49 | G | Example |
| 56' | 1012 | 15.5 | 56 | 88 | 1.0 | 0.45 | G | Example |
| 57' | 786 | 27.6 | 55 | 94 | 1.0 | 0.45 | G | Example |
| 58' | 978 | 29.4 | 58 | 164 | 1.0 | 0.48 | G | Example |
| 59' | 1013 | 28.5 | 37 | 109 | 1.5 | 0.48 | G | Example |
| 60' | 1162 | 24.0 | 21 | 68 | 1.5 | 0.51 | G | Example |
| 61' | 1038 | 26.3 | 46 | 131 | 1.0 | 0.49 | G | Example |
| 62' | 1072 | 28.3 | 42 | 135 | 1.0 | 0.49 | G | Example |
| 63' | 960 | 22.7 | 43 | 89 | 1.5 | 0.47 | G | Example |
| 64' | 1104 | 28.2 | 50 | 171 | 1.0 | 0.49 | G | Example |
| 65' | 917 | 18.8 | 48 | <u>76</u> | <u>3.5</u> | 0.50 | G | Comparative example |
| 66' | 1130 | 29.7 | 47 | 179 | 2.5 | 0.48 | G | Example |
| 67' | 1095 | 26.3 | 40 | 126 | 1.0 | 0.49 | G | Example |
| 68' | 1149 | 21.9 | 34 | 97 | 1.5 | 0.48 | G | Example |
| 69' | 1118 | 26.5 | 45 | 151 | 1.0 | 0.48 | G | Example |
| 70' | 1026 | 27.0 | 45 | 127 | 1.0 | 0.48 | G | Example |
| 71' | 608 | 39.8 | 46 | <u>68</u> | 1.0 | 0.47 | G | Comparative example |
| 72' | 882 | 27.1 | 14 | <u>29</u> | <u>6.0</u> | 0.46 | G | Comparative example |
| 73' | 599 | 33.0 | 83 | 99 | 2.0 | 0.45 | G | Comparative example |
| 74' | 1241 | 21.9 | 5 | 17 | <u>5.0</u> | 0.48 | <u>B</u> | Comparative example |
| 75' | 1554 | 9.5 | 5 | <u>12</u> | <u>5.0</u> | 0.47 | G | Comparative example |
| 76' | 1025 | 29.8 | 44 | 138 | 1.0 | 0.50 | G | Example |
| 77' | 1062 | 29.3 | 42 | 139 | 1.0 | 0.51 | G | Example |
| 78' | 1093 | 21.5 | 56 | 144 | 1.0 | 0.50 | G | Example |
| 79' | 1051 | 28.0 | 49 | 152 | 1.0 | 0.50 | G | Example |
| 80' | 1126 | 19.0 | 50 | 120 | 1.0 | 0.50 | G | Example |
| 81' | 1068 | 24.7 | 51 | 144 | 1.0 | 0.50 | G | Example |
| 82' | 1055 | 26.0 | 49 | 142 | 1.0 | 0.51 | G | Example |
| 83' | 1259 | 19.9 | 46 | 145 | 1.5 | 0.50 | G | Example |
| 84' | 1607 | 20.5 | 27 | 143 | 2.0 | 0.50 | G | Example |
| 85' | 951 | 27.9 | 52 | 131 | 1.0 | 0.50 | G | Example |
| 86' | 914 | 33.1 | 39 | 108 | 1.0 | 0.45 | G | Example |
| 87' | 1274 | 15.5 | 40 | 101 | 1.5 | 0.48 | G | Example |

*Underlined values do not meet the acceptance criteria of the invention

The evaluation results for each experimental example will be described below.

The hot-dip galvanized steel sheets of the examples of the present invention had high strength, good balance between strength, elongation, and hole expansibility, and good fatigue resistance, bendability, and plating adhesion.

Regarding the steel sheets of Experimental Examples Nos. 14', 19', 30', 48', and 49', since the first heat treatment was not performed and the metallographic structure did not contain hard ferrite, the balance between strength, elongation, and hole expansion ratio was poor.

In the steel sheet of Experimental Example No. 2', since the highest heating temperature in the first heat treatment was low, the number proportion of retained austenite having an aspect ratio of 2.0 or more was insufficient, and the balance between strength, elongation, and hole expansion ratio was poor.

In the steel sheet of Experimental Example No. 3', since the highest heating temperature in the first heat treatment was high, the thickness of the soft layer in the steel sheet for a heat treatment and the hot-dip galvanized steel sheet was large, and the fatigue resistance was low.

In the steel sheet of Experimental Example No. 5', since the average heating rate from 650° C. to the highest heating temperature in the first heat treatment was slow, the number proportion of retained austenite having an aspect ratio of 2.0 or more was insufficient, and the balance between strength, elongation, and hole expansion ratio was poor.

In the steel sheets of Experimental Examples Nos. 6', 18', and 26', since the log($PH_2O/PH_2$) in the first heat treatment was low, the bendability and plating adhesion were poor.

In the steel sheet of Experimental Example No. 8', since the cooling rate in the first heat treatment was slow, the lath-like structure of the steel sheet for a heat treatment was insufficient, and the fraction of soft ferrite in the internal structure of the hot-dip galvanized steel sheet was large. For this reason, the steel sheet of Experimental Example No. 8' had a poor balance between strength, elongation, and hole expansion ratio.

In the steel sheets of Experimental Examples Nos. 9', 10', 22', 25', 30', 48', and 51', since the log(PH$_2$O/PH$_2$) in the second heat treatment was high, the ratio between the residual γ volume percentage in the soft layer and the residual γ volume percentage of the steel sheet inside was insufficient, and the fatigue resistance was poor.

In the steel sheet of Experimental Example No. 27', since the maximum attainment temperature in the second heat treatment was high, the metallographic structure did not contain hard ferrite, and the balance between strength, elongation, and hole expansion ratio was poor.

In the steel sheet of Experimental Example No. 36', since the holding time at 300° C. to 480° C. in the second heat treatment was insufficient, the fraction of fresh martensite in the internal structure was large, and the balance between strength, elongation and hole expansion ratio was poor.

In the steel sheet of Experimental Example No. 39', since the cooling stop temperature in the first heat treatment was high, the number proportion of retained austenite having an aspect ratio of 2.0 or more was insufficient, and the balance between strength, elongation, and hole expansion ratio was poor.

In the steel sheet of Experimental Example No. 44', since the cooling rate in the second heat treatment was slow, the fraction of the sum of pearlite and cementite in the internal structure of the hot-dip galvanized steel sheet was large, and the balance between strength, elongation, and hole expansion ratio was poor.

In the steel sheet of Experimental Example No. 65', since the maximum attainment temperature in the second heat treatment was low, the fraction of retained austenite in the internal structure of the hot-dip galvanized steel sheet was insufficient, and the balance between strength, elongation, and hole expansion ratio was poor.

In the steel sheets of Experimental Examples Nos. 71' to 75', the chemical composition was outside the range of the present invention. In the steel sheet of Experimental Example No. 71', since the C content was insufficient, the maximum tensile stress (TS) was insufficient. In the steel sheet of Experimental Example No. 72', since the Nb content was large, the bendability was poor. In the steel sheet of Experimental Example No. 73', since the Mn content was insufficient, the maximum tensile stress (TS) was insufficient. In the steel sheet of Experimental Example No. 74', since the Si content was large, the hole expansibility was poor. In the steel sheet of Experimental Example No. 75', since the Mn content and the P content were large, the elongation and the hole expansibility were poor.

While the preferred embodiments and examples of the present invention have been described above, these embodiments and examples are merely examples within the scope of the gist of the present invention, and additions, omissions, substitutions, and other changes of the configuration can be made without departing from the gist of the present invention. That is, the present invention is not limited by the above description, but is limited only by the appended claims, and can be appropriately changed within the scope as a matter of course.

BRIEF DESCRIPTION OF THE REFERENCE SYMBOLS

1 Steel sheet
11 Range from ⅛ thickness to ⅜ thickness centered on ¼ thickness position from surface of steel sheet (steel sheet inside)
12 Soft layer

The invention claimed is:

1. A steel sheet comprising consisting of, as a chemical composition, by mass %:
C: 0.050% to 0.500%;
Si: 0.01% to 3.00%;
Mn: 0.50% to 5.00%;
P: 0.0001% to 0.1000%;
S: 0.0001% to 0.0100%;
Al: 0.001% to 2.500%;
N: 0.0001% to 0.0100%;
O: 0.0001% to 0.0100%;
Ti: 0% to 0.300%;
V: 0% to 1.00%;
Nb: 0% to 0.100%;
Cr: 0% to 2.00%;
Ni: 0% to 2.00%;
Cu: 0% to 2.00%;
Co: 0% to 2.00%;
Mo: 0% to 1.00%;
W: 0% to 1.00%;
B: 0% to 0.0100%;
Sn: 0% to 1.00%;
Sb: 0% to 1.00%;
Ca: 0% to 0.0100%;
Mg: 0% to 0.0100%;
Ce: 0% to 0.0100%;
Zr: 0% to 0.0100%;
La: 0% to 0.0100%;
Hf: 0% to 0.0100%;
Bi: 0% to 0.0100%;
REM: 0% to 0.0100%; and
a remainder consisting of Fe and impurities,
wherein a steel structure in a range from ⅛ thickness to ⅜ thickness centered on a ¼ thickness position from a surface contains, by volume fraction,
soft ferrite: 0% to 30%,
retained austenite: 3% to 40%,
fresh martensite: 0% to 30%,
a sum of pearlite and cementite: 0% to 10%, and
a remainder including hard ferrite,
in the range from ⅛ thickness to ⅜ thickness centered on the ¼ thickness position from the surface, a number proportion of retained austenite having an aspect ratio of 2.0 or more in the total retained austenite is 50% or more,
when a region having a hardness that is 80% or less of a hardness of the range from ⅛ thickness to ⅜ thickness is defined as a soft layer, the soft layer having a thickness of 1 μm to 100 μm from the surface is present in a sheet thickness direction,
among ferrite grains contained in the soft layer, a volume fraction of grains having an aspect ratio of less than 3.0 is 50% or more,
a volume fraction of retained austenite in the soft layer is 50% or more of the volume fraction of the retained austenite in the range from ⅛ thickness to ⅜ thickness, and
when an emission intensity at a wavelength indicating Si is analyzed in a direction from the surface toward the sheet thickness direction by a radio frequency glow discharge optical emission spectrometry method, a peak of the emission intensity at the wavelength indicating Si appears in a range of more than 0.2 μm from the surface to 5 μm or less from the surface.

2. The steel sheet according to claim 1, consisting of, as the chemical composition, by mass %:
one or more of
Ti: 0.001% to 0.300%,
V: 0.001% to 1.00%, and
Nb: 0.001% to 0.100%.

3. The steel sheet according to claim 1, consisting of, as the chemical composition, by mass %:
one or more of
Cr: 0.001% to 2.00%,
Ni: 0.001% to 2.00%,
Cu: 0.001% to 2.00%,
Co: 0.001% to 2.00%,
Mo: 0.001% to 1.00%,
W: 0.001% to 1.00%, and
B: 0.0001% to 0.0100%.

4. The steel sheet according to claim 1, consisting of, as the chemical composition, by mass %:
one or two of
Sn: 0.001% to 1.00%, and
Sb: 0.001% to 1.00%.

5. The steel sheet according to claim 1, consisting of, as the chemical composition, by mass %:
one or more of
Ca: 0.0001% to 0.0100%,
Mg: 0.0001% to 0.0100%,
Ce: 0.0001% to 0.0100%,
Zr: 0.0001% to 0.0100%,
La: 0.0001% to 0.0100%,
Hf: 0.0001% to 0.0100%,
Bi: 0.0001% to 0.0100%, and
REM: 0.0001% to 0.0100%.

6. The steel sheet according to claim 1,
wherein the chemical composition satisfies Expression (1), $$Si+0.1\times Mn+0.6\times Al \geq 0.35 \quad (1)$$

in Expression (1), Si, Mn, and Al are respectively amounts of corresponding elements by mass %.

7. The steel sheet according to claim 1,
wherein a volume fraction of tempered martensite in the range from 1/8 thickness to 3/8 thickness centered on the 1/4 thickness position from the surface is 0% to 50%.

8. The steel sheet according to claim 1,
wherein the steel sheet has a hot-dip galvanized layer on the surface.

9. The steel sheet according to claim 1,
wherein the steel sheet has an electrogalvanized layer on the surface.

10. A steel sheet comprising, as a chemical composition, by mass %:
C: 0.050% to 0.500%;
Si: 0.01% to 3.00%;
Mn: 0.50% to 5.00%;
P: 0.0001% to 0.1000%;
S: 0.0001% to 0.0100%;
Al: 0.001% to 2.500%;
N: 0.0001% to 0.0100%;
O: 0.0001% to 0.0100%;
Ti: 0% to 0.300%;
V: 0% to 1.00%;
Nb: 0% to 0.100%;
Cr: 0% to 2.00%;
Ni: 0% to 2.00%;
Cu: 0% to 2.00%;
Co: 0% to 2.00%;
Mo: 0% to 1.00%;
W: 0% to 1.00%;
B: 0% to 0.0100%;
Sn: 0% to 1.00%;
Sb: 0% to 1.00%;
Ca: 0% to 0.0100%;
Mg: 0% to 0.0100%;
Ce: 0% to 0.0100%;
Zr: 0% to 0.0100%;
La: 0% to 0.0100%;
Hf: 0% to 0.0100%;
Bi: 0% to 0.0100%;
REM: 0% to 0.0100%; and
a remainder comprising Fe and impurities,
wherein a steel structure in a range from 1/8 thickness to 3/8 thickness centered on a 1/4 thickness position from a surface contains, by volume fraction,
soft ferrite: 0% to 30%,
retained austenite: 3% to 40%,
fresh martensite: 0% to 30%,
a sum of pearlite and cementite: 0% to 10%, and
a remainder including hard ferrite,
in the range from 1/8 thickness to 3/8 thickness centered on the 1/4 thickness position from the surface, a number proportion of retained austenite having an aspect ratio of 2.0 or more in the total retained austenite is 50% or more,
when a region having a hardness that is 80% or less of a hardness of the range from 1/8 thickness to 3/8 thickness is defined as a soft layer, the soft layer having a thickness of 1 μm to 100 μm from the surface is present in a sheet thickness direction,
among ferrite grains contained in the soft layer, a volume fraction of grains having an aspect ratio of less than 3.0 is 50% or more,
a volume fraction of retained austenite in the soft layer is 50% or more of the volume fraction of the retained austenite in the range from 1/8 thickness to 3/8 thickness, and
when an emission intensity at a wavelength indicating Si is analyzed in a direction from the surface toward the sheet thickness direction by a radio frequency glow discharge optical emission spectrometry method, a peak of the emission intensity at the wavelength indicating Si appears in a range of more than 0.2 μm from the surface to 5 μm or less from the surface.

11. A method for manufacturing the steel sheet according to claim 1, the method comprising:
hot-rolling a slab having said chemical composition;
performing a first heat treatment satisfying (a) to (e) on a hot-rolled steel sheet which has been pickled, or on a cold-rolled steel sheet which has been obtained by cold-rolling the hot-rolled steel sheet,
where (a) while heating from 650° C. to a highest heating temperature is performed, an atmosphere around the hot-rolled steel sheet or the cold-rolled steel sheet is set to an atmosphere containing 0.1 vol % or more of $H_2$ and satisfying Expression (2),
(b) holding is performed at the highest heating temperature of $A_{c3}$−30° C. to 1000° C. for 1 second to 1000 seconds, (c) heating from 650° C. to the highest heating temperature is performed at an average heating rate of 0.5° C./sec to 500° C./sec,
(d) after performing holding at the highest heating temperature, cooling from 700° C. to Ms is performed at an average cooling rate of 5° C./sec or more, and
(e) the cooling at the average cooling rate of 5° C./sec or more is performed until a cooling stop temperature of Ms or lower; and thereafter performing a second heat treatment satisfying (A) to (E),
   where (A) while heating from 650° C. to the highest heating temperature is performed, the atmosphere around the hot-rolled steel sheet or the cold-rolled steel sheet is set to an atmosphere containing 0.1 vol % or more of $H_2$ and satisfying Expression (3),
   (B) holding is performed at the highest heating temperature of $A_{c1}+25°$ C. to $A_{c3}-10°$ C. for 1 second to 1000 seconds,
   (C) heating from 650° C. to the highest heating temperature is performed at an average heating rate of 0.5° C./sec to 500° C./sec,
   (D) cooling from the highest heating temperature to 480° C. or lower is performed such that an average cooling rate between 600° C. and 700° C. is 3° C./sec or more, and
   (E) After performing cooling at the average cooling rate of 3° C./sec or more, holding is performed at 300° C. to 480° C. for 10 seconds or longer, $$1.1 \le \log(PH_2O/PH_2) \le -0.07 \quad (2)$$

in Expression (2), $PH_2O$ represents a partial pressure of water vapor, and $PH_2$ represents a partial pressure of hydrogen, $$\log(PH_2O/PH_2) < -1.1 \quad (3)$$

in Expression (3), $PH_2O$ represents a partial pressure of water vapor, and $PH_2$ represents a partial pressure of hydrogen.

12. The method for manufacturing the steel sheet according to claim 11,
   wherein the method is a method for manufacturing the steel sheet having a hot-dip galvanized layer on a surface,
   in the second heat treatment, the atmosphere always contains 0.1 vol % or more of H2 and 0.020 vol % or less of $O_2$ and satisfies Expression (3) until a temperature reaches from 650° C. to the highest heating temperature, and
   in the second heat treatment, hot-dip galvanizing is performed after the cooling in (D).

* * * * *